US011994738B2

(12) United States Patent
Cheng et al.

(10) Patent No.: US 11,994,738 B2
(45) Date of Patent: *May 28, 2024

(54) IMAGING LENS ASSEMBLY, CAMERA MODULE AND ELECTRONIC DEVICE

(71) Applicant: LARGAN PRECISION CO., LTD., Taichung (TW)

(72) Inventors: Jyun-Jia Cheng, Taichung (TW); Heng-Yi Su, Taichung (TW); Ming-Ta Chou, Taichung (TW); Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 98 days.

This patent is subject to a terminal disclaimer.

(21) Appl. No.: 17/732,654

(22) Filed: Apr. 29, 2022

(65) Prior Publication Data

US 2022/0252824 A1    Aug. 11, 2022

Related U.S. Application Data

(63) Continuation of application No. 16/942,964, filed on Jul. 30, 2020, now Pat. No. 11,353,676.

(30) Foreign Application Priority Data

Feb. 10, 2020    (TW) .................... 109104100

(51) Int. Cl.
*G02B 7/02*    (2021.01)
*G02B 13/00*    (2006.01)

(52) U.S. Cl.
CPC ............. *G02B 7/022* (2013.01); *G02B 7/021* (2013.01); *G02B 13/0045* (2013.01)

(58) Field of Classification Search
CPC . G02B 7/02; G02B 7/021; G02B 7/20; G02B 7/023; G02B 7/022; G02B 7/026;
(Continued)

(56) References Cited

U.S. PATENT DOCUMENTS 7,417,810 B2    8/2008 Feng et al.
8,031,412 B2    10/2011 Shintani
(Continued)

FOREIGN PATENT DOCUMENTS

| CN | 101109837 A | 1/2008 |
| CN | 205333947 U | 6/2016 |
| CN | 106324784 A | 1/2017 |

*Primary Examiner* — Ephrem Z Mebrahtu
(74) *Attorney, Agent, or Firm* — McClure, Qualey & Rodack, LLP

(57) ABSTRACT

An imaging lens assembly includes a plastic barrel and an optical element set. The optical element set includes an optical lens element, a light blocking sheet and a light-shielding layer. At least one surface of an object-side peripheral surface and an image-side peripheral surface of the optical lens element includes an annular side wall. An annular abutting surface of the light blocking sheet and the annular side wall of the optical lens element are disposed correspondingly to each other. The light-shielding layer surrounds a central opening of the light blocking sheet and includes an annular concave-curved portion. The annular concave-curved portion is for retaining the light blocking sheet, so that there is no relative displacement in a direction parallel to an optical axis between the annular abutting surface of the light blocking sheet and the annular side wall of the optical lens element.

19 Claims, 42 Drawing Sheets

(58) Field of Classification Search
CPC ...... G02B 27/0018; G02B 7/102; G02B 7/10; H04N 5/2254; H04N 5/2252
See application file for complete search history.

(56) References Cited

U.S. PATENT DOCUMENTS

| | | | |
|---|---|---|---|
| 8,570,672 B2 | 10/2013 | Lin | |
| 8,736,989 B2 | 5/2014 | Wu | |
| 9,016,876 B2 | 4/2015 | Lai | |
| 9,069,119 B2 | 6/2015 | Takase et al. | |
| 9,128,265 B2 | 9/2015 | Kim et al. | |
| 9,207,364 B2 | 12/2015 | Yang et al. | |
| 9,678,336 B2 | 6/2017 | Cho et al. | |
| 9,952,359 B2 | 4/2018 | Chang | |
| 10,048,410 B2 | 8/2018 | Kubota | |
| 10,114,152 B2 | 10/2018 | Chou | |
| 2004/0061799 A1* | 4/2004 | Atarashi | G02B 7/022 348/340 |
| 2006/0018041 A1* | 1/2006 | Hirata | G02B 27/0018 359/738 |
| 2019/0187340 A1 | 6/2019 | Jheng et al. | |
| 2020/0233176 A1* | 7/2020 | Feng | G02B 7/022 |

\* cited by examiner

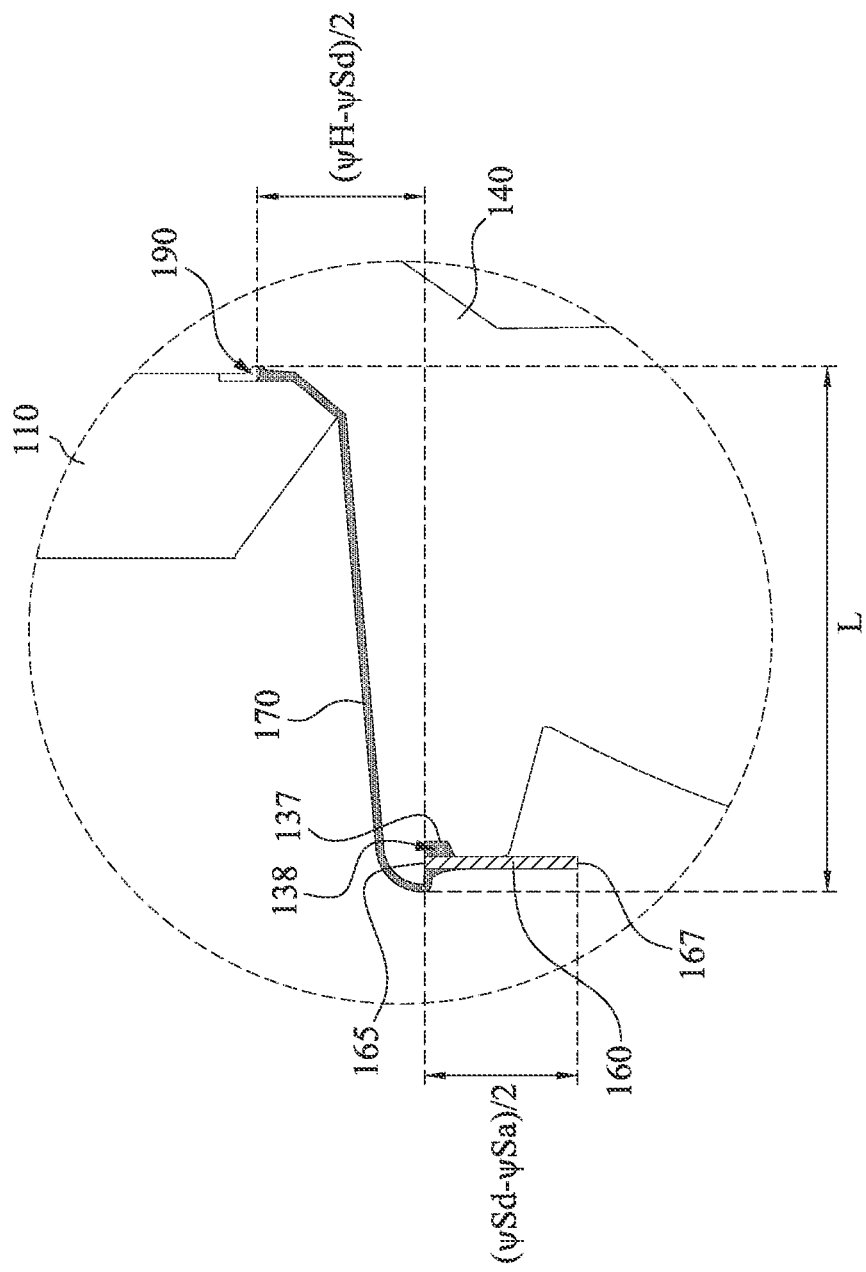

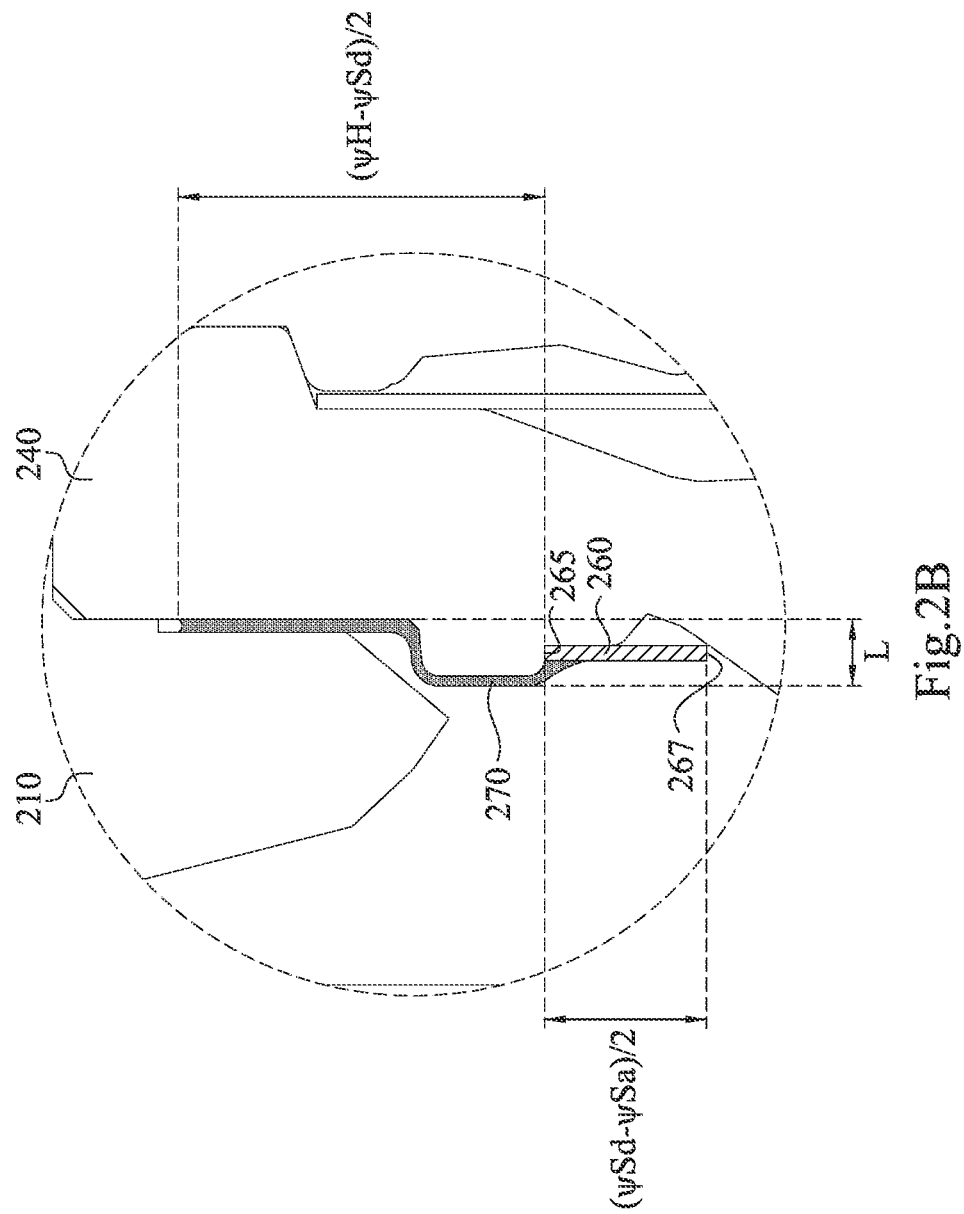

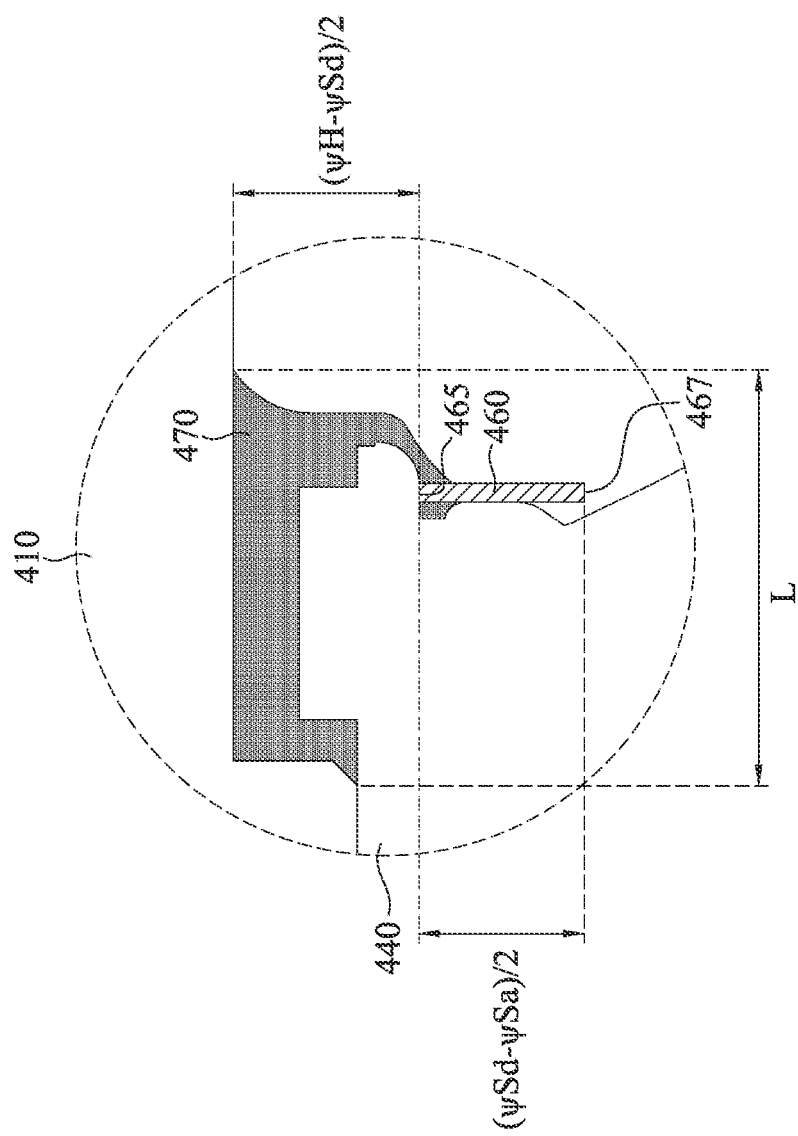

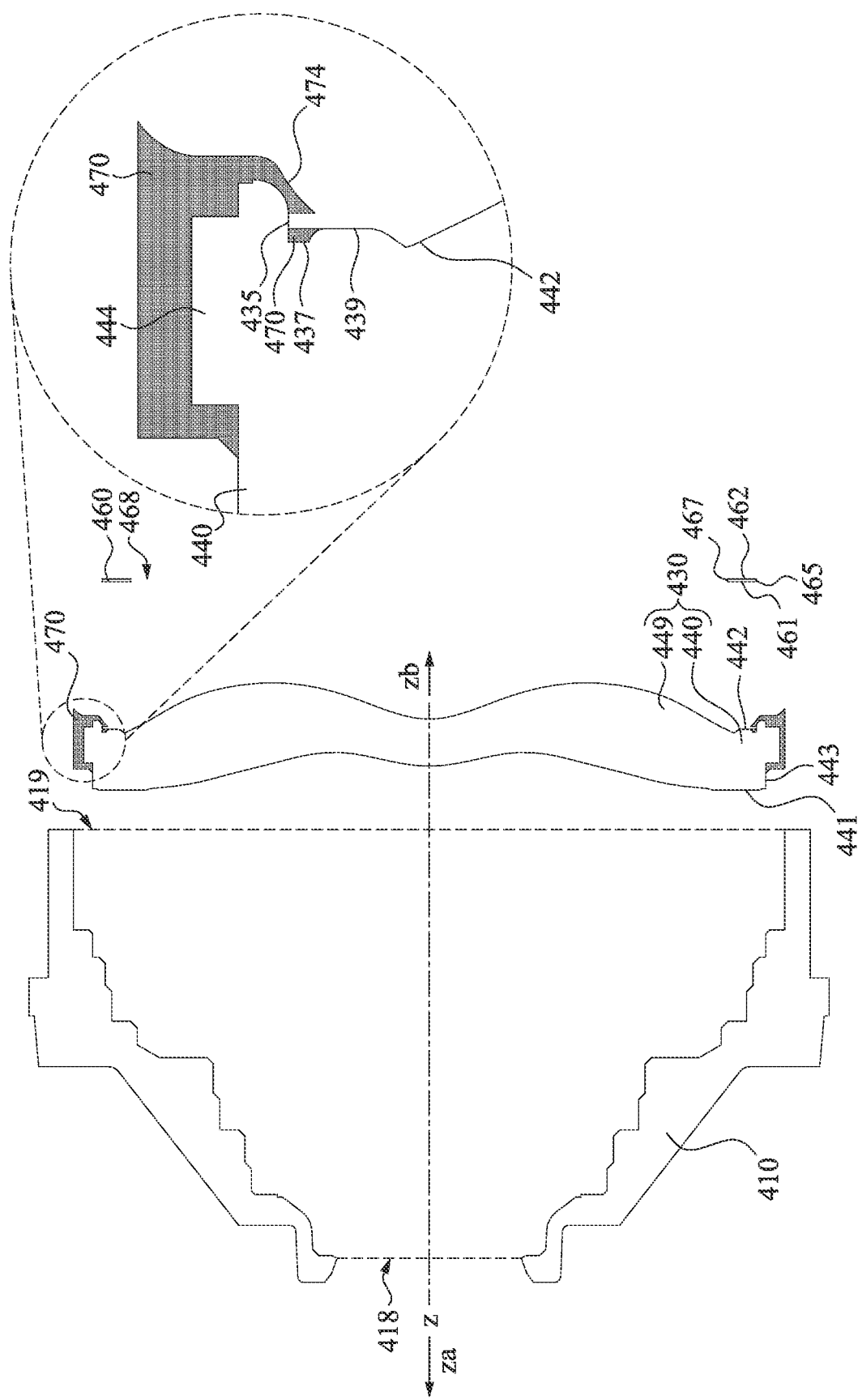

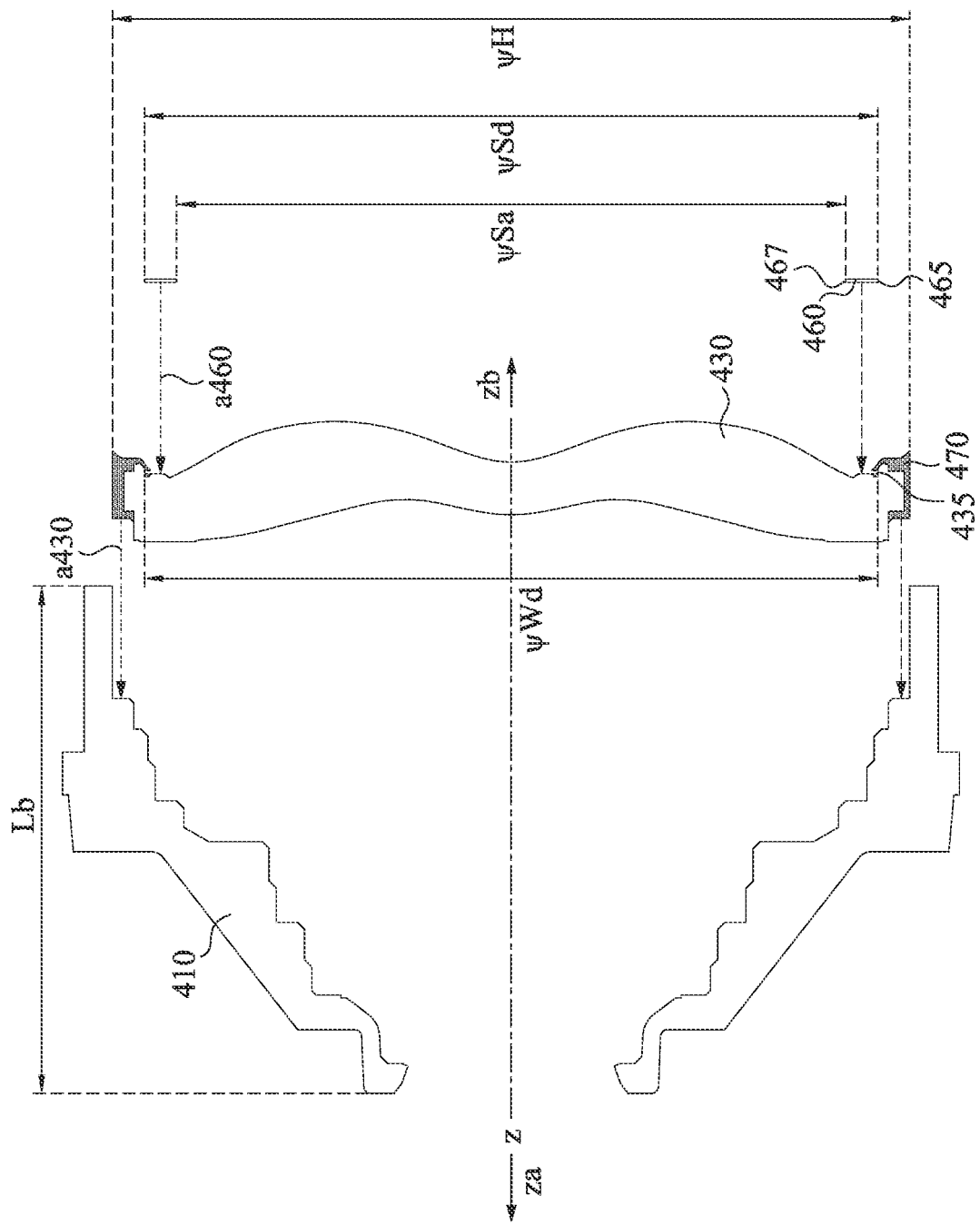

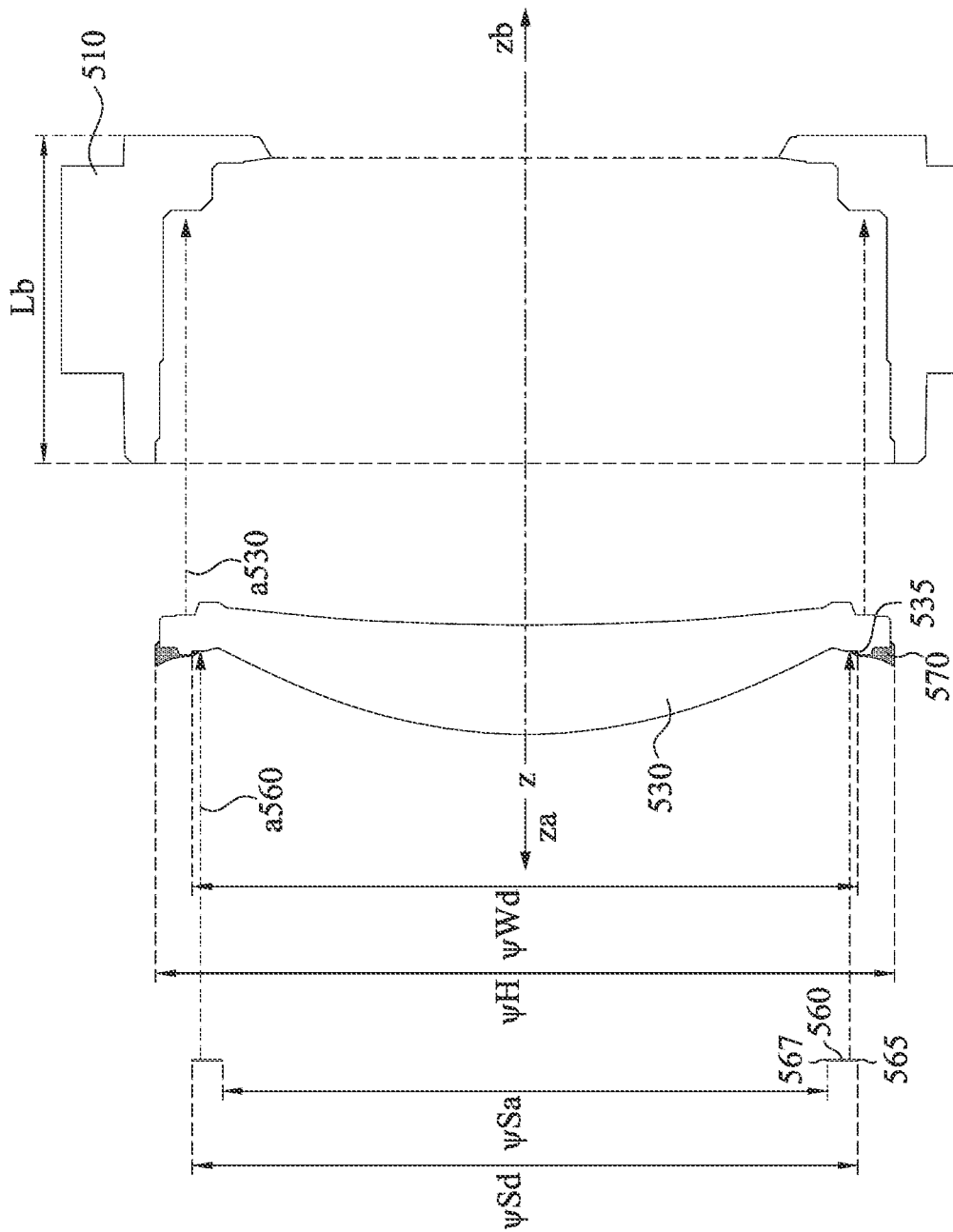

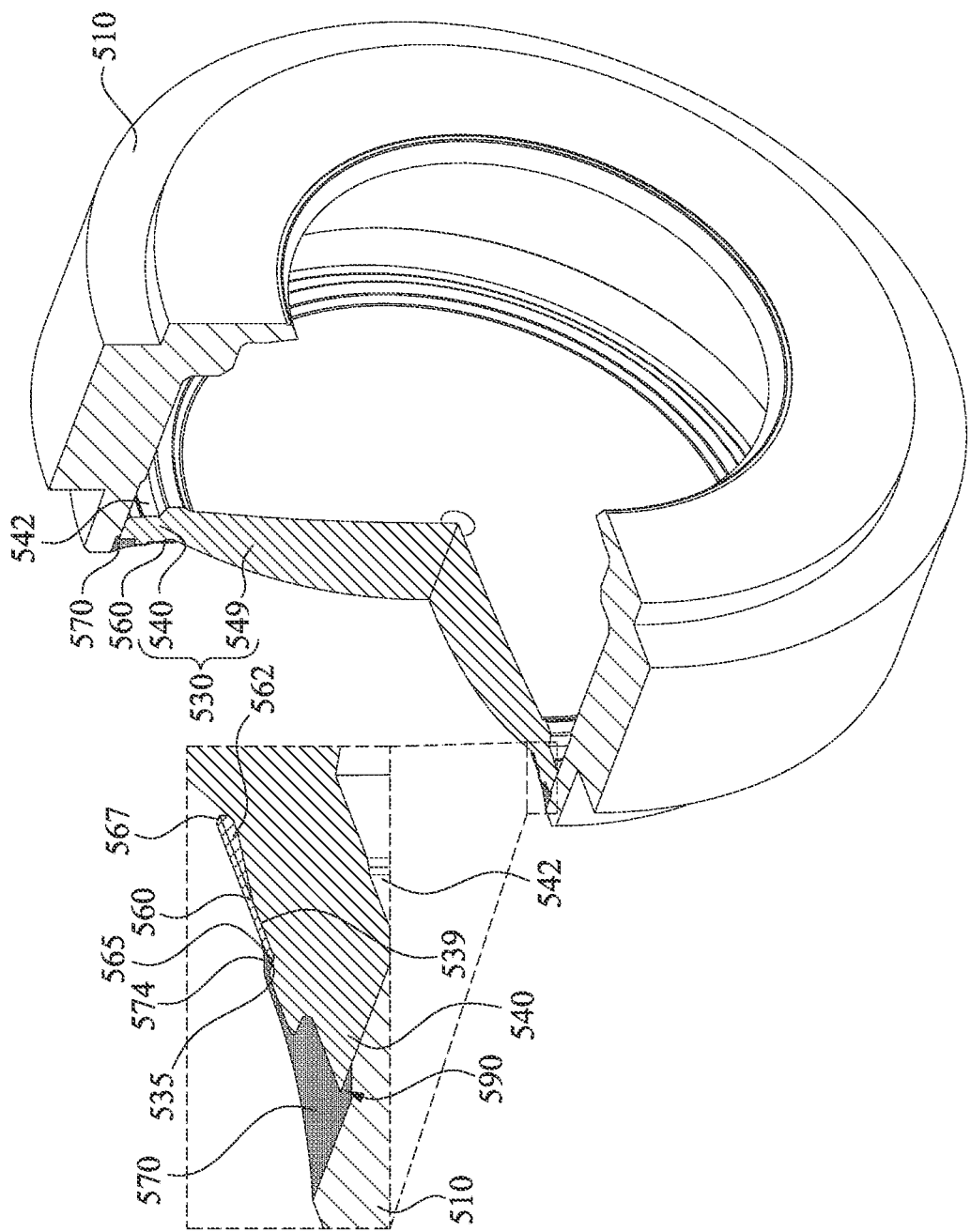

IMAGING LENS ASSEMBLY, CAMERA MODULE AND ELECTRONIC DEVICE

RELATED APPLICATIONS

The present application is a continuation of U.S. application Ser. No. 16/942,964, filed on Jul. 30, 2020, now U.S. Pat. No. 11,353,676, which claims priority to Taiwan Application Serial Number 109104100, filed on Feb. 10, 2020, which are herein incorporated by reference.

BACKGROUND

Technical Field

The present disclosure relates to an imaging lens assembly and a camera module. More particularly, the present disclosure relates to a compact camera module and an imaging lens assembly thereof that are applicable to electronic devices.

Description of Related Art

With the advanced semiconductor manufacturing technologies, the performances of image sensors are enhanced, and the pixel size is minified. Therefore, camera modules with high image quality become indispensable.

Moreover, with the rapid scientific and technological progress, the application scope of electronic devices equipped with camera modules becomes wider, and the requirements for camera modules and imaging lens assembly thereof are more diverse. However, it is hard for balancing the requirements, such as image quality, sensitivity, aperture size, volume and field of view, in conventional camera modules and imaging lens assembly thereof. Therefore, a camera module and an imaging lens assembly thereof are provided by the present disclosure to satisfy the desired requirement.

SUMMARY

According to one aspect of the present disclosure, an imaging lens assembly includes a plastic barrel and an optical element set. The plastic barrel includes a minimum opening. The optical element set includes an optical lens element, a light blocking sheet and a light-shielding layer. The optical lens element includes an effective optical portion and a peripheral portion in order from a center to a periphery thereof. An optical axis of the imaging lens assembly passes through the effective optical portion. The peripheral portion surrounds the effective optical portion. At least one surface of an object-side peripheral surface and an image-side peripheral surface of the peripheral portion includes an annular side wall, which is in a full-circle form and extends along a direction parallel to the optical axis. The light blocking sheet includes an object-side surface, an image-side surface, an annular abutting surface and a central opening surface. The object-side surface faces towards an object side. The image-side surface is located opposite to the object-side surface. The annular abutting surface is connected between the object-side surface and the image-side surface. The annular abutting surface and the annular side wall of the optical lens element are disposed correspondingly to each other. The central opening surface surrounds and forms a central opening of the light blocking sheet. The central opening surface is connected between the object-side surface and the image-side surface. The light-shielding layer surrounds the central opening of the light blocking sheet and includes an annular concave-curved portion. The light-shielding layer extends from the peripheral portion of the optical lens element towards an outer diameter surface of the optical lens element. The annular concave-curved portion is for retaining the light blocking sheet, so that there is no relative displacement in the direction parallel to the optical axis between the annular abutting surface of the light blocking sheet and the annular side wall of the optical lens element. When a maximum diameter of the light-shielding layer is ψH, a maximum diameter of the annular abutting surface is ψSd, and a minimum diameter of the central opening surface is ψSa, the following condition is satisfied: $0.03 < (\psi H - \psi Sd)/(\psi Sd - \psi Sa) < 6.0$.

According to another aspect of the present disclosure, a camera module includes the imaging lens assembly according to the foregoing aspect.

According to another aspect of the present disclosure, an electronic device includes the camera module according to the foregoing aspect and an image sensor. The image sensor is disposed on an image surface of the camera module.

According to another aspect of the present disclosure, an imaging lens assembly includes a plastic barrel and an optical element set. The plastic barrel includes a maximum opening. The optical element set includes an optical lens element, a light blocking sheet and a light-shielding layer. The optical lens element includes an effective optical portion and a peripheral portion in order from a center to a periphery thereof. An optical axis of the imaging lens assembly passes through the effective optical portion. The peripheral portion surrounds the effective optical portion. At least one surface of an object-side peripheral surface and an image-side peripheral surface of the peripheral portion includes an annular side wall, which is in a full-circle form and extends along a direction parallel to the optical axis. The light blocking sheet includes an object-side surface, an image-side surface, an annular abutting surface and a central opening surface. The object-side surface faces towards an object side. The image-side surface is located opposite to the object-side surface. The annular abutting surface is connected between the object-side surface and the image-side surface. The annular abutting surface and the annular side wall of the optical lens element are disposed correspondingly to each other. The central opening surface surrounds and forms a central opening of the light blocking sheet. The central opening surface is connected between the object-side surface and the image-side surface. The light-shielding layer surrounds the central opening of the light blocking sheet and includes an annular concave-curved portion. The light-shielding layer extends from the peripheral portion of the optical lens element towards an outer diameter surface of the optical lens element. The annular concave-curved portion is for retaining the light blocking sheet, so that there is no relative displacement in the direction parallel to the optical axis between the annular abutting surface of the light blocking sheet and the annular side wall of the optical lens element. When a length along the direction parallel to the optical axis of the light-shielding layer is L, and a length along the direction parallel to the optical axis of the plastic barrel is Lb, the following condition is satisfied: $0.0 < L/Lb < 0.5$.

BRIEF DESCRIPTION OF THE DRAWINGS

The present disclosure can be more fully understood by reading the following detailed description of the embodiment, with reference made to the accompanying drawings as follows:

FIG. 10 is a partially exploded view of the imaging lens assembly according to FIG. 1A.

FIG. 2B is a parameter schematic view of part 2B in FIG. 2A.

FIG. 4B is a parameter schematic view of part 4B in FIG. 4A.

FIG. 4C is a partially exploded view of the imaging lens assembly according to FIG. 4A.

FIG. 4D is a parameter schematic view of the imaging lens assembly according to the 4th embodiment.

FIG. 5D is a parameter schematic view of the imaging lens assembly according to the 5th embodiment.

FIG. 5G is another partially three-dimensional and cross-sectional view of the imaging lens assembly according to the 5th embodiment.

DETAILED DESCRIPTION

1st Embodiment

Figure 1A:
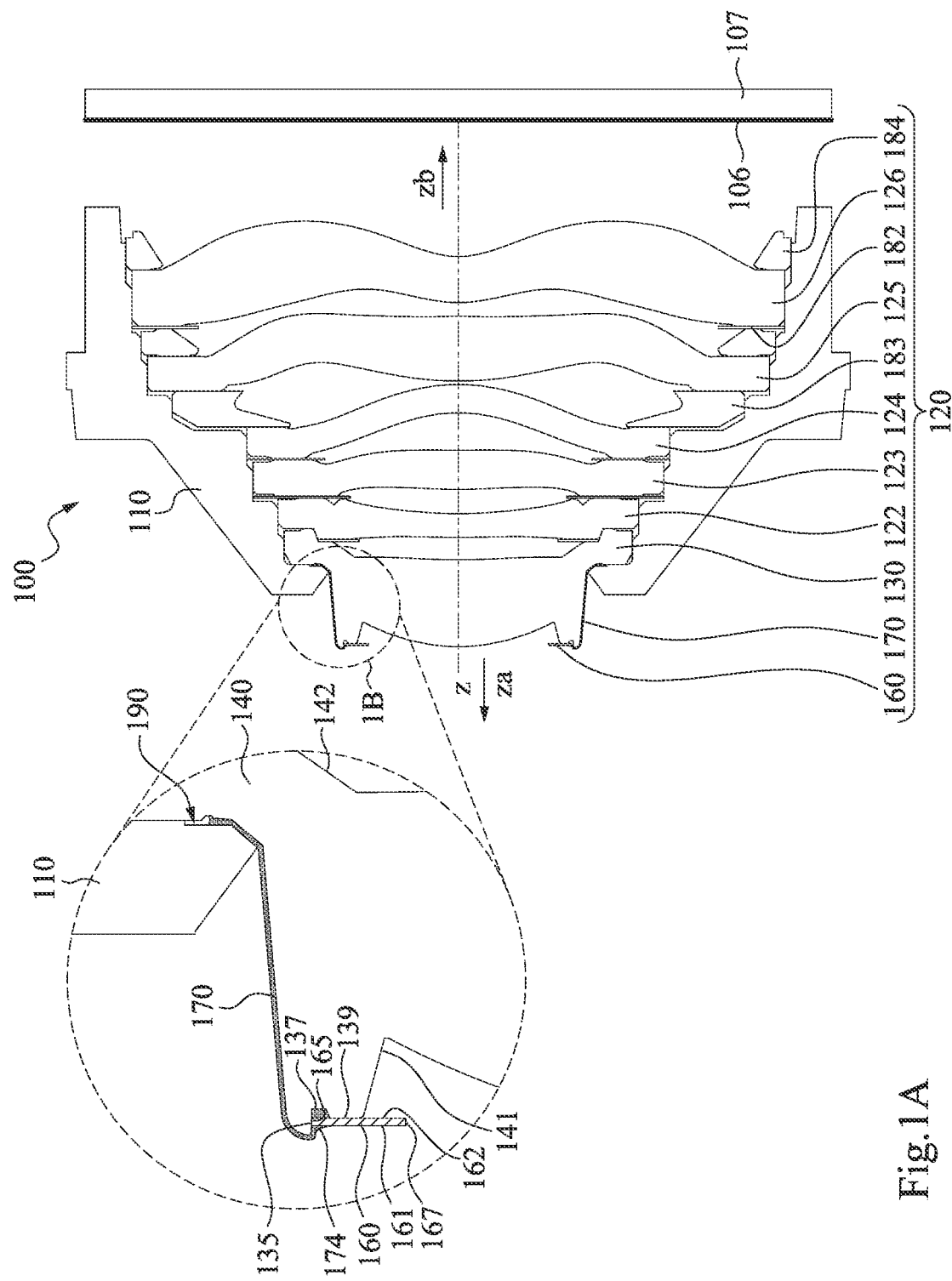
FIG. 1A is a schematic view of an imaging lens assembly according to the 1st embodiment of the present disclosure and an image sensor.

FIG. 1A is a schematic view of an imaging lens assembly 100 according to the 1st embodiment of the present disclosure and an image sensor 107, and FIG. 1A is a cross-sectional view along a plane, on which an optical axis z is located, of the imaging lens assembly 100. FIG. 1B is a parameter schematic view of part 1B in FIG. 1A. FIG. 10 is an exploded view of a plastic barrel 110, an optical lens element 130, a light blocking sheet 160 and a light-shielding layer 170 of the imaging lens assembly 100 according to FIG. 1A. FIG. 1D is a parameter schematic view of the imaging lens assembly 100 according to the 1st embodiment. In FIG. 1A to FIG. 1D, the imaging lens assembly 100 includes the plastic barrel 110 and an optical element set 120. The optical element set 120 includes the optical lens element 130, the light blocking sheet 160 and the light-shielding layer 170. Furthermore, the optical element set 120 includes a plurality of optical elements. Specifically, the optical element set 120 includes optical lens elements 130, 122, 123, 124, 125 and 126 in order from an object side za to an image side zb, and also includes the light blocking sheet 160, the light-shielding layer 170, at least one light blocking sheet 182, at least one spacer 183 and a retainer 184. At least one of the aforementioned optical elements of the optical element set 120 is disposed in the plastic barrel 110. Moreover, the imaging lens assembly 100 can be applicable to a camera module (not shown in drawings) of an electronic device (not shown in drawings). The object side za is a direction towards an imaged object (not shown in drawings) of the camera module and the imaging lens assembly 100 thereof. The image side zb is a direction towards an image surface 106 of the camera module and the imaging lens assembly 100 thereof. The image sensor 107 of the electronic device is disposed on the image surface 106.

Figure 1C:
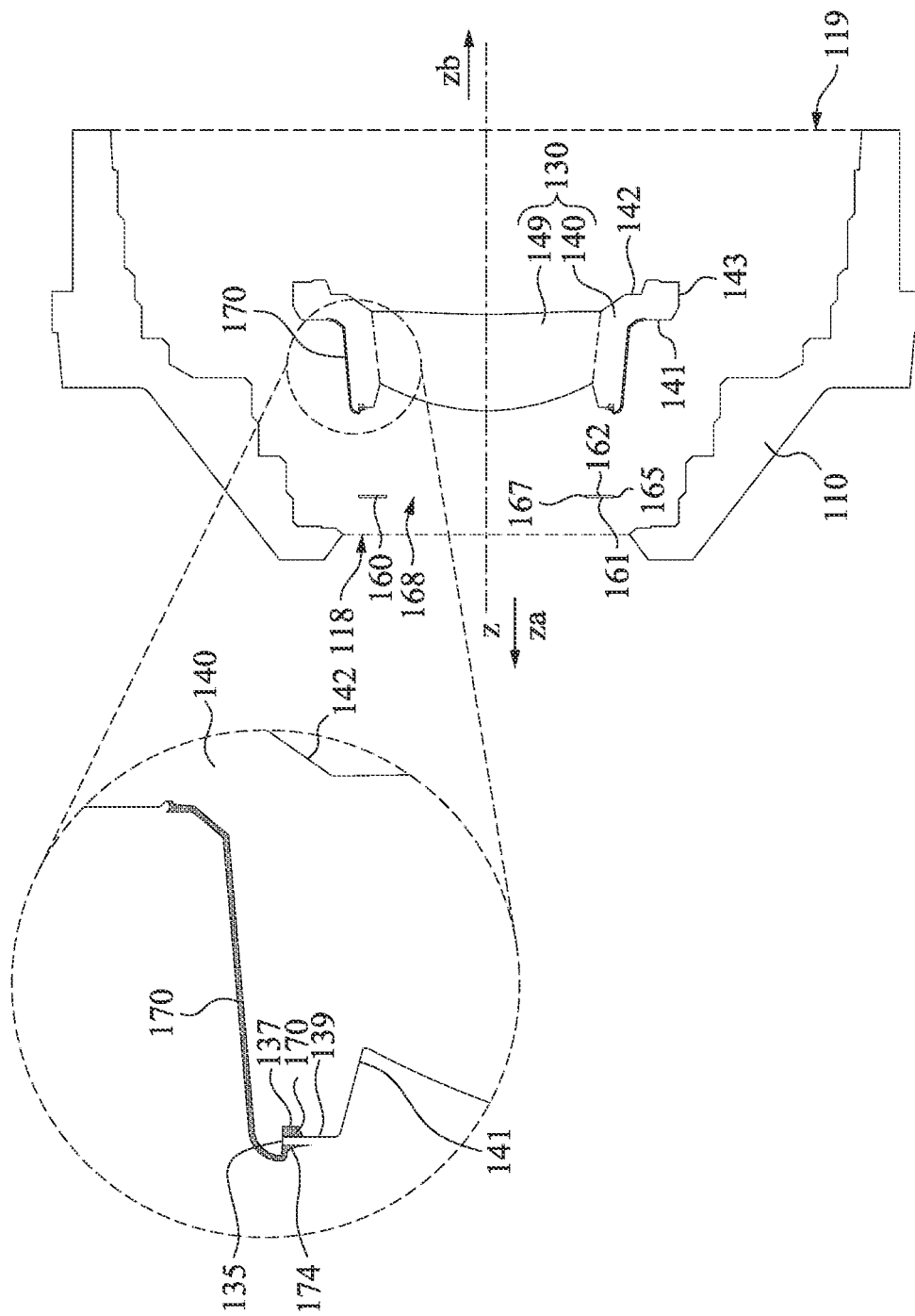
FIG. 1B is a parameter schematic view of part 1B in FIG. 1A.
FIG. 1D is a parameter schematic view of the imaging lens assembly according to the 1st embodiment.
FIG. 1E is a partially three-dimensional and cross-sectional view of the imaging lens assembly according to the 1st embodiment.
FIG. 1F is an exploded view according to FIG. 1E.
FIG. 1G is another partially three-dimensional and cross-sectional view of the imaging lens assembly according to the 1st embodiment.
FIG. 1H is an exploded view according to FIG. 1G.
Figure 1D:
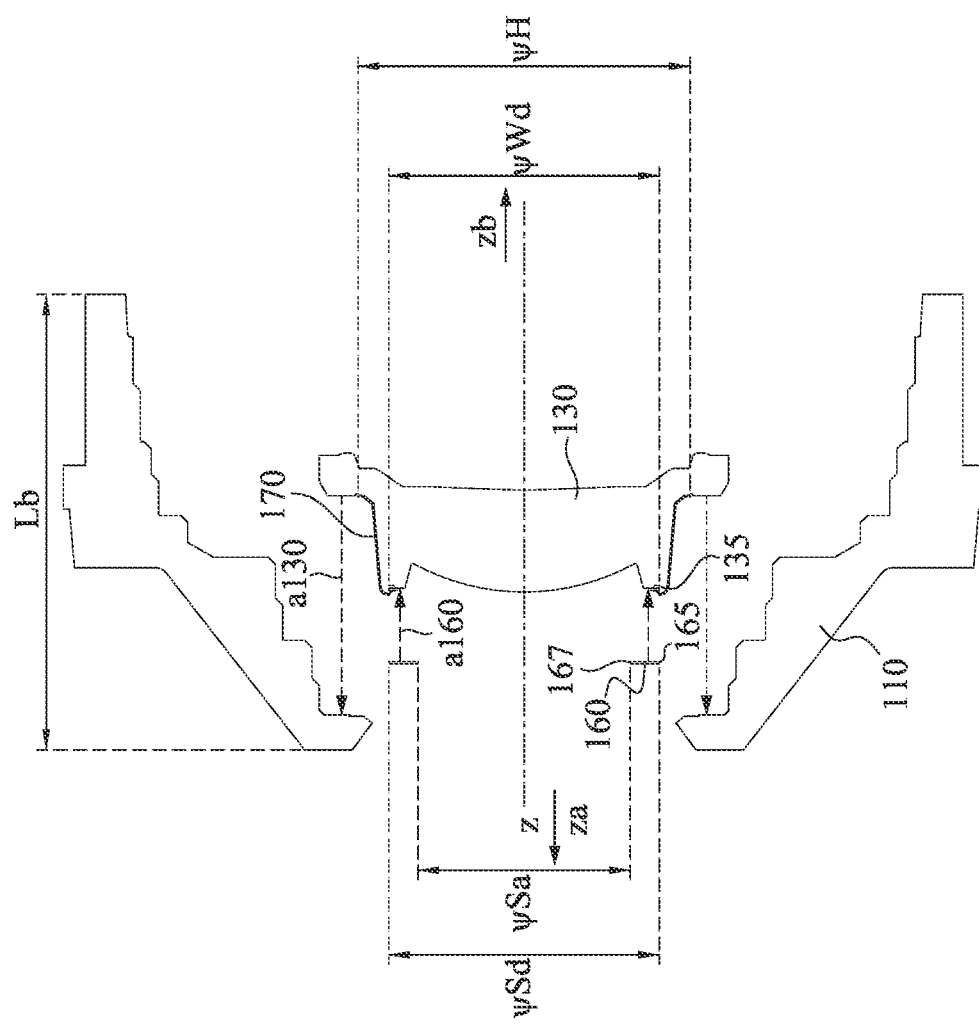
Figure 1E:
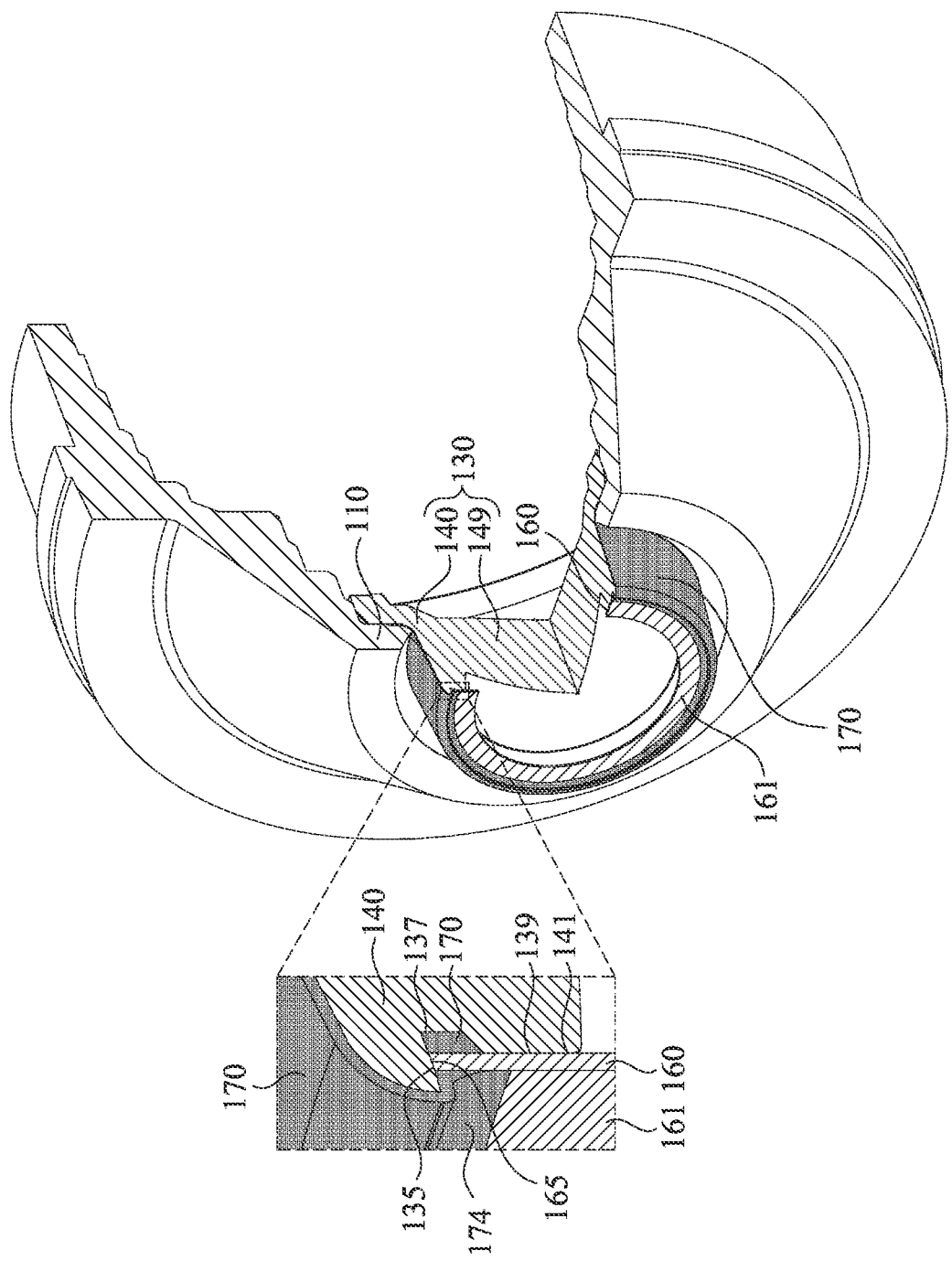
Figure 1F:
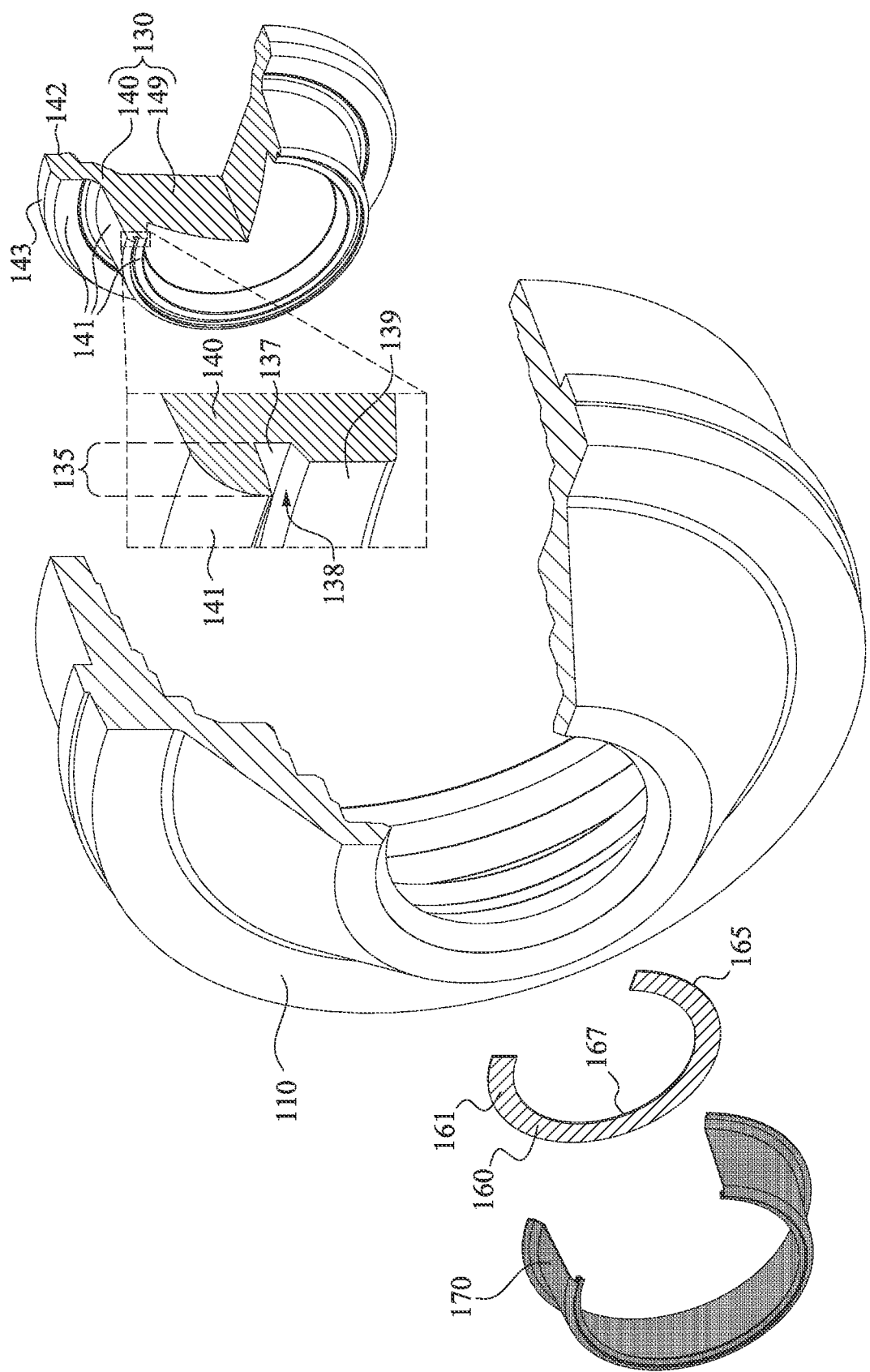
Figure 1G:
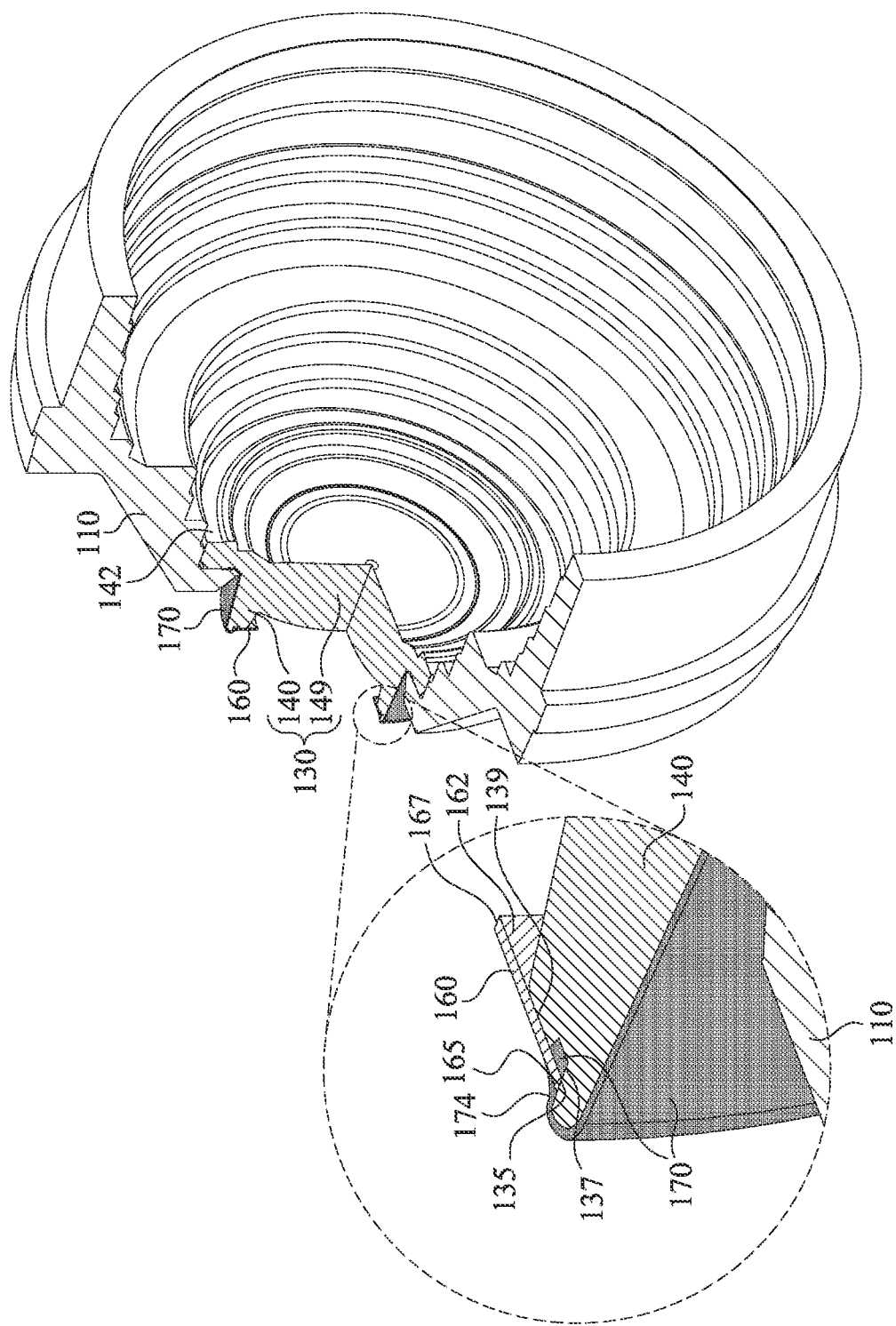
Figure 1H:
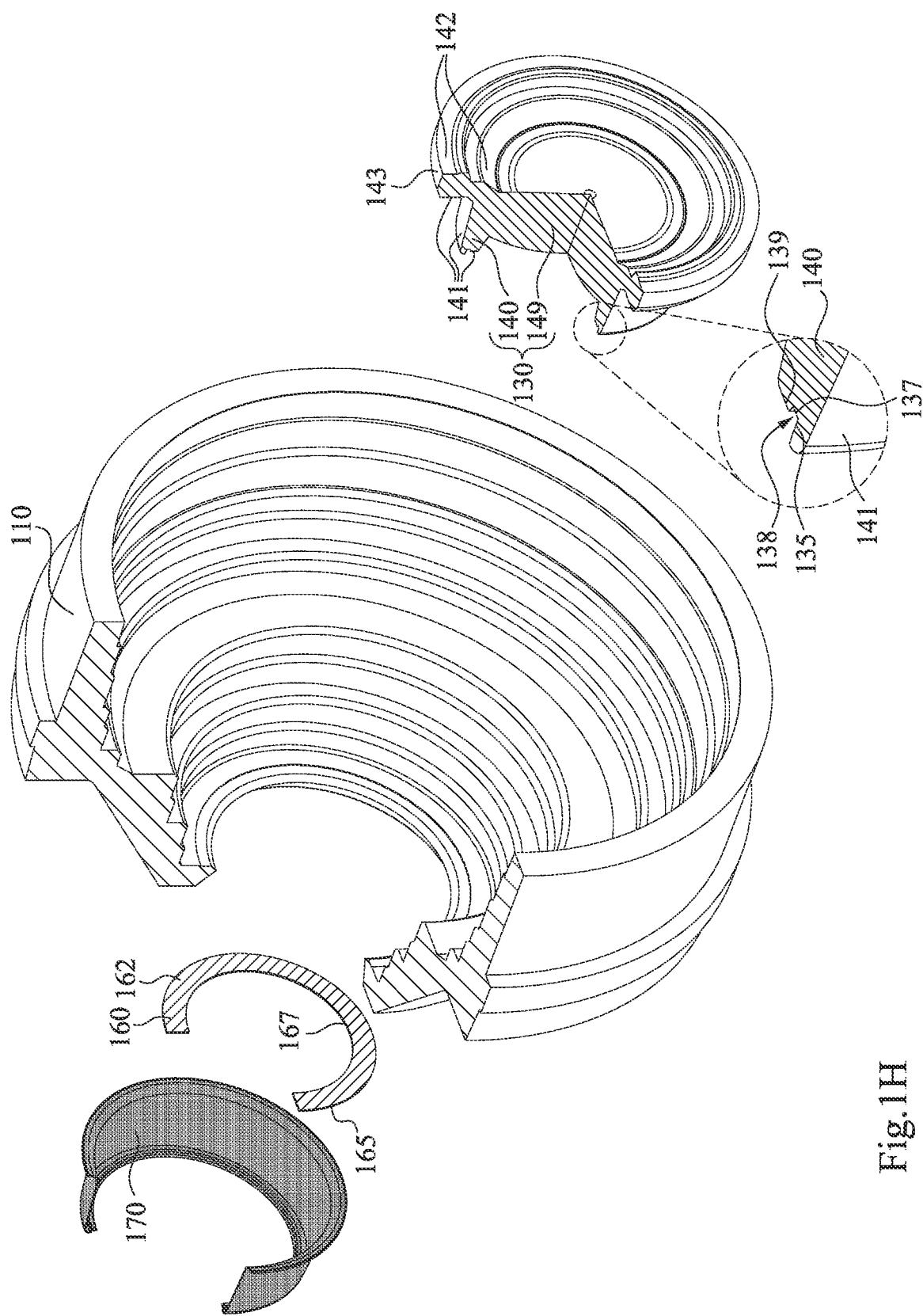

FIG. 1E is a three-dimensional and cross-sectional view of the plastic barrel 110, the optical lens element 130, the light blocking sheet 160 and the light-shielding layer 170 of the imaging lens assembly 100 according to the 1st embodiment. FIG. 1F is an exploded view according to FIG. 1E. FIG. 1G is another three-dimensional and cross-sectional view of the plastic barrel 110, the optical lens element 130, the light blocking sheet 160 and the light-shielding layer 170 of the imaging lens assembly 100 according to the 1st embodiment. FIG. 1H is an exploded view according to FIG. 1G. Furthermore, each of the plastic barrel 110, the light blocking sheet 160 and the light-shielding layer 170 is substantially in a closed and circularly annular shape. The optical lens element 130 is substantially in a circular plate shape with at least one of a convex surface and a concave surface. Each of FIG. 1E to FIG. 1H illustrates three-dimensional and cross-sectional view of two cross-sectional planes, which are vertical to each other and intersect at the optical axis z. The light blocking sheet 160 and the light-shielding layer 170 in FIG. 1A to FIG. 1H may be respectively marked with backslash lines and dots to clearly show the imaging lens assembly 100 according to the 1st embodiment of the present disclosure. In FIG. 1A to FIG. 1H, the optical lens element 130 includes an effective optical portion 149 and a peripheral portion 140 in order from a center to a periphery thereof. The optical axis z of the imaging lens assembly 100 passes through the effective optical portion 149. The peripheral portion 140 surrounds and is connected to the effective optical portion 149. The peripheral portion 140 includes an object-side peripheral surface 141 and an image-side peripheral surface 142. The object-side peripheral surface 141 faces towards the object side za. The image-side peripheral surface 142 faces towards the image side zb. At least one surface of the object-side peripheral surface 141 and the image-side peripheral surface 142 (it is the object-side peripheral surface 141 in the 1st embodiment specifically) includes an annular side wall 135, which is in a full-circle form (i.e., in a continuously annular shape, instead of being in an annular shape discretely arranged by a plurality of units) and extends along a direction parallel to the optical axis z.

The light blocking sheet 160 includes an object-side surface 161, an image-side surface 162, an annular abutting surface 165 and a central opening surface 167. The object-side surface 161 faces towards the object side za. The image-side surface 162 faces towards the image side zb. That is, the image-side surface 162 is located opposite to the object-side surface 161. The annular abutting surface 165 is connected between the object-side surface 161 and the image-side surface 162. The annular abutting surface 165 and the annular side wall 135 of the optical lens element 130 are disposed correspondingly to each other. The central opening surface 167 surrounds and forms a central opening 168 of the light blocking sheet 160. The central opening surface 167 is connected between the object-side surface 161 and the image-side surface 162. The central opening surface 167 is located closer to the optical axis z than the annular abutting surface 165 thereto. In the 1st embodiment, the image-side surface 162 of the light blocking sheet 160 and the object-side peripheral surface 141 of the optical lens element 130 are in physical contact. A portion of the annular side wall 135 of the optical lens element 130 is disposed closer to the object side za than the annular abutting surface 165 of the light blocking sheet 160 thereto. The annular side wall 135 includes a surface with a normal direction in a direction vertical to the optical axis z and a surface with a normal direction not in the direction vertical to the optical axis z, as shown in FIG. 1A and FIG. 1F.

In FIG. 1A to FIG. 1H, the light-shielding layer 170 surrounds the central opening 168 of the light blocking sheet 160 and includes an annular concave-curved portion 174. The annular concave-curved portion 174 is in an annular shape being concave-curved or forms a concave-curved ring. The light-shielding layer 170 extends from the peripheral portion 140 of the optical lens element 130 towards an outer diameter surface 143 of the optical lens element 130. The outer diameter surface 143 is connected between the object-side peripheral surface 141 and the image-side peripheral surface 142. The light-shielding layer 170 may be or may not be connected to the outer diameter surface 143. The annular concave-curved portion 174 is for retaining or fixedly disposing the light blocking sheet 160, so that there is no relative displacement in the direction parallel to the optical axis z between the annular abutting surface 165 of the light blocking sheet 160 and the annular side wall 135 of the optical lens element 130. In the 1st embodiment, the light-shielding layer 170 is connected to the object-side peripheral surface 141 of the optical lens element 130. The light-shielding layer 170 extends towards the outer diameter surface 143 of the peripheral portion 140 along the object-side peripheral surface 141. The light-shielding layer 170 is not connected to the outer diameter surface 143. The annular concave-curved portion 174 of the light-shielding layer 170 is disposed adjacent to the annular side wall 135 and is connected to the object-side surface 161 of the light blocking sheet 160.

Furthermore, the light-shielding layer 170 is originally in a liquid state, and has an opaque and attachment ability after curing so as to be deemed as a retaining element. In the 1st embodiment, each of the plastic barrel 110, the light blocking sheet 160 and the light-shielding layer 170 has an opaque property and may further be black.

The imaging lens assembly 100 of the present disclosure provides a light blocking manner designed on the optical lens element 130. That is, the light-shielding layer 170 is configured to retain or fixedly dispose the light blocking sheet 160 on a corresponding structure of the optical lens element 130 (the annular side wall 135 and the flat abutting section 139 thereof specifically). A light being closer to the optical axis z than an inner opening of the light-shielding layer 170 thereto is blocked by the light blocking sheet 160, and a light being farther from the optical axis z than the annular abutting surface 165 of the light blocking sheet 160 therefrom is blocked by the light-shielding layer 170. Thus, the light-shielding layer 170 extends to form a light blocking range that the light blocking sheet 160 cannot reach so as to substitute for the light blocking sheet 160. Specifically, the light-shielding layer 170 is connected to the light blocking sheet 160 and the minimum opening 118 of the plastic barrel 110. Each of the light blocking sheet 160 fixedly disposed on an ideal light blocking position by the light-shielding layer 170 and the optical lens element 130 coated by the light-shielding layer 170 merely can define the entrance pupil of the imaging lens assembly 100. However, the optical lens element 130 coated by the light-shielding layer 170 merely may results in a light reflection problem on an inner opening surface of the light-shielding layer 170. The light blocking sheet 160 attached to the optical lens element 130 by the light-shielding layer 170 is favorable for more easily controlling the surface property of the central opening 168 of the light blocking sheet 160 by improving manufacturing process, so as to mitigate the light reflection problem of the inner opening surface and enhance the effects of blocking stray light of the imaging lens assembly 100. Moreover, the light blocking sheet 160 retained or fixedly disposed correspondingly to the optical lens element 130 by the light-shielding layer 170 is advantageous in limiting the movable amount in the direction parallel to the optical axis z of the light blocking sheet 160. In addition, the peripheral portion 140 of the optical lens element 130 with the designed structural type itself or forming an air gap 190 with the plastic barrel 110 is favorable for accumulating the light-shielding layer 170 by capillary action, and further increasing the optical density of the light-shielding layer 170.

Furthermore, in another embodiment according to the present disclosure (not shown in drawings), an optical element set may include at least two optical lens elements, at least two light blocking sheets and at least two light-shielding layers. An annular abutting surface of each of the light blocking sheets and an annular side wall of a corresponding one the optical lens elements are disposed correspondingly to each other. Each of the light-shielding layers surrounds a central opening of a corresponding one of the light blocking sheets and includes an annular concave-curved portion. Each of the light-shielding layers extends from a peripheral portion of a corresponding one of the optical lens elements towards an outer diameter surface of the corresponding one of the optical lens elements. Moreover, each of an object-side peripheral surface and an image-side peripheral surface of an optical lens element of an optical element set may include an annular side wall. The optical element set further includes two light blocking sheets and two light-shielding layers. An annular abutting surface of each of the light blocking sheets and the annular side wall of a corresponding one of the object-side peripheral surface and the image-side peripheral surface are disposed correspondingly to each other. Each of the light-shielding layers is disposed correspondingly to the object-side peripheral surface or the image-side peripheral surface. Each of the light-shielding layers surrounds a central opening of a corresponding one of the light blocking sheets and includes an annular concave-curved portion. Each of the light-shielding layers extends from a corresponding one of the object-side peripheral surface and the image-side peripheral surface towards an outer diameter surface of the optical lens element.

In FIG. 1B to FIG. 1D, the plastic barrel 110 may include the minimum opening 118. When a maximum diameter of the light-shielding layer 170 is $\psi H$, a maximum diameter of the annular abutting surface 165 is $\psi Sd$, and a minimum diameter of the central opening surface 167 is $\psi Sa$, the following condition may be satisfied: $0.03<(\psi H-\psi Sd)/(\psi Sd-\psi Sa)<6.0$. Therefore, the peripheral portion 140 of the optical lens element 130 with the designed structural type or assembled with the plastic barrel 110 to form the air gap 190, which accommodates the light-shielding layer 170 is favorable for blocking light, retaining or fixedly disposing an optical element (e.g., the optical lens element 130), increasing the optical density of the light-shielding layer 170, enhancing the effects of blocking stray light on a non-optical-effective portion (i.e., the peripheral portion 140) of the optical lens element 130, and thereby maintaining a clear image. The light-shielding layer 170 is advantageous in extending the light blocking range for the light blocking sheet 160 and more adapting the specific spatial structure among the optical elements than the light blocking sheet 160. The imaging lens assembly 100 according to the present disclosure can fixedly dispose the light blocking sheet 160 in the ideally light blocking position without designing fitting structures among the optical lens elements. In addition, the imaging lens assembly 100 is featured with a light blocking design of a front end (i.e., the object side za) of a telephoto lens assembly, and the plastic barrel 110 thereof is featured with a barrel design of a small object end (i.e., the object side za).

Furthermore, the following condition may be satisfied by the imaging lens assembly 100 of the 1st embodiment: $1.0<(\psi H-\psi Sd)/(\psi Sd-\psi Sa)<5.0$. Therefore, the light blocking range can extend from the light blocking sheet 160 to more regions, which are more away from the optical axis z and not easily implemented by the light blocking sheet 160, so as to provide a more ideal design to block the unnecessary light. Moreover, a roundness of the central opening 168 of the light blocking sheet 160 can compensate the optical shortages of the light reflection problem of the inner opening surface of the light-shielding layer 170, so that the surface optical property of light reflection of the light-shielding layer 170 can be controlled and improved by a manufacturing process of the central opening 168 of the light blocking sheet 160.

The embodiments according to the present disclosure, the parameter $\psi H$ is a largest one among all diameters passing through the optical axis z of the light-shielding layer 170 especially while the light-shielding layer 170 having a non-circular outer circumference. The parameter $\psi Sd$ is a largest one among all diameters passing through the optical axis z of the annular abutting surface 165 especially while the annular abutting surface 165 being in a non-circular annular shape. The parameter $\psi Sa$ is a smallest one among all diameters passing through the optical axis z of the central opening surface 167 especially while the central opening surface 167 being in a non-circular annular shape. In addition, as shown in FIG. 1B, the parameter "$(\psi H-\psi Sd)/2$" is a distance along the direction vertical to the optical axis z corresponding to the maximum diameter between the annular abutting surface 165 and the light-shielding layer 170. The parameter "$(\psi Sd-\psi Sa)/2$" is a width along the direction vertical to the optical axis z of the light blocking sheet 160.

In FIG. 1A to FIG. 1D, the plastic barrel 110 may include a maximum opening 119. When a length along the direction parallel to the optical axis z of the light-shielding layer 170 is L, and a length along the direction parallel to the optical axis z of the plastic barrel 110 is Lb, the following condition may be satisfied: $0.0<L/Lb<0.5$. Furthermore, the following condition may be satisfied: $0.1<L/Lb<0.4$. Therefore, a proper coating range of the light-shielding layer 170 results in higher manufacturing and assembling yield rates.

In detail, when the maximum diameter of the light-shielding layer 170 is LIM, the maximum diameter of the annular abutting surface 165 is $\psi Sd$, and the minimum diameter of the central opening surface 167 is $\psi Sa$, the following condition may be satisfied: $0.1<[\psi H/(\psi Sd-\psi Sa)]/\pi^2<5.0$. Therefore, a proper coating range of the light-shielding layer 170 is advantageous in increasing the stray light blocking effects.

In FIG. 1A to FIG. 1H, the annular abutting surface 165 of the light blocking sheet 160 and the annular side wall 135 of the optical lens element 130 may be assembled correspondingly to each other to be aligned with the optical axis z. Therefore, it is favorable for increasing the yield rate of assembling the optical lens element 130 and the light blocking sheet 160 so as to more control the position offset degrees of the light blocking sheet 160. Specifically, at least one portion of the annular side wall 135 of the optical lens element 130 is connected or physically contacts the annular abutting surface 165 so as to accommodate the light blocking sheet 160. A position in the direction vertical to the optical axis z and the moveable amount of the light blocking sheet 160 can be defined by the annular side wall 135 of the optical lens element 130.

The annular concave-curved portion 174 of the light-shielding layer 170 may be recessed towards the annular abutting surface 165 of the light blocking sheet 160. Therefore, it is favorable for retaining or fixedly disposing the light blocking sheet 160 by the light-shielding layer 170.

In FIG. 1D, when a minimum diameter of the annular side wall 135 is ψWd, and the maximum diameter of the annular abutting surface 165 is ψSd, the following condition may be satisfied: 0.0 mm≤ψWd−ψSd<0.04 mm. Therefore, a proper diameter range of the annular side wall 135 is advantageous in more controlling the position offset degrees of the light blocking sheet 160 after being assembled. Furthermore, the following condition may be satisfied: 0.005 mm<ψWd−ψSd<0.03 mm. In the 1st embodiment, a value of the parameter ψWd and a value of the parameter ψSd are the same in an engineering design phase. In addition, a cooperated air spacing between the annular side wall 135 and the annular abutting surface 165 can be fine-tuned in accordance with the tolerances of the parameters ψWd and ψSd. That is, a value of "ψWd−ψSd" is not equal to zero.

In FIG. 1A to FIG. 1H, the surface of the object-side peripheral surface 141 and the image-side peripheral surface 142 of the peripheral portion 140 (i.e., the object-side peripheral surface 141) may further include a flat abutting section 139 and an annular groove structure 137. The flat abutting section 139 extends along the direction vertical to the optical axis z, and a normal direction of the flat abutting section 139 is the direction parallel to the optical axis z, specifically. The flat abutting section 139 is located closer to the effective optical portion 149 than the annular side wall 135 thereto. The flat abutting section 139 and the light blocking sheet 160 are in physical contact. The annular groove structure 137 is in a full-circle form. The annular groove structure 137 is connected between the annular side wall 135 and the flat abutting section 139. The annular groove structure 137 is located farther from the effective optical portion 149 than the flat abutting section 139 therefrom. The annular groove structure 137 is recessed from the surface of the object-side peripheral surface 141 and the image-side peripheral surface 142 (i.e., the object-side peripheral surface 141) towards the other surface thereof (i.e., the image-side peripheral surface 142) to form an accommodating space 138. At least one portion of the light-shielding layer 170 is configured in the accommodating space 138. Therefore, the flat abutting section 139 is advantageous in effectively controlling the actual position of the light blocking sheet 160 configured in the imaging lens assembly 100 so as to enhance the optical quality of the imaging lens assembly 100. The annular groove structure 137 is beneficial to prevent the light-shielding layer 170 from overflowing to an optical element adjacent thereto while the light-shielding layer 170 being over dispensed. Furthermore, the flat abutting section 139 is configured for adjusting the match degrees between the annular abutting surface 165 of the light blocking sheet 160 and the annular side wall 135 of the optical lens element 130, which are located correspondingly to each other. The annular groove structure 137 provides an accumulating space for the light-shielding layer 170 so as to receive an excessive portion of the light-shielding layer 170 and increase the attachment ability between the light blocking sheet 160 and the flat abutting section 139. In the 1st embodiment, the object-side peripheral surface 141 includes the flat abutting section 139, the annular groove structure 137 and the annular side wall 135, in order from the center to the periphery of the optical lens element 130.

In FIG. 1A, the annular side wall 135 of the optical lens element 130 and the annular abutting surface 165 of the light blocking sheet 160 may be overlapped along the direction vertical to the optical axis z. The plastic barrel 110 and at least one portion of the light-shielding layer 170 may not be overlapped along the direction parallel to the optical axis z. Therefore, the structural type of the optical lens element 130 cannot be spatially limited by the structure of the plastic barrel 110. In the 1st embodiment, the annular side wall 135 of the optical lens element 130 and the annular abutting surface 165 of the light blocking sheet 160 are overlapped along the direction vertical to the optical axis z. Specifically, a distance between a position closest to the image surface 106 of the annular side wall 135 and the image surface 106 is the same as or similar to a distance between a position closest to the image surface 106 of the annular abutting surface 165 and the image surface 106. Further in the 1st embodiment, the plastic barrel 110 and at least one portion of the light-shielding layer 170 (i.e., a portion of the light-shielding layer 170 that is located closer to the optical axis z than the minimum opening 118 thereto) are not overlapped along the direction parallel to the optical axis z. Specifically, the portion of the light-shielding layer 170 that is located closer to the optical axis z than the minimum opening 118 thereto is protruded towards the optical axis z and away from the minimum opening 118, so that the light-shielding layer 170 can extend to form the light blocking range to substitute for the light blocking sheet 160.

At least one optical element of the optical element set 120 (e.g., the optical lens elements 130, 122, 123, 124, 125 and 126) may be disposed in the plastic barrel 110, and any optical element of the optical element set 120 is connected to or physically contacts at least one of the plastic barrel 110 and another optical element thereof. The light-shielding layer 170 is for retaining the optical lens element 130 in the plastic barrel 110. In the enlarged view of FIG. 1A, the light-shielding layer 170 in the 1st embodiment is interposed between the plastic barrel 110 and the peripheral portion 140 of the optical lens element 130 (the object-side peripheral surface 141, specifically). The plastic barrel 110, the light-shielding layer 170 and the peripheral portion 140 of the optical lens element 130 are arranged and stacked along the direction parallel to the optical axis z in order from the object side za to the image side zb. The light-shielding layer 170 is for retaining the light blocking sheet 160 with the optical lens element 130, and for retaining the optical lens element 130 in the plastic barrel 110. The light blocking sheet 160 is retained with the optical lens element 130, which is closest to the object side za of the optical element set 120, by the light-shielding layer 170, so that the light blocking sheet 160 can determine the light beam width incident into the imaging lens assembly 100.

In FIG. 1A to FIG. 1O, at least one portion of the light-shielding layer 170 may be connected to the minimum opening 118 of the plastic barrel 110. Therefore, the cooperation between the light-shielding layer 170 with the flow property of the capillary action and the minimum opening 118 of the plastic barrel 110 is favorable for enlarging the extension range of the light-shielding layer 170 so as to add a light blocking effect under the ordinary coating procedure.

The air gap 190 may be formed between the peripheral portion 140 of the optical lens element 130 (the object-side peripheral surface 141, specifically) and the plastic barrel 110, and at least one portion of the light-shielding layer 170 is configured in the air gap 190. Therefore, the air gap 190 has two effects, which are accommodating the light-shielding layer 170 and increasing the attachment ability of the light-shielding layer 170. In the 1st embodiment, the light-shielding layer 170 is filled in the air gap 190 and annularly surrounds the optical lens element 130 so as to retain the optical lens element 130 of the optical element set 120 in the plastic barrel 110.

In an assembling procedure of the imaging lens assembly 100, as shown in FIG. 1D, after the light blocking sheet 160 (with an assembling direction a160), the optical lens element 130 (with an assembling direction a130) and the plastic barrel 110 are allocated at the respective assembling positions, the light blocking sheet 160, the optical lens element 130 and the plastic barrel 110 are connected with the light-shielding layer 170 in the liquid state, the light-shielding layer 170 in the liquid state flows into the accommodating space 138 via the air spacing, which is predetermined or resulted from the assembling tolerances between the annular side wall 135 of the optical lens element 130 and the annular abutting surface 165 of the light blocking sheet 160, and thereby at least one portion of the light-shielding layer 170 is configured in the accommodating space 138. Next, the light-shielding layer 170 after curing is configured to retain or fixedly dispose the light blocking sheet 160 with the optical lens element 130, and to retain or fixedly dispose the optical lens element 130 in the plastic barrel 110. Furthermore, other assembling details for the optical elements of the optical element set 120 are omitted herein, and the assembling manners of the imaging lens assembly 100 of the 1st embodiment are not limited by the statements in this paragraph.

In FIG. 1A and FIG. 1B, a portion of the light-shielding layer 170 (e.g., a portion of the light-shielding layer 170 located on the object side za with respect to the light blocking sheet 160) and another portion of the light-shielding layer 170 (e.g., a portion of the light-shielding layer 170 located on the image side zb with respect to the light blocking sheet 160) are overlapped along the direction parallel to the optical axis z. Specifically, the portion of the light-shielding layer 170 and the another portion thereof aforementioned in this paragraph cover a portion of the light blocking sheet 160 that is located away from the optical axis z.

Moreover, at least one portion of the light-shielding layer 170 (e.g., two portions of the light-shielding layer 170 respectively located on the object side za and the image side zb with respect to the light blocking sheet 160) and another portion of the light-shielding layer 170 (e.g., a portion of the light-shielding layer 170 located farther from the optical axis z than the light blocking sheet 160 therefrom) are overlapped along the direction vertical to the optical axis z. Specifically, the two portions of the light-shielding layer 170 and the another portion thereof aforementioned in this paragraph cover a portion of the peripheral portion 140 that is located close to the object side za.

The data of the aforementioned parameters of the imaging lens assembly 100 according to the 1st embodiment of the present disclosure are listed in the following Table 1, and the parameters are also shown in FIG. 1B and FIG. 1D.

TABLE 1

1st Embodiment

| | | | |
|---|---|---|---|
| ψSa (mm) | 1.45 | Lb (mm) | 3.12 |
| ψSd (mm) | 1.85 | (ψH − ψSd)/(ψSd − ψSa) | 1.1 |
| ψWd (mm) | 1.85 | [ψH/(ψSd − ψSa)]/π² | 0.58 |
| ψH (mm) | 2.29 | ψWd − ψSd (mm) | 0 |
| L (mm) | 0.69 | L/Lb | 0.22 |

2nd Embodiment

Figure 2A:
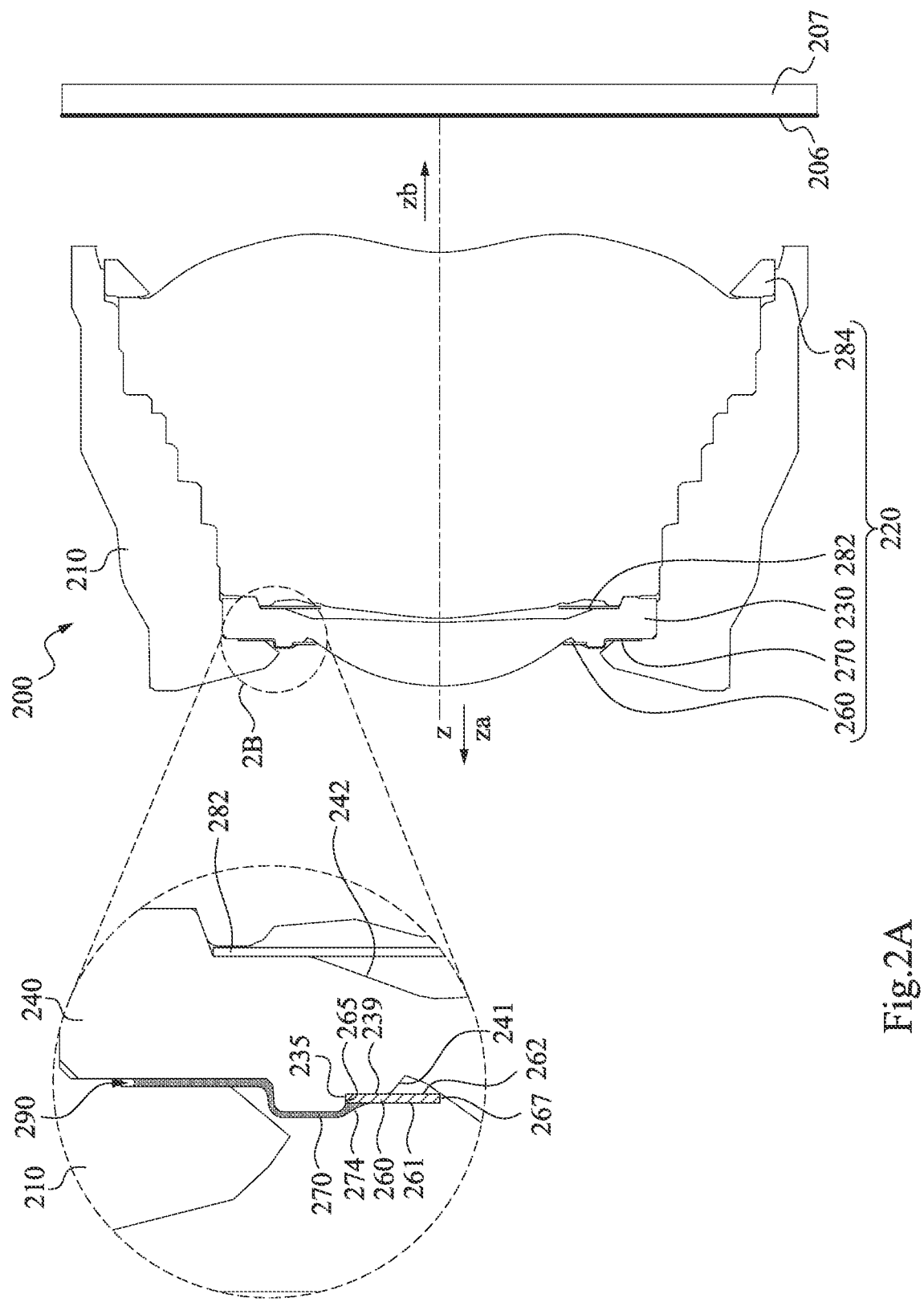
FIG. 2A is a schematic view of an imaging lens assembly according to the 2nd embodiment of the present disclosure and an image sensor.
Figure 2C:
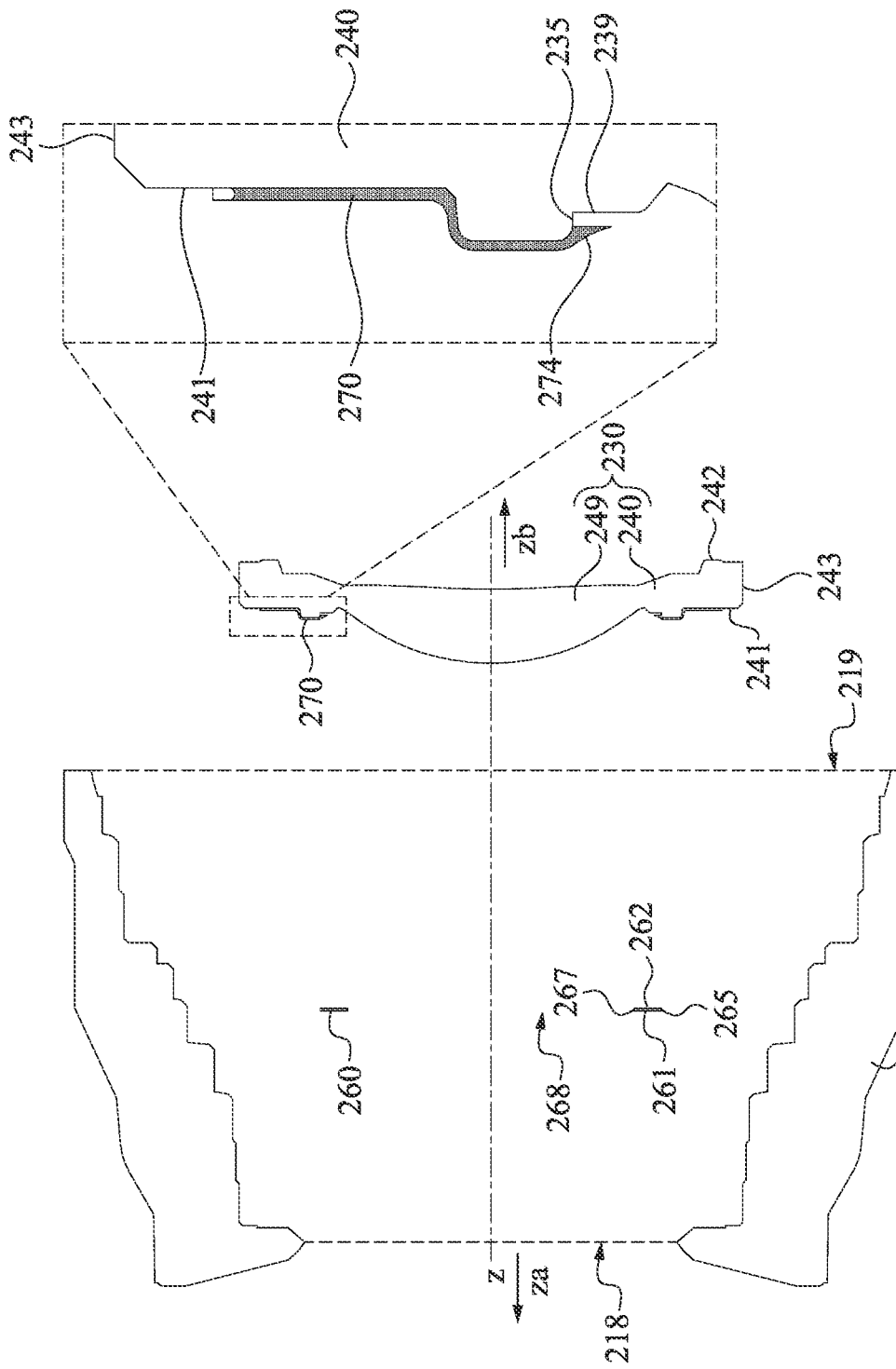
FIG. 2C is a partially exploded view of the imaging lens assembly according to FIG. 2A.
Figure 2D:
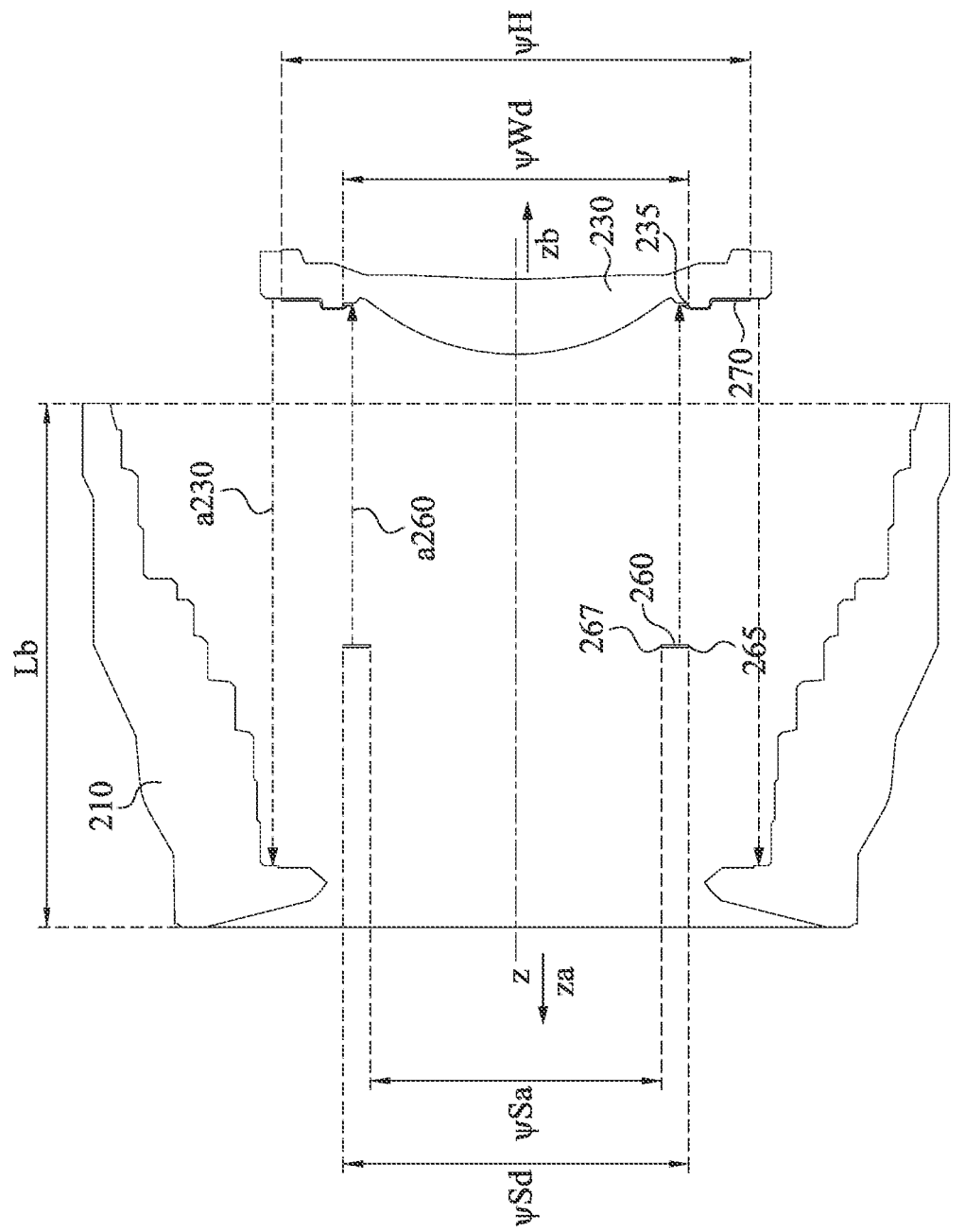
FIG. 2D is a parameter schematic view of the imaging lens assembly according to the 2nd embodiment.

FIG. 2A is a schematic view of an imaging lens assembly 200 according to the 2nd embodiment of the present disclosure and an image sensor 207, and FIG. 2A is a cross-sectional view along a plane, on which an optical axis z is located, of the imaging lens assembly 200. FIG. 2B is a parameter schematic view of part 2B in FIG. 2A. FIG. 2C is an exploded view of a plastic barrel 210, an optical lens element 230, a light blocking sheet 260 and a light-shielding layer 270 of the imaging lens assembly 200 according to FIG. 2A. FIG. 2D is a parameter schematic view of the imaging lens assembly 200 according to the 2nd embodiment. In FIG. 2A to FIG. 2D, the imaging lens assembly 200 includes the plastic barrel 210 and an optical element set 220. The optical element set 220 includes the optical lens element 230, the light blocking sheet 260 and the light-shielding layer 270. Furthermore, the optical element set 220 includes a plurality of optical elements. Specifically, the optical element set 220 includes the optical lens element 230 and at least one another optical lens element (not specifically shown in drawings). The optical lens element 230 is an optical lens element closest to an object side za of the optical element set 220. The optical element set 220 also includes the light blocking sheet 260, the light-shielding layer 270, a light blocking sheet 282 and a retainer 284. All optical elements of the optical element set 220 are disposed in the plastic barrel 210. Moreover, the imaging lens assembly 200 can be applicable to a camera module (not shown in drawings) of an electronic device (not shown in drawings). The image sensor 207 of the electronic device is disposed on an image surface 206.

Figure 2E:
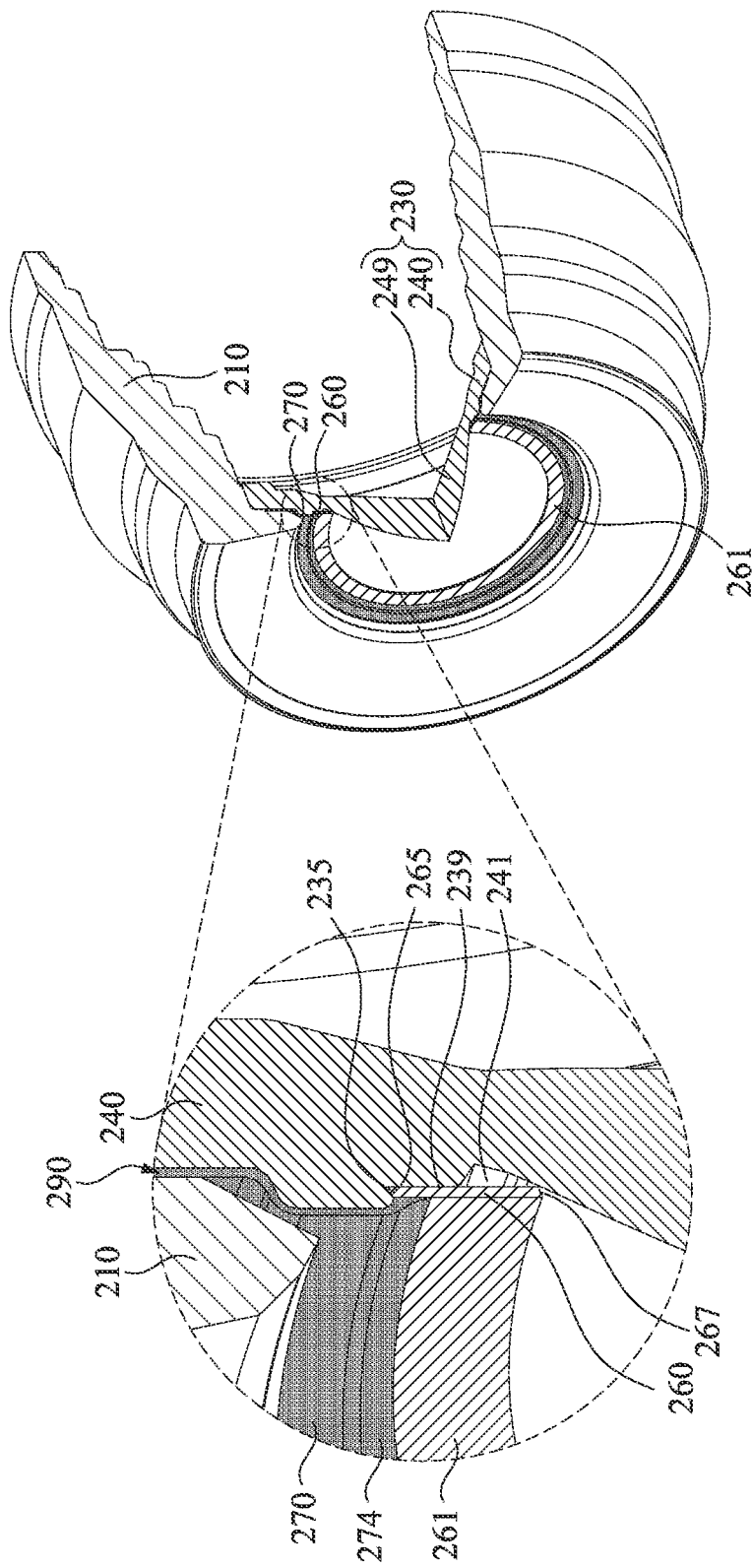
FIG. 2E is a partially three-dimensional and cross-sectional view of the imaging lens assembly according to the 2nd embodiment.
Figure 2F:
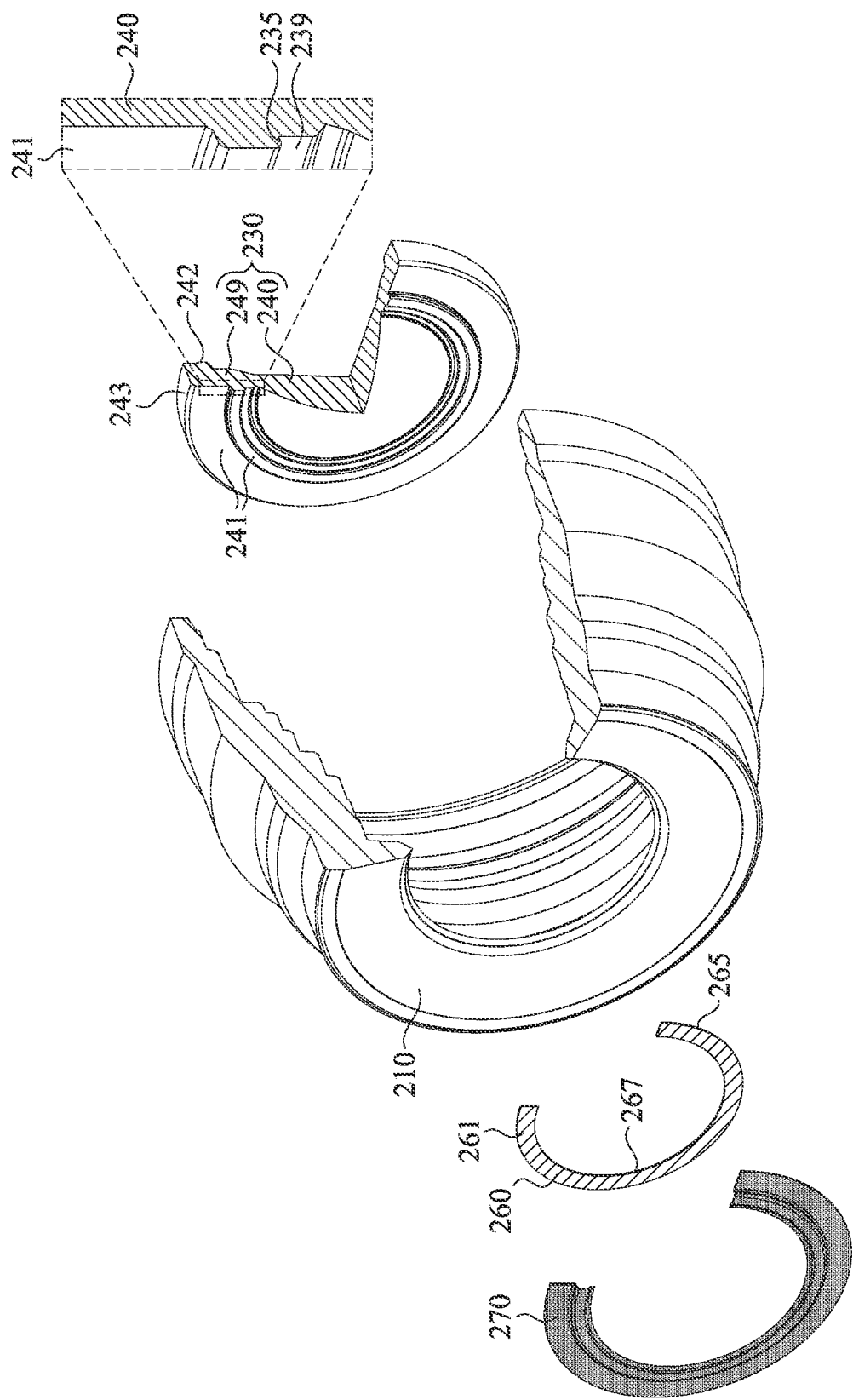
FIG. 2F is an exploded view according to FIG. 2E.
Figure 2G:
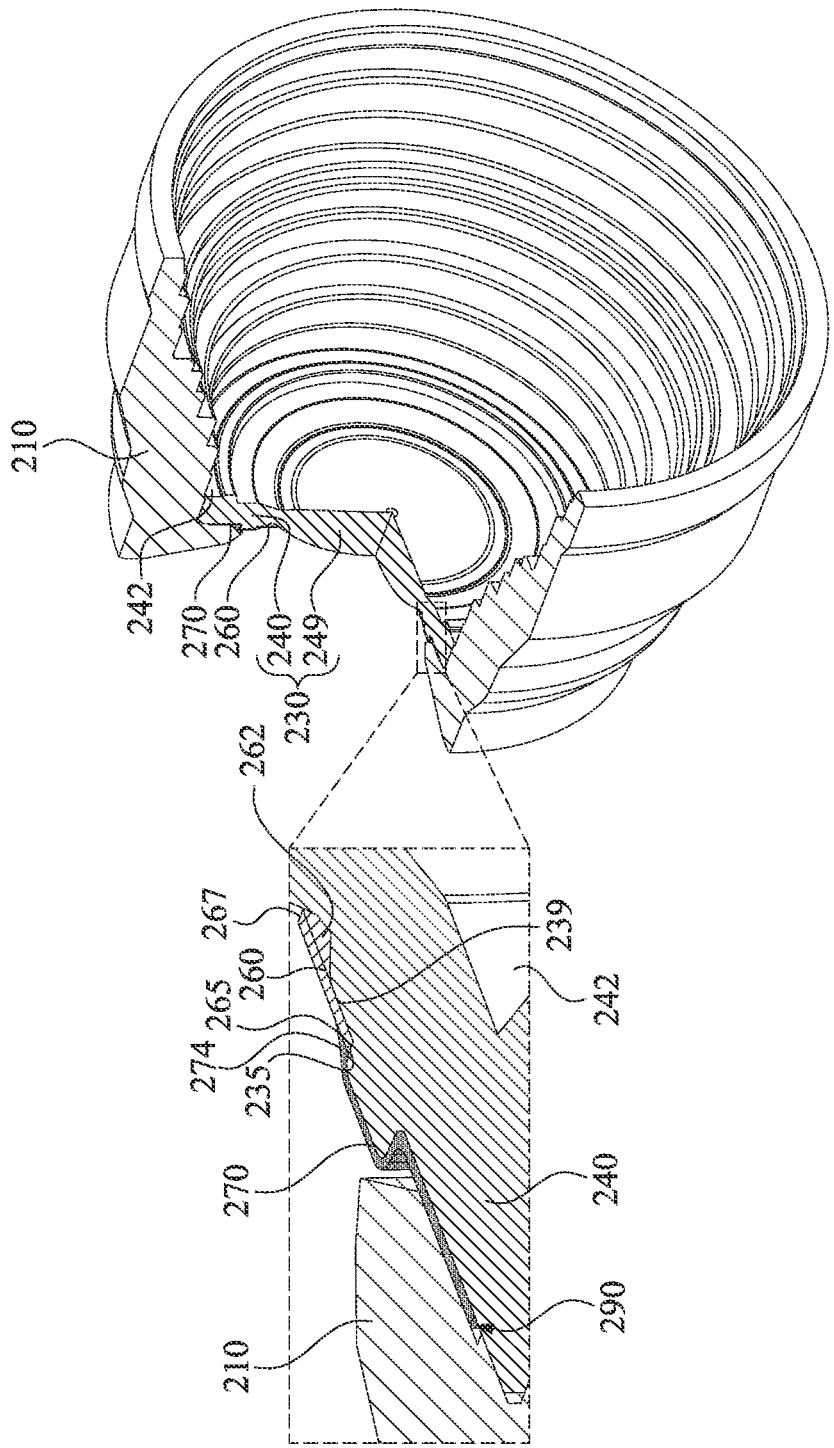
FIG. 2G is another partially three-dimensional and cross-sectional view of the imaging lens assembly according to the 2nd embodiment.
Figure 2H:
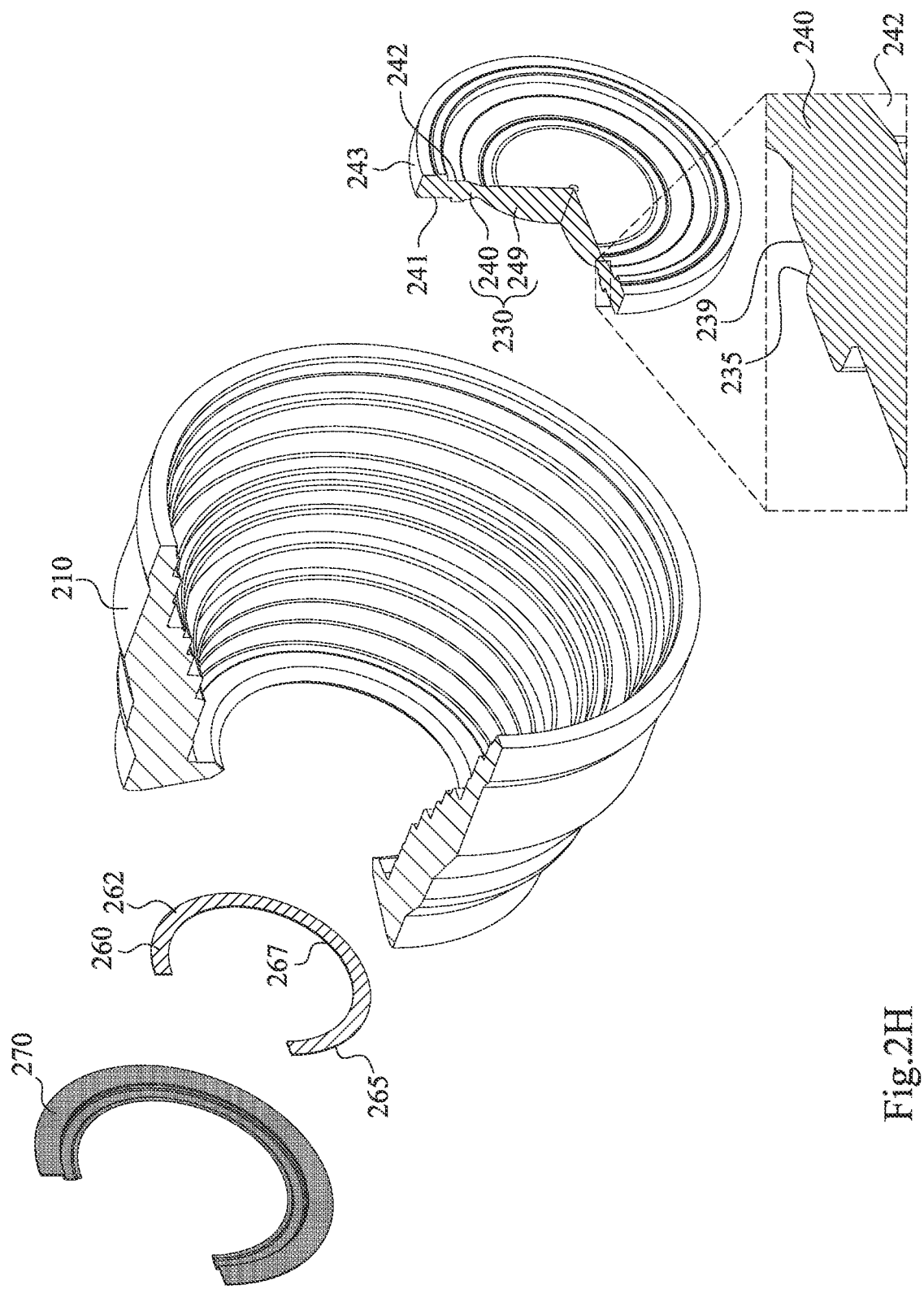
FIG. 2H is an exploded view according to FIG. 2G.

FIG. 2E is a three-dimensional and cross-sectional view of the plastic barrel 210, the optical lens element 230, the light blocking sheet 260 and the light-shielding layer 270 of the imaging lens assembly 200 according to the 2nd embodiment. FIG. 2F is an exploded view according to FIG. 2E. FIG. 2G is another three-dimensional and cross-sectional view of the plastic barrel 210, the optical lens element 230, the light blocking sheet 260 and the light-shielding layer 270 of the imaging lens assembly 200 according to the 2nd embodiment. FIG. 2H is an exploded view according to FIG. 2G. Furthermore, each of the plastic barrel 210, the light blocking sheet 260 and the light-shielding layer 270 is substantially in a closed and circularly annular shape. The optical lens element 230 is substantially in a circular plate shape with at least one of a convex surface and a concave surface. Each of FIG. 2E to FIG. 2H illustrates three-dimensional and cross-sectional view of two cross-sectional planes, which are vertical to each other and intersect at the optical axis z. The light blocking sheet 260 and the light-shielding layer 270 in FIG. 2A to FIG. 2H may be respectively marked with backslash lines and dots to clearly show the imaging lens assembly 200 according to the 2nd embodiment of the present disclosure. In FIG. 2A to FIG. 2H, the optical lens element 230 includes an effective optical portion 249 and a peripheral portion 240 in order from a center to a periphery thereof. The optical axis z of the imaging lens assembly 200 passes through the effective optical portion 249. The peripheral portion 240 surrounds and is connected to the effective optical portion 249. The peripheral portion 240 includes an object-side peripheral surface 241 and an image-side peripheral surface 242. The object-side peripheral surface 241 faces towards the object side za. The image-side peripheral surface 242 faces towards the image side zb. The object-side peripheral surface 241 includes an annular side wall 235, which is in a full-circle form and extends along a direction parallel to the optical axis z.

The light blocking sheet 260 includes an object-side surface 261, an image-side surface 262, an annular abutting surface 265 and a central opening surface 267. The object-side surface 261 faces towards the object side za. The image-side surface 262 faces towards the image side zb. That is, the image-side surface 262 is located opposite to the object-side surface 261. The annular abutting surface 265 is connected between the object-side surface 261 and the image-side surface 262. The annular abutting surface 265 and the annular side wall 235 of the optical lens element 230 are disposed correspondingly to each other. The central opening surface 267 surrounds and forms a central opening 268 of the light blocking sheet 260. The central opening surface 267 is connected between the object-side surface 261 and the image-side surface 262. The central opening surface 267 is located closer to the optical axis z than the annular abutting surface 265 thereto. In the 2nd embodiment, the image-side surface 262 of the light blocking sheet 260 and the object-side peripheral surface 241 of the optical lens element 230 are in physical contact.

In FIG. 2A to FIG. 2H, the light-shielding layer 270 surrounds the central opening 268 of the light blocking sheet 260 and includes an annular concave-curved portion 274. The annular concave-curved portion 274 is in an annular shape being concave-curved. The light-shielding layer 270 extends from the peripheral portion 240 of the optical lens element 230 towards an outer diameter surface 243 of the optical lens element 230. The outer diameter surface 243 is connected between the object-side peripheral surface 241 and the image-side peripheral surface 242. The annular concave-curved portion 274 is for retaining or fixedly disposing the light blocking sheet 260, so that there is no relative displacement in the direction parallel to the optical axis z between the annular abutting surface 265 of the light blocking sheet 260 and the annular side wall 235 of the optical lens element 230. In the 2nd embodiment, the light-shielding layer 270 is connected to the object-side peripheral surface 241 of the optical lens element 230. The light-shielding layer 270 extends towards the outer diameter surface 243 of the peripheral portion 240 along the object-side peripheral surface 241. The light-shielding layer 270 is not connected to the outer diameter surface 243. The annular concave-curved portion 274 of the light-shielding layer 270 is connected to or disposed adjacent to the annular side wall 235 and is connected to the object-side surface 261 of the light blocking sheet 260.

In the 2nd embodiment, a light being closer to the optical axis z than an inner opening of the light-shielding layer 270 thereto is blocked by the light blocking sheet 260, and a light being farther from the optical axis z than the annular abutting surface 265 of the light blocking sheet 260 therefrom is blocked by the light-shielding layer 270. Thus, the light-shielding layer 270 extends to form a light blocking range that the light blocking sheet 260 cannot reach so as to substitute for the light blocking sheet 260. Specifically, the light-shielding layer 270 is connected to the light blocking sheet 260 and the plastic barrel 210. The light blocking sheet 260 is attached to the optical lens element 230 by the light-shielding layer 270.

In FIG. 2A to FIG. 2H, the plastic barrel 210 includes a minimum opening 218 and a maximum opening 219. The annular abutting surface 265 of the light blocking sheet 260 and the annular side wall 235 of the optical lens element 230 are assembled correspondingly to each other to be aligned with the optical axis z. The annular concave-curved portion 274 of the light-shielding layer 270 is recessed towards the annular abutting surface 265 of the light blocking sheet 260.

The object-side peripheral surface 241 of the peripheral portion 240 further includes a flat abutting section 239. The flat abutting section 239 extends along a direction vertical to the optical axis z, and a normal direction of the flat abutting section 239 is the direction parallel to the optical axis z, specifically. The flat abutting section 239 is located closer to the effective optical portion 249 than the annular side wall 235 thereto. The flat abutting section 239 and the image-side surface 262 of the light blocking sheet 260 are in physical contact.

In FIG. 2A, the annular side wall 235 of the optical lens element 230 and the annular abutting surface 265 of the light blocking sheet 260 are overlapped along the direction vertical to the optical axis z. Specifically, a distance between a position closest to the image surface 206 of the annular side wall 235 and the image surface 206 is the same as or similar to a distance between a position closest to the image surface 206 of the annular abutting surface 265 and the image surface 206. The plastic barrel 210 and at least one portion of the light-shielding layer 270 (i.e., a portion of the light-shielding layer 270 that is located closer to the optical axis z than the minimum opening 218 thereto) are not overlapped along the direction parallel to the optical axis z. Specifically, the portion of the light-shielding layer 270 that is located closer to the optical axis z than the minimum opening 218 thereto is protruded towards the optical axis z and away from the minimum opening 218, so that the light-shielding layer 270 can extend to form the light blocking range to substitute for the light blocking sheet 260.

All optical elements of the optical element set 220 are disposed in the plastic barrel 210, and any optical element of the optical element set 220 is connected to or physically contacts at least one of the plastic barrel 210 and another optical element thereof. The light-shielding layer 270 is for retaining the optical lens element 230 in the plastic barrel 210. In the enlarged view of FIG. 2A, the light-shielding layer 270 in the 2nd embodiment is interposed between the plastic barrel 210 and the peripheral portion 240 of the optical lens element 230 (the object-side peripheral surface 241, specifically). The plastic barrel 210, the light-shielding layer 270 and the peripheral portion 240 of the optical lens element 230 are arranged and stacked along the direction parallel to the optical axis z in order from the object side za to the image side zb. The light-shielding layer 270 is for retaining the light blocking sheet 260 with the optical lens element 230, and for retaining the optical lens element 230 in the plastic barrel 210. The light blocking sheet 260 is retained with the optical lens element 230, which is closest to the object side za of the optical element set 220, by the light-shielding layer 270, so that the light blocking sheet 260 can determine the light beam width incident into the imaging lens assembly 200.

In FIG. 2A to FIG. 2H, an air gap 290 is formed between the peripheral portion 240 of the optical lens element 230 (the object-side peripheral surface 241, specifically) and the plastic barrel 210, and at least one portion of the light-shielding layer 270 is configured in the air gap 290.

In an assembling procedure of the imaging lens assembly 200, as shown in FIG. 2D, after the light blocking sheet 260 (with an assembling direction a260), the optical lens element 230 (with an assembling direction a230) and the plastic barrel 210 are allocated at the respective assembling positions, the light blocking sheet 260, the optical lens element 230 and the plastic barrel 210 are connected with the light-shielding layer 270 in the liquid state. Next, the light-shielding layer 270 after curing is configured to retain or fixedly dispose the light blocking sheet 260 with the optical lens element 230, and to retain or fixedly dispose the optical lens element 230 in the plastic barrel 210. Furthermore, other assembling details for the optical elements of the optical element set 220 are omitted herein, and the assembling manners of the imaging lens assembly 200 of the 2nd embodiment are not limited by the statements in this paragraph.

In FIG. 2A and FIG. 2B, a portion of the light-shielding layer 270 (e.g., a portion of the light-shielding layer 270 located on the object side za with respect to the light blocking sheet 260) and another portion of the light-shielding layer 270 (e.g., a portion of the light-shielding layer 270 located farther from the optical axis z than the light blocking sheet 260 therefrom) are overlapped along the direction vertical to the optical axis z. Specifically, the portion of the light-shielding layer 270 and the another portion thereof aforementioned in this paragraph cover a portion of the peripheral portion 240 that is located close to the object side za.

The data of the parameters of the imaging lens assembly 200 according to the 2nd embodiment of the present disclosure are listed in the following Table 2, and the parameters are also shown as FIG. 2B and FIG. 2D. The definitions of these parameters shown in Table 2 are the same as those stated in the imaging lens assembly 100 according to the 1st embodiment.

TABLE 2

| 2nd Embodiment | | | |
|---|---|---|---|
| $\psi Sa$ (mm) | 2.62 | Lb (mm) | 4.715 |
| $\psi Sd$ (mm) | 3.11 | $(\psi H - \psi Sd)/(\psi Sd - \psi Sa)$ | 2.2 |
| $\psi Wd$ (mm) | 3.11 | $[\psi H/(\psi Sd - \psi Sa)]/\pi^2$ | 0.87 |
| $\psi H$ (mm) | 4.22 | $\psi Wd - \psi Sd$ (mm) | 0 |
| L (mm) | 0.1 | L/Lb | 0.02 |

3rd Embodiment

Figure 3A:
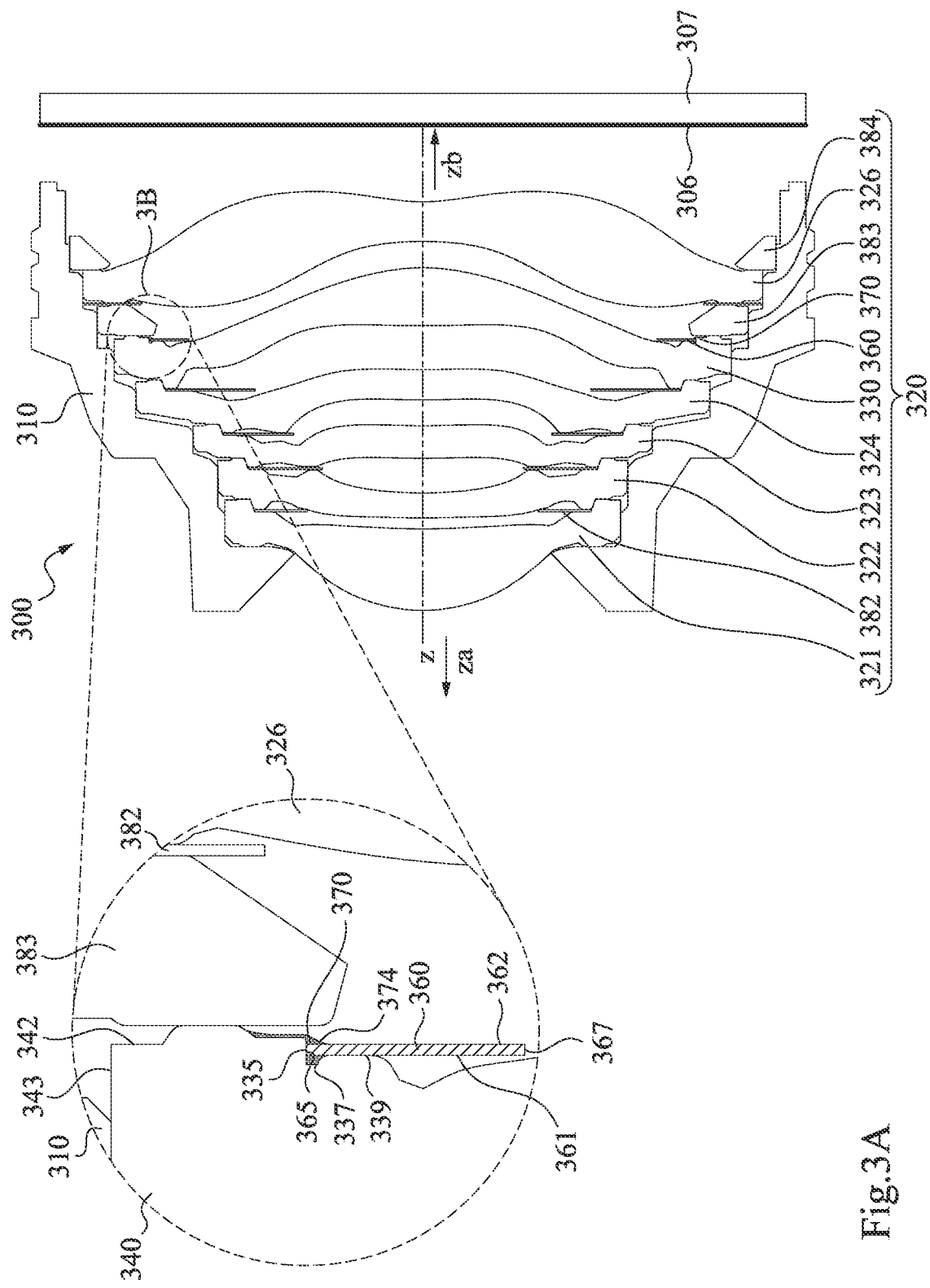
FIG. 3A is a schematic view of an imaging lens assembly according to the 3rd embodiment of the present disclosure and an image sensor.
Figure 3B:
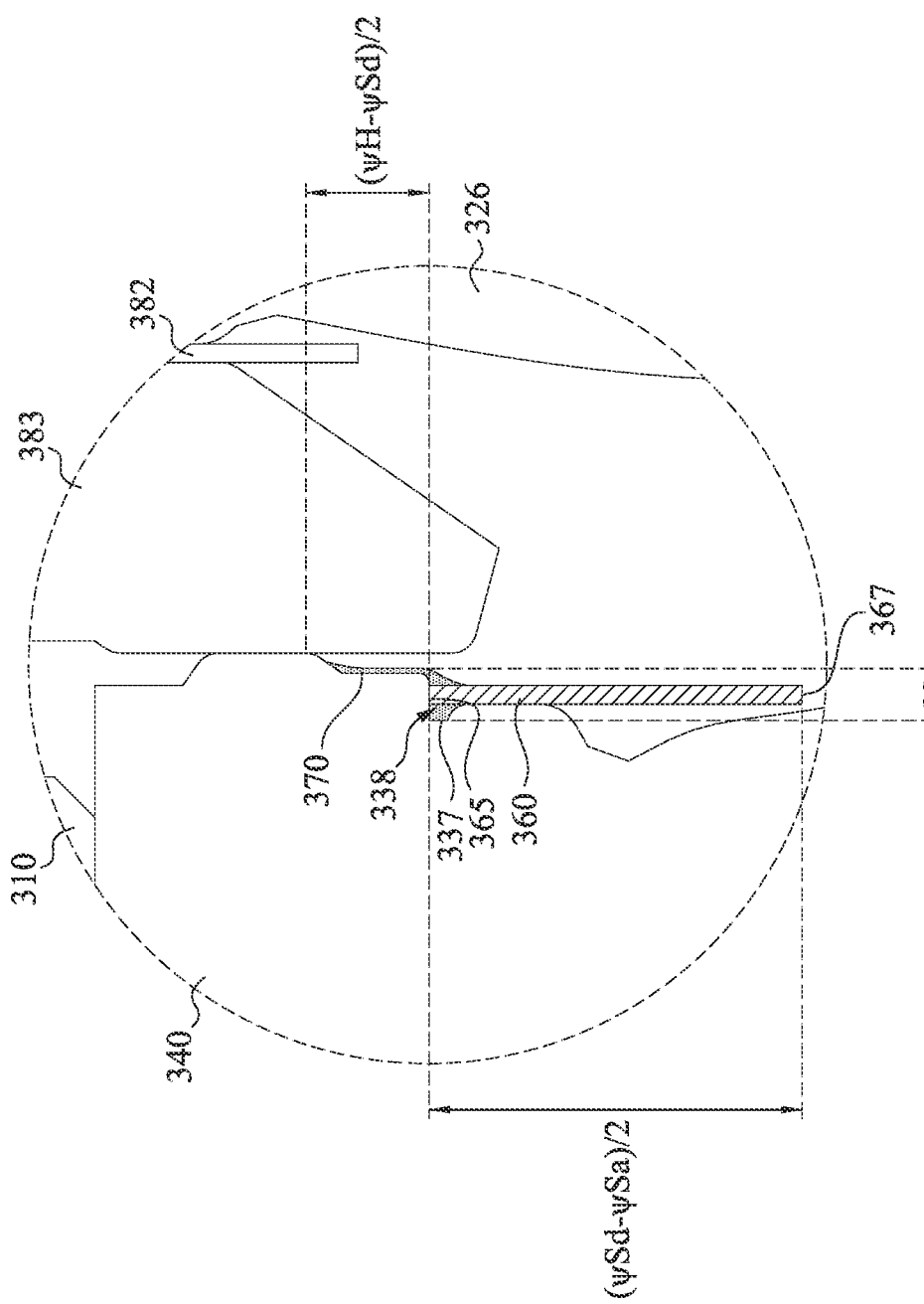
FIG. 3B is a parameter schematic view of part 3B in FIG. 3A.
Figure 3C:
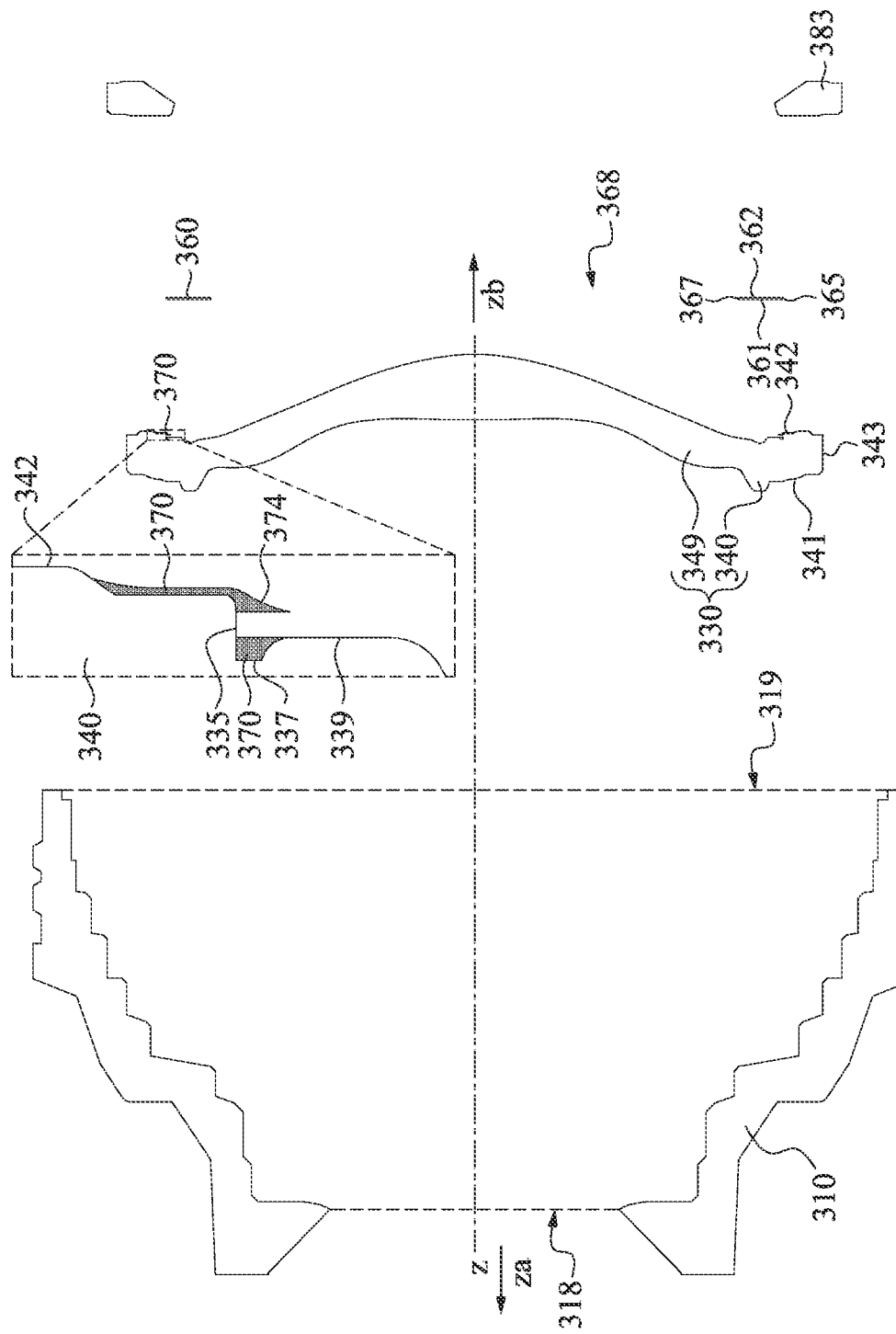
FIG. 3C is a partially exploded view of the imaging lens assembly according to FIG. 3A.
Figure 3D:
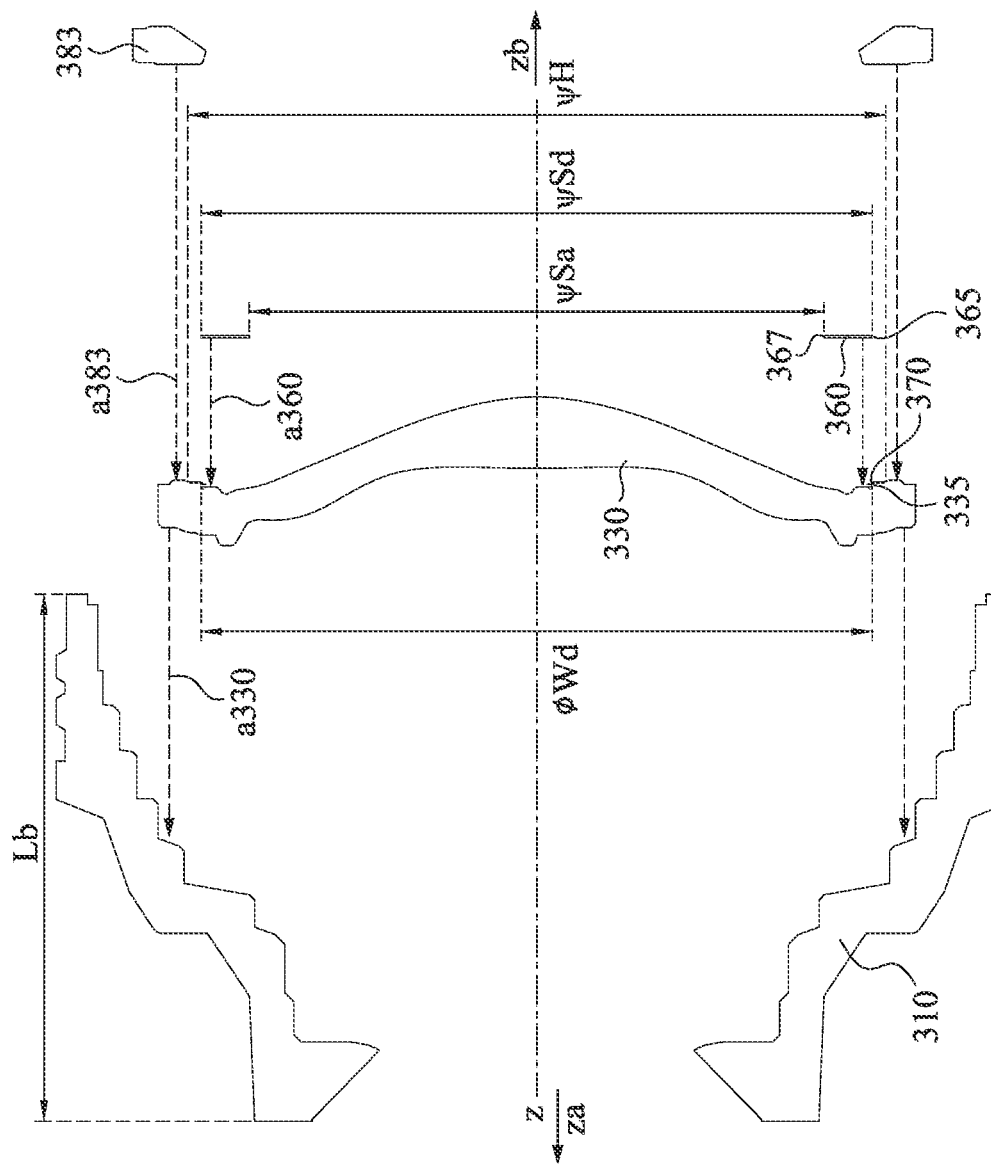
FIG. 3D is a parameter schematic view of the imaging lens assembly according to the 3rd embodiment.

FIG. 3A is a schematic view of an imaging lens assembly 300 according to the 3rd embodiment of the present disclosure and an image sensor 307, and FIG. 3A is a cross-sectional view along a plane, on which an optical axis z is located, of the imaging lens assembly 300. FIG. 3B is a parameter schematic view of part 3B in FIG. 3A. FIG. 3C is an exploded view of a plastic barrel 310, an optical lens element 330, a light blocking sheet 360, a light-shielding layer 370 and a spacer 383 of the imaging lens assembly 300 according to FIG. 3A. FIG. 3D is a parameter schematic view of the imaging lens assembly 300 according to the 3rd embodiment. In FIG. 3A to FIG. 3D, the imaging lens assembly 300 includes the plastic barrel 310 and an optical element set 320. The optical element set 320 includes the optical lens element 330, the light blocking sheet 360 and the light-shielding layer 370. Furthermore, the optical element set 320 includes a plurality of optical elements. Specifically, the optical element set 320 includes optical lens elements 321, 322, 323, 324, 330 and 326 in order from an object side za to an image side zb, and also includes the light blocking sheet 360, the light-shielding layer 370, at least one light blocking sheet 382, the spacer 383 and a retainer 384. All optical elements of the optical element set 320 are disposed in the plastic barrel 310. Moreover, the imaging lens assembly 300 can be applicable to a camera module (not shown in drawings) of an electronic device (not shown in drawings). The image sensor 307 of the electronic device is disposed on an image surface 306.

Figure 3E:
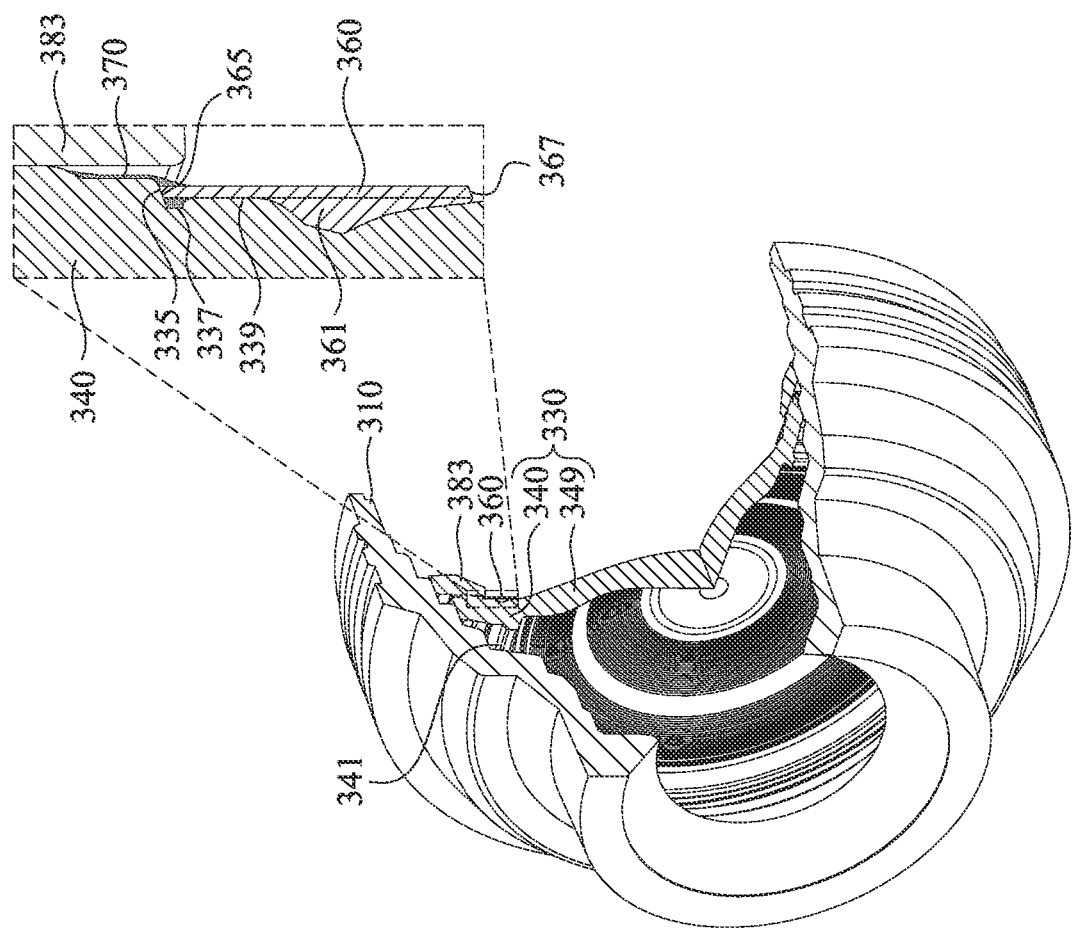
FIG. 3E is a partially three-dimensional and cross-sectional view of the imaging lens assembly according to the 3rd embodiment.
Figure 3F:
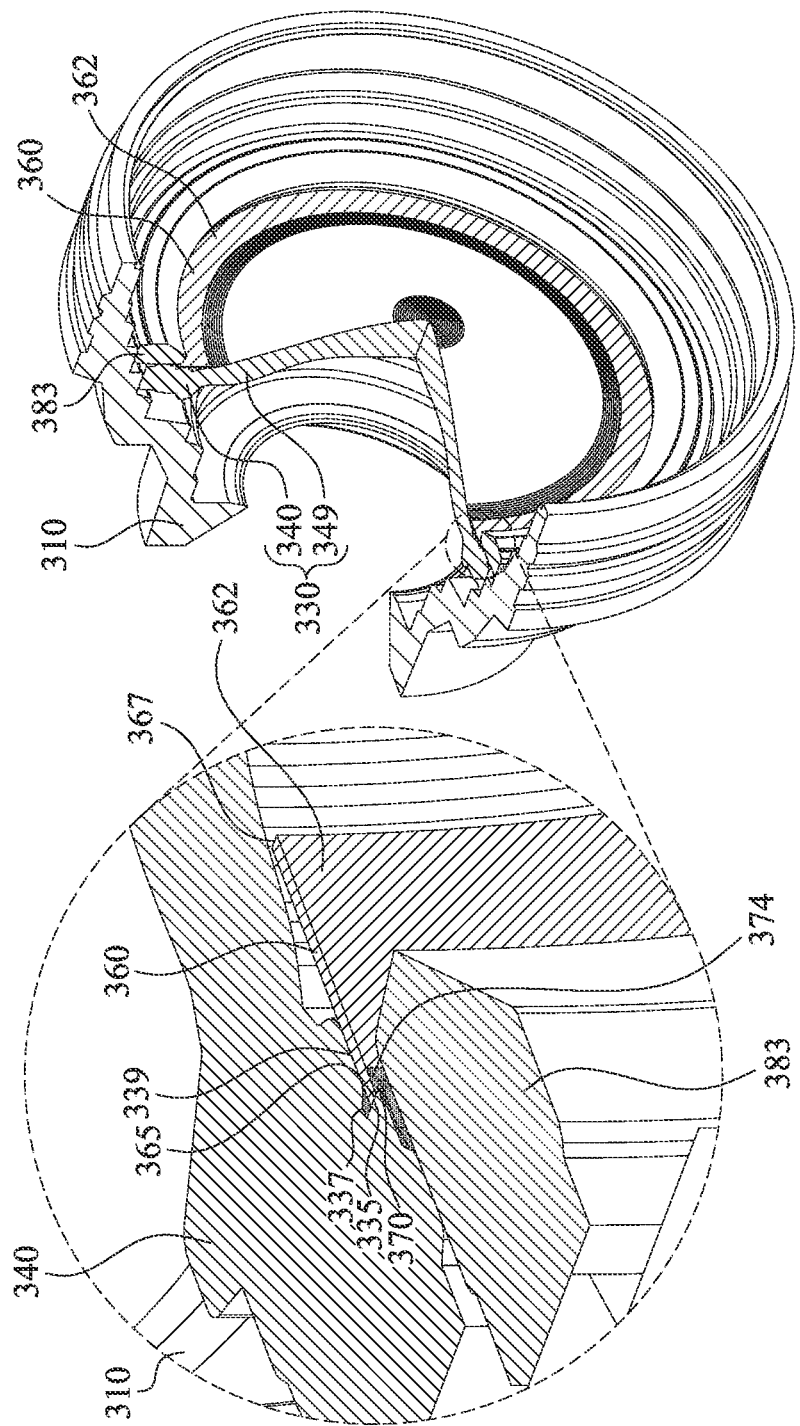
FIG. 3F is another partially three-dimensional and cross-sectional view of the imaging lens assembly according to the 3rd embodiment.
Figure 3G:
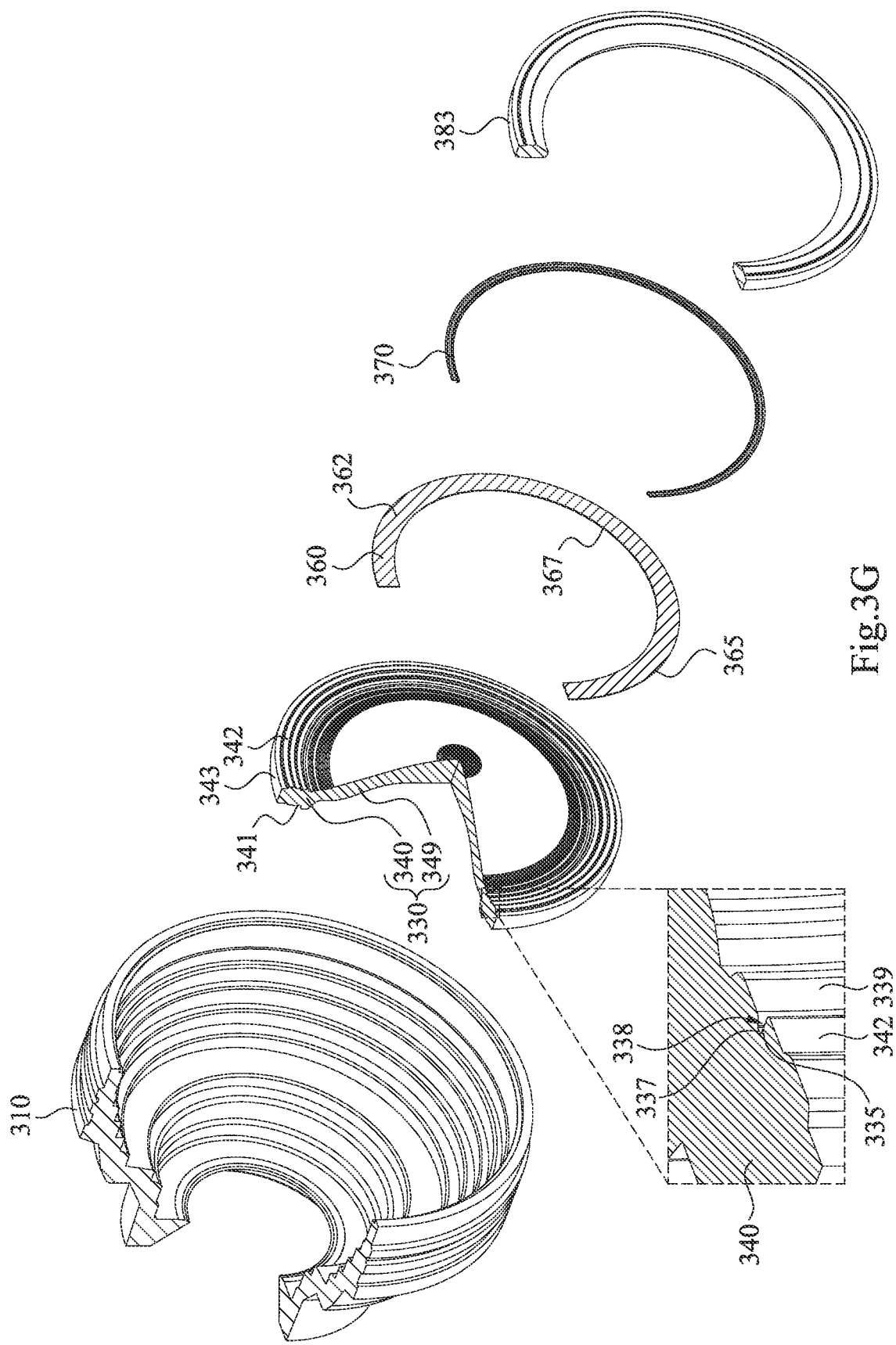
FIG. 3G is an exploded view according to FIG. 3F.

FIG. 3E is a three-dimensional and cross-sectional view of the plastic barrel 310, the optical lens element 330, the light blocking sheet 360, the light-shielding layer 370 and the spacer 383 of the imaging lens assembly 300 according to the 3rd embodiment. FIG. 3F is another three-dimensional and cross-sectional view of the plastic barrel 310, the optical lens element 330, the light blocking sheet 360, the light-shielding layer 370 and the spacer 383 of the imaging lens assembly 300 according to the 3rd embodiment. FIG. 3G is an exploded view according to FIG. 3F. Furthermore, each of the plastic barrel 310, the light blocking sheet 360, the light-shielding layer 370 and the spacer 383 is substantially in a closed and circularly annular shape. The optical lens element 330 is substantially in a circular plate shape with at least one of a convex surface and a concave surface. Each of FIG. 3E to FIG. 3G illustrates three-dimensional and cross-sectional view of two cross-sectional planes, which are vertical to each other and intersect at the optical axis z. The light blocking sheet 360 and the light-shielding layer 370 in FIG. 3A to FIG. 3G may be respectively marked with backslash lines and dots to clearly show the imaging lens assembly 300 according to the 3rd embodiment of the present disclosure. In FIG. 3A to FIG. 3G, the optical lens element 330 includes an effective optical portion 349 and a peripheral portion 340 in order from a center to a periphery thereof. The optical axis z of the imaging lens assembly 300 passes through the effective optical portion 349. The peripheral portion 340 surrounds and is connected to the effective optical portion 349. The peripheral portion 340 includes an object-side peripheral surface 341 and an image-side peripheral surface 342. The object-side peripheral surface 341 faces towards the object side za. The image-side peripheral surface 342 faces towards the image side zb. The image-side peripheral surface 342 includes an annular side wall 335, which is in a full-circle form and extends along a direction parallel to the optical axis z.

The light blocking sheet 360 includes an object-side surface 361, an image-side surface 362, an annular abutting surface 365 and a central opening surface 367. The object-side surface 361 faces towards the object side za. The image-side surface 362 faces towards the image side zb. That is, the image-side surface 362 is located opposite to the object-side surface 361. The annular abutting surface 365 is connected between the object-side surface 361 and the image-side surface 362. The annular abutting surface 365 and the annular side wall 335 of the optical lens element 330 are disposed correspondingly to each other. The central opening surface 367 surrounds and forms a central opening 368 of the light blocking sheet 360. The central opening surface 367 is connected between the object-side surface 361 and the image-side surface 362. The central opening surface 367 is located closer to the optical axis z than the annular abutting surface 365 thereto. In the 3rd embodiment, the object-side surface 361 of the light blocking sheet 360 and the image-side peripheral surface 342 of the optical lens element 330 are in physical contact.

In FIG. 3A to FIG. 3G, the light-shielding layer 370 surrounds the central opening 368 of the light blocking sheet 360 and includes an annular concave-curved portion 374. The annular concave-curved portion 374 is in an annular shape being concave-curved. The light-shielding layer 370 extends from the peripheral portion 340 of the optical lens element 330 towards an outer diameter surface 343 of the optical lens element 330. The outer diameter surface 343 is connected between the object-side peripheral surface 341 and the image-side peripheral surface 342. The annular concave-curved portion 374 is for retaining or fixedly disposing the light blocking sheet 360, so that there is no relative displacement in the direction parallel to the optical axis z between the annular abutting surface 365 of the light blocking sheet 360 and the annular side wall 335 of the optical lens element 330. In the 3rd embodiment, the light-shielding layer 370 is connected to the image-side peripheral surface 342 of the optical lens element 330. The light-shielding layer 370 extends towards the outer diameter surface 343 of the peripheral portion 340 along the image-side peripheral surface 342. The light-shielding layer 370 is not connected to the outer diameter surface 343. The annular concave-curved portion 374 of the light-shielding layer 370 is connected to or disposed adjacent to the annular side wall 335 and is connected to the image-side surface 362 of the light blocking sheet 360.

In the 3rd embodiment, a light being closer to the optical axis z than an inner opening of the light-shielding layer 370 thereto is blocked by the light blocking sheet 360, and a light being farther from the optical axis z than the annular abutting surface 365 of the light blocking sheet 360 therefrom is blocked by the light-shielding layer 370. Thus, the light-shielding layer 370 extends to form a light blocking range that the light blocking sheet 360 cannot reach so as to substitute for the light blocking sheet 360. The light blocking sheet 360 is attached to the optical lens element 330 by the light-shielding layer 370.

In FIG. 3A to FIG. 3G, the plastic barrel 310 includes a minimum opening 318 and a maximum opening 319. The annular abutting surface 365 of the light blocking sheet 360 and the annular side wall 335 of the optical lens element 330 are assembled correspondingly to each other to be aligned with the optical axis z. The annular concave-curved portion 374 of the light-shielding layer 370 is recessed towards the annular abutting surface 365 of the light blocking sheet 360.

The image-side peripheral surface 342 of the peripheral portion 340 further includes a flat abutting section 339 and an annular groove structure 337. The flat abutting section 339 extends along a direction vertical to the optical axis z, and a normal direction of the flat abutting section 339 is the direction parallel to the optical axis z, specifically. The flat abutting section 339 is located closer to the effective optical portion 349 than the annular side wall 335 thereto. The flat abutting section 339 and the object-side surface 361 of the light blocking sheet 360 are in physical contact. The annular groove structure 337 is in a full-circle form. The annular groove structure 337 is connected between the annular side wall 335 and the flat abutting section 339. The annular groove structure 337 is located farther from the effective optical portion 349 than the flat abutting section 339 therefrom. The annular groove structure 337 is recessed from the image-side peripheral surface 342 towards the object-side peripheral surface 341 to form an accommodating space 338. At least one portion of the light-shielding layer 370 is configured in the accommodating space 338. Therefore, the annular groove structure 337 is beneficial to prevent the light-shielding layer 370 from overflowing to an optical element (e.g., the spacer 383) adjacent thereto while the light-shielding layer 370 being over dispensed. In the 3rd embodiment, the image-side peripheral surface 342 includes the flat abutting section 339, the annular groove structure 337 and the annular side wall 335, in order from the center to the periphery of the optical lens element 330.

In FIG. 3A, the annular side wall 335 of the optical lens element 330 and the annular abutting surface 365 of the light blocking sheet 360 are overlapped along the direction vertical to the optical axis z. Specifically, a distance between a position closest to the image surface 306 of the annular side wall 335 and the image surface 306 is the same as or similar to a distance between a position closest to the image surface 306 of the annular abutting surface 365 and the image surface 306.

All optical elements of the optical element set 320 are disposed in the plastic barrel 310, and any optical element of the optical element set 320 is connected to or physically contacts at least one of the plastic barrel 310 and another optical element thereof.

In an assembling procedure of the imaging lens assembly 300, as shown in FIG. 3D, after the light blocking sheet 360 (with an assembling direction a360), the optical lens element 330 (with an assembling direction a330), the spacer 383 (with an assembling direction a383) and the plastic barrel 310 are allocated at the respective assembling positions, the light blocking sheet 360 and the optical lens element 330 are connected with the light-shielding layer 370 in the liquid state, the light-shielding layer 370 in the liquid state flows into the accommodating space 338 via an air spacing, which is predetermined or resulted from the assembling tolerances between the annular side wall 335 of the optical lens element 330 and the annular abutting surface 365 of the light blocking sheet 360, and thereby at least one portion of the light-shielding layer 370 is configured in the accommodating space 338. Next, the light-shielding layer 370 after curing is configured to retain or fixedly dispose the light blocking sheet 360 with the optical lens element 330. Furthermore, other assembling details for the optical elements of the optical element set 320 are omitted herein, and the assembling manners of the imaging lens assembly 300 of the 3rd embodiment are not limited by the statements in this paragraph.

In FIG. 3A and FIG. 3B, a portion of the light-shielding layer 370 (e.g., a portion of the light-shielding layer 370 located on the object side za with respect to the light blocking sheet 360) and another portion of the light-shielding layer 370 (e.g., a portion of the light-shielding layer 370 located on the image side zb with respect to the light blocking sheet 360) are overlapped along the direction parallel to the optical axis z. Specifically, the portion of the light-shielding layer 370 and the another portion thereof aforementioned in this paragraph cover a portion of the light blocking sheet 360 that is located away from the optical axis z.

The data of the parameters of the imaging lens assembly 300 according to the 3rd embodiment of the present disclosure are listed in the following Table 3, and the parameters are also shown as FIG. 3B and FIG. 3D. The definitions of these parameters shown in Table 3 are the same as those stated in the imaging lens assembly 100 according to the 1st embodiment.

TABLE 3

| 3rd Embodiment | | | |
|---|---|---|---|
| $\psi$Sa (mm) | 5.5 | Lb (mm) | 5.05 |
| $\psi$Sd (mm) | 6.42 | ($\psi$H − $\psi$Sd)/($\psi$Sd − $\psi$Sa) | 0.3 |
| $\psi$Wd (mm) | 6.42 | [$\psi$H/($\psi$Sd − $\psi$Sa)]/$\pi^2$ | 0.74 |
| $\psi$H (mm) | 6.68 | $\psi$Wd − $\psi$Sd (mm) | 0 |
| L (mm) | 0.07 | L/Lb | 0.01 |

4th Embodiment

Figure 4A:
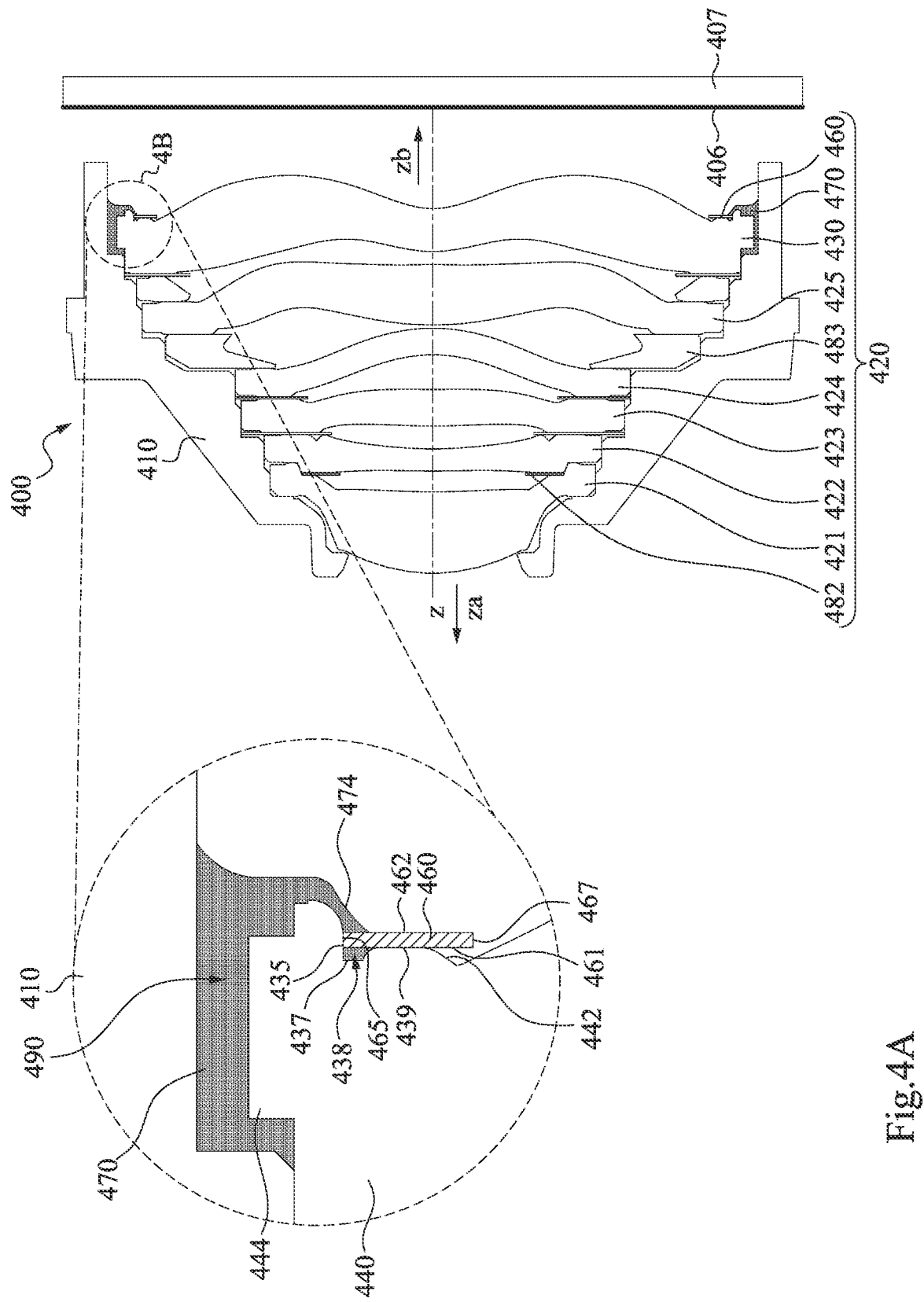
FIG. 4A is a schematic view of an imaging lens assembly according to the 4th embodiment of the present disclosure and an image sensor.

FIG. 4A is a schematic view of an imaging lens assembly 400 according to the 4th embodiment of the present disclosure and an image sensor 407, and FIG. 4A is a cross-sectional view along a plane, on which an optical axis z is located, of the imaging lens assembly 400. FIG. 4B is a parameter schematic view of part 4B in FIG. 4A. FIG. 4C is an exploded view of a plastic barrel 410, an optical lens element 430, a light blocking sheet 460 and a light-shielding layer 470 of the imaging lens assembly 400 according to FIG. 4A. FIG. 4D is a parameter schematic view of the imaging lens assembly 400 according to the 4th embodiment. In FIG. 4A to FIG. 4D, the imaging lens assembly 400 includes the plastic barrel 410 and an optical element set 420. The optical element set 420 includes the optical lens element 430, the light blocking sheet 460 and the light-shielding layer 470. Furthermore, the optical element set 420 includes a plurality of optical elements. Specifically, the optical element set 420 includes optical lens elements 421, 422, 423, 424, 425 and 430 in order from an object side za to an image side zb, and also includes the light blocking sheet 460, the light-shielding layer 470, at least one light blocking sheet 482 and at least one spacer 483. All optical elements of the optical element set 420 are disposed in the plastic barrel 410. Moreover, the imaging lens assembly 400 can be applicable to a camera module (not shown in drawings) of an electronic device (not shown in drawings). The image sensor 407 of the electronic device is disposed on an image surface 406.

Figure 4E:
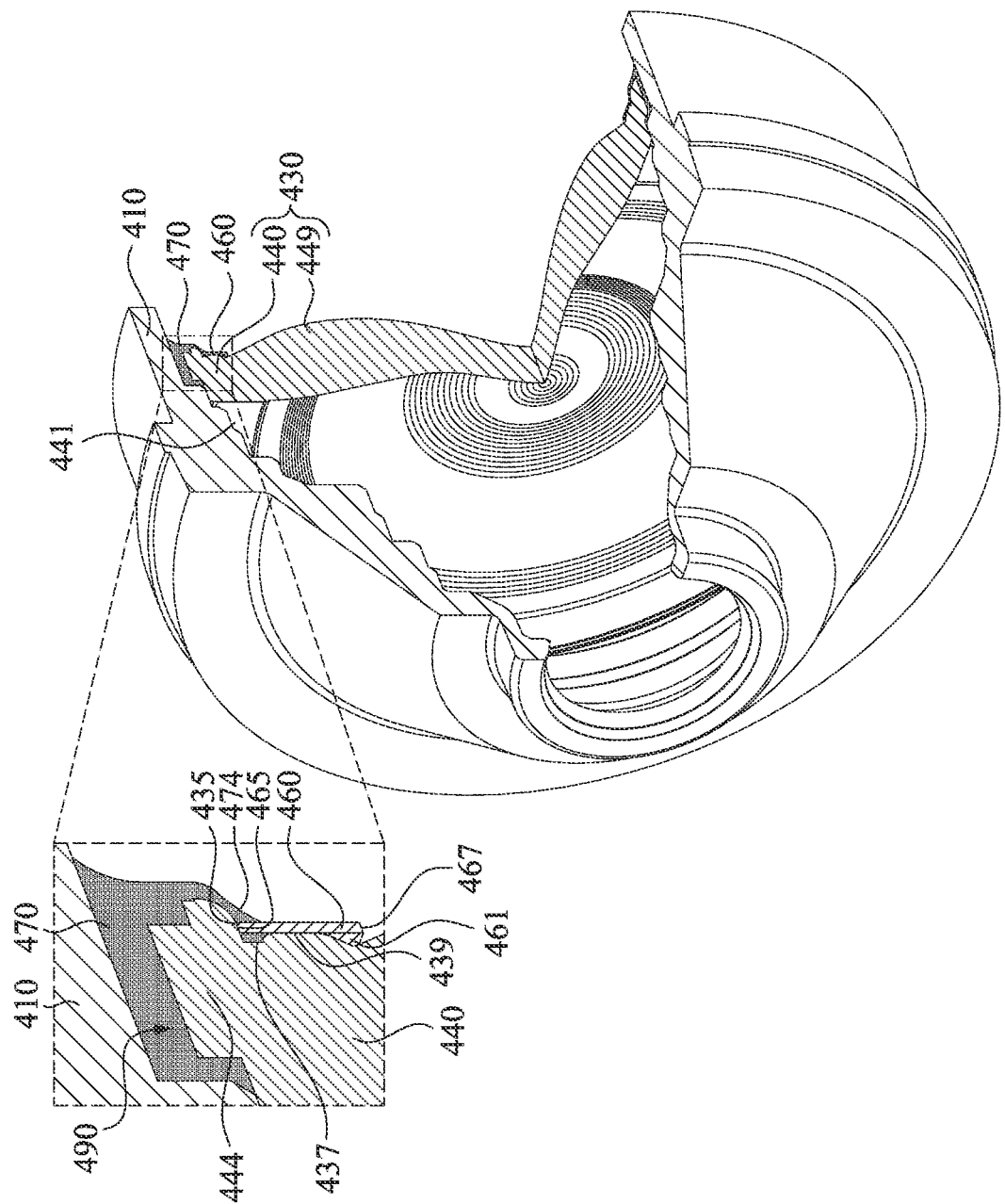
FIG. 4E is a partially three-dimensional and cross-sectional view of the imaging lens assembly according to the 4th embodiment.
Figure 4F:
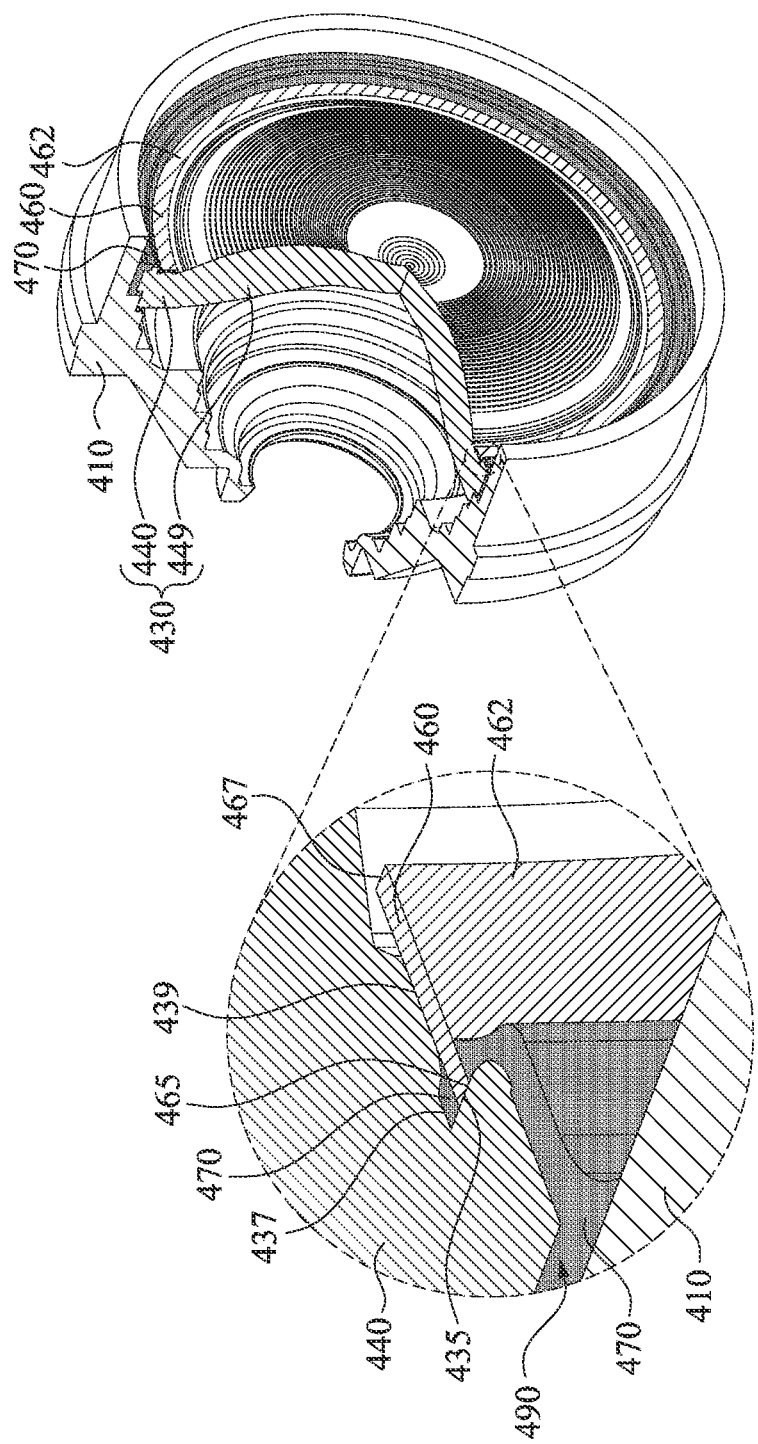
FIG. 4F is another partially three-dimensional and cross-sectional view of the imaging lens assembly according to the 4th embodiment.
Figure 4G:
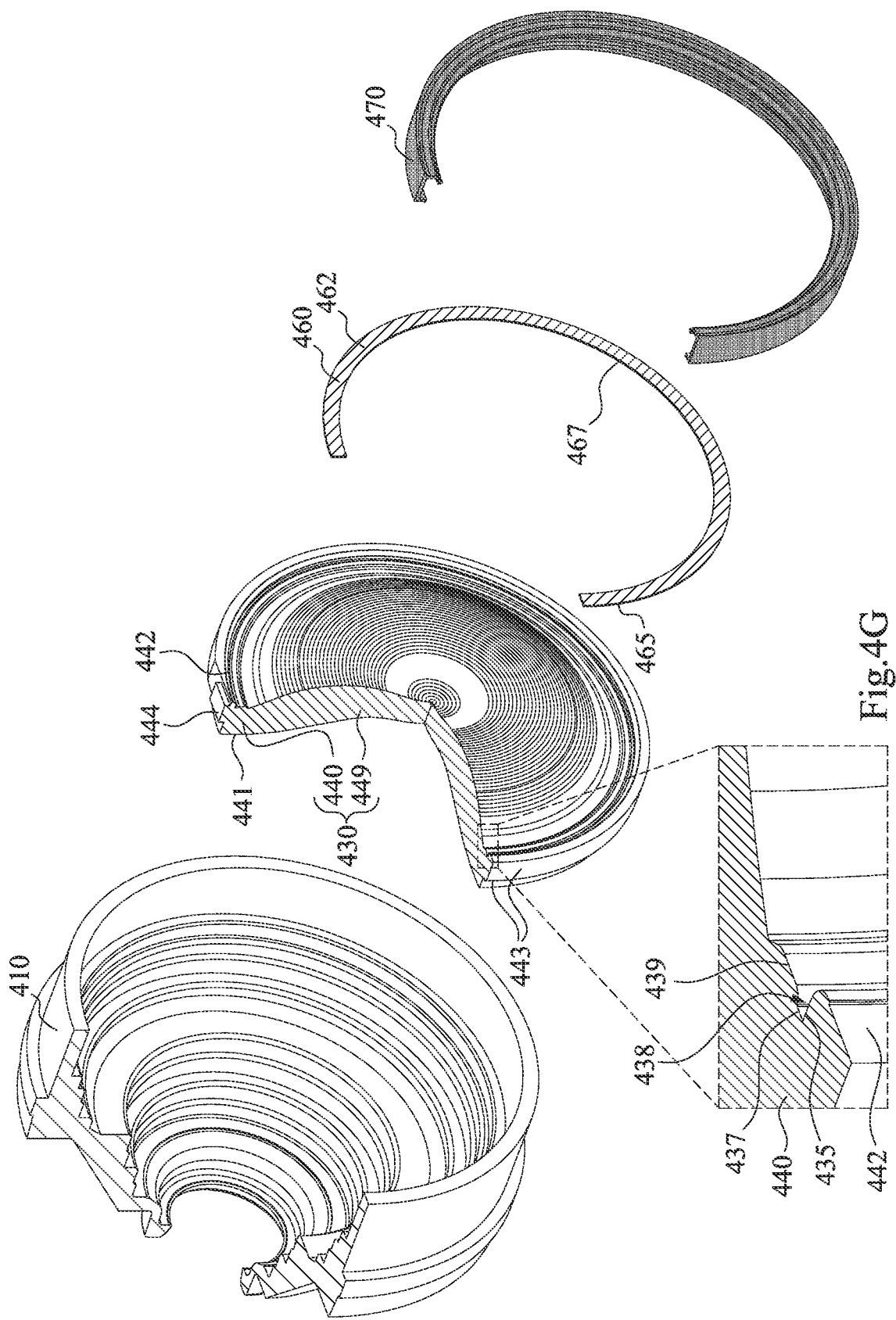
FIG. 4G is an exploded view according to FIG. 4F.

FIG. 4E is a three-dimensional and cross-sectional view of the plastic barrel 410, the optical lens element 430, the light blocking sheet 460 and the light-shielding layer 470 of the imaging lens assembly 400 according to the 4th embodiment. FIG. 4F is another three-dimensional and cross-sectional view of the plastic barrel 410, the optical lens element 430, the light blocking sheet 460 and the light-shielding layer 470 of the imaging lens assembly 400 according to the 4th embodiment. FIG. 4G is an exploded view according to FIG. 4F. Furthermore, each of the plastic barrel 410, the light blocking sheet 460 and the light-shielding layer 470 is substantially in a closed and circularly annular shape. The optical lens element 430 is substantially in a circular plate shape with at least one of a convex surface and a concave surface. Each of FIG. 4E to FIG. 4G illustrates three-dimensional and cross-sectional view of two cross-sectional planes, which are vertical to each other and intersect at the optical axis z. The light blocking sheet 460 and the light-shielding layer 470 in FIG. 4A to FIG. 4G may be respectively marked with backslash lines and dots to clearly show the imaging lens assembly 400 according to the 4th embodiment of the present disclosure. In FIG. 4A to FIG. 4G, the optical lens element 430 includes an effective optical portion 449 and a peripheral portion 440 in order from a center to a periphery thereof. The optical axis z of the imaging lens assembly 400 passes through the effective optical portion 449. The peripheral portion 440 surrounds and is connected to the effective optical portion 449. The peripheral portion 440 includes an object-side peripheral surface 441 and an image-side peripheral surface 442. The object-side peripheral surface 441 faces towards the object side za. The image-side peripheral surface 442 faces towards the image side zb. The image-side peripheral surface 442 includes an annular side wall 435, which is in a full-circle form and extends along a direction parallel to the optical axis z.

The light blocking sheet 460 includes an object-side surface 461, an image-side surface 462, an annular abutting surface 465 and a central opening surface 467. The object-side surface 461 faces towards the object side za. The image-side surface 462 faces towards the image side zb. That is, the image-side surface 462 is located opposite to the object-side surface 461. The annular abutting surface 465 is connected between the object-side surface 461 and the image-side surface 462. The annular abutting surface 465 and the annular side wall 435 of the optical lens element 430 are disposed correspondingly to each other. The central opening surface 467 surrounds and forms a central opening 468 of the light blocking sheet 460. The central opening surface 467 is connected between the object-side surface 461 and the image-side surface 462. The central opening surface 467 is located closer to the optical axis z than the annular abutting surface 465 thereto. In the 4th embodiment, the object-side surface 461 of the light blocking sheet 460 and the image-side peripheral surface 442 of the optical lens element 430 are in physical contact.

In FIG. 4A to FIG. 4G, the light-shielding layer 470 surrounds the central opening 468 of the light blocking sheet 460 and includes an annular concave-curved portion 474. The annular concave-curved portion 474 is in an annular shape being concave-curved. The light-shielding layer 470 extends from the peripheral portion 440 of the optical lens element 430 towards an outer diameter surface 443 of the optical lens element 430. The outer diameter surface 443 is connected between the object-side peripheral surface 441 and the image-side peripheral surface 442. The annular concave-curved portion 474 is for retaining or fixedly disposing the light blocking sheet 460, so that there is no relative displacement in the direction parallel to the optical axis z between the annular abutting surface 465 of the light blocking sheet 460 and the annular side wall 435 of the optical lens element 430. In the 4th embodiment, the light-shielding layer 470 is connected to the image-side peripheral surface 442 of the optical lens element 430. The light-shielding layer 470 extends towards the outer diameter surface 443 of the peripheral portion 440 along the image-side peripheral surface 442. The light-shielding layer 470 is not connected to the outer diameter surface 443. The annular concave-curved portion 474 of the light-shielding layer 470 is connected to or disposed adjacent to the annular side wall 435 and is connected to the image-side surface 462 of the light blocking sheet 460.

In the 4th embodiment, a light being closer to the optical axis z than an inner opening of the light-shielding layer 470 thereto is blocked by the light blocking sheet 460, and a light being farther from the optical axis z than the annular abutting surface 465 of the light blocking sheet 460 therefrom is blocked by the light-shielding layer 470. Thus, the light-shielding layer 470 extends to form a light blocking range that the light blocking sheet 460 cannot reach so as to substitute for the light blocking sheet 460. Specifically, the light-shielding layer 470 is connected to the light blocking sheet 460 and a maximum opening 419 of the plastic barrel 410. The light blocking sheet 460 is attached to the optical lens element 430 by the light-shielding layer 470.

In FIG. 4A to FIG. 4D, the plastic barrel 410 includes a minimum opening 418 and a maximum opening 419. When a length along the direction parallel to the optical axis z of the light-shielding layer 470 is L, and a length along the direction parallel to the optical axis z of the plastic barrel 410 is Lb, the following condition is satisfied: $0.0 < L/Lb < 0.5$. Specifically, the optical lens element 430 is an optical lens element closest to the image surface 406 of the optical element set 420 and is disposed in the plastic barrel 410. The maximum opening 419 is located at a position that is closest to the image surface 406 of the plastic barrel 410. The light-shielding layer 470 is connected to the image-side peripheral surface 442 of the optical lens element 430 and the plastic barrel 410. Therefore, the light-shielding layer 470 can substitute for a conventional retainer in a solid state with the mechanical property so as to save the production cost. The light-shielding layer 470 with high-viscosity has the function of a retainer and is more proper to fill into a space of the specific structural type than the conventional retainer in the solid state that is made by an injection molding method, so as to increase the attachment between the optical element set 420 and the plastic barrel 410. Furthermore, the following condition is satisfied: $0.1<L/Lb<0.4$. Therefore, a proper coating range of the light-shielding layer 470 can result in higher manufacturing and assembling yield rates.

In FIG. 4A to FIG. 4G, the annular abutting surface 465 of the light blocking sheet 460 and the annular side wall 435 of the optical lens element 430 are assembled correspondingly to each other to be aligned with the optical axis z. The annular concave-curved portion 474 of the light-shielding layer 470 is recessed towards the annular abutting surface 465 of the light blocking sheet 460.

The image-side peripheral surface 442 of the peripheral portion 440 further includes a flat abutting section 439 and an annular groove structure 437. The flat abutting section 439 extends along a direction vertical to the optical axis z, and a normal direction of the flat abutting section 439 is the direction parallel to the optical axis z, specifically. The flat abutting section 439 is located closer to the effective optical portion 449 than the annular side wall 435 thereto. The flat abutting section 439 and the object-side surface 461 of the light blocking sheet 460 are in physical contact. The annular groove structure 437 is in a full-circle form. The annular groove structure 437 is connected between the annular side wall 435 and the flat abutting section 439. The annular groove structure 437 is located farther from the effective optical portion 449 than the flat abutting section 439 therefrom. The annular groove structure 437 is recessed from the image-side peripheral surface 442 towards the object-side peripheral surface 441 to form an accommodating space 438. At least one portion of the light-shielding layer 470 is configured in the accommodating space 438. In the 4th embodiment, the image-side peripheral surface 442 includes the flat abutting section 439, the annular groove structure 437 and the annular side wall 435, in order from the center to the periphery of the optical lens element 430.

In FIG. 4A, the annular side wall 435 of the optical lens element 430 and the annular abutting surface 465 of the light blocking sheet 460 are overlapped along the direction vertical to the optical axis z. Specifically, a distance between a position closest to the image surface 406 of the annular side wall 435 and the image surface 406 is the same as or similar to a distance between a position closest to the image surface 406 of the annular abutting surface 465 and the image surface 406.

All optical elements of the optical element set 420 are disposed in the plastic barrel 410, and any optical element of the optical element set 420 is connected to or physically contacts at least one of the plastic barrel 410 and another optical element thereof. The light-shielding layer 470 is for retaining the optical lens element 430 in the plastic barrel 410, and is further for retaining an entirety of the optical element set 420 in the plastic barrel 410. Therefore, the light-shielding layer 470 after curing having the function of retaining or fixedly disposing the optical element set 420 can be deemed as a retainer in a liquid state for assembling the imaging lens assembly 400, and has a smaller size and a more ideal property of blocking stray light than the conventional retainer in the solid state. In the enlarged view of FIG. 4A, the light-shielding layer 470 in the 4th embodiment is interposed between the plastic barrel 410 and the peripheral portion 440 of the optical lens element 430 (the image-side peripheral surface 442 and the outer diameter surface 443, specifically). The light-shielding layer 470 is for retaining the light blocking sheet 460 with the optical lens element 430, and for retaining the optical lens element 430 together with other optical elements of the optical element set 420 in the plastic barrel 410.

In FIG. 4A to FIG. 4G, an air gap 490 is formed between the peripheral portion 440 of the optical lens element 430 (the outer diameter surface 443, specifically) and the plastic barrel 410, and at least one portion of the light-shielding layer 470 is configured in the air gap 490.

The peripheral portion 440 of the optical lens element 430 includes a gate trace 444. The gate trace 444 is located farther from the effective optical portion 449 than the annular side wall 435 therefrom. Therefore, the gate trace 444 on the peripheral portion 440 is formed from cutting a plastic injection material of the optical lens element 430 while the optical lens element 430 being released from a mold, so that the annular side wall 435 can be prevented from damage by the cutting tool and can be maintained in the full-circle form. The structural type of the full-circle form is more advantageous in increasing the assembling quality of the optical elements than the structural type of a non-full-circle form. Furthermore, the gate trace 444 is not connected to the annular side wall 435 and does not physically contact the plastic barrel 410. Specifically, the gate trace 444 is located on the outer diameter surface 443, which is located farther from the effective optical portion 449 than the annular side wall 435 therefrom.

At least one portion of the light-shielding layer 470 is located farther from the effective optical portion 449 than the gate trace 444 therefrom, and the light-shielding layer 470 covers and physically contacts the gate trace 444. Therefore, the structural type of the light-shielding layer 470 more attached to the peripheral portion 440 of the optical lens element 430 is favorable for further increasing the effects of blocking stray light of the imaging lens assembly 400.

In an assembling procedure of the imaging lens assembly 400, as shown in FIG. 4D, after the light blocking sheet 460 (with an assembling direction a460), the optical lens element 430 (with an assembling direction a430) and the plastic barrel 410 are allocated at the respective assembling positions, the light blocking sheet 460, the optical lens element 430 and the plastic barrel 410 are connected with the light-shielding layer 470 in the liquid state, the light-shielding layer 470 in the liquid state flows into the accommodating space 438 via an air spacing, which is predetermined or resulted from the assembling tolerances between the annular side wall 435 of the optical lens element 430 and the annular abutting surface 465 of the light blocking sheet 460, and thereby at least one portion of the light-shielding layer 470 is configured in the accommodating space 438. Next, the light-shielding layer 470 after curing is configured to retain or fixedly dispose the light blocking sheet 460 with the optical lens element 430 and to retain or fixedly dispose the optical lens element 430 together with other optical elements of the optical element set 420 in the plastic barrel 410. Furthermore, other assembling details for the optical elements of the optical element set 420 are omitted herein, and the assembling manners of the imaging lens assembly 400 of the 4th embodiment are not limited by the statements in this paragraph.

In FIG. 4A and FIG. 4B, a portion of the light-shielding layer 470 (e.g., a portion of the light-shielding layer 470 located on the object side za with respect to the gate trace 444) and another portion of the light-shielding layer 470 (e.g., a portion of the light-shielding layer 470 located on the image side zb with respect to the gate trace 444) are overlapped along the direction parallel to the optical axis z. Specifically, the portion of the light-shielding layer 470 and the another portion thereof aforementioned in this paragraph cover the gate trace 444.

Moreover, a portion of the light-shielding layer 470 (e.g., a portion of the light-shielding layer 470 located on the image side zb with respect to the light blocking sheet 460) and another portion of the light-shielding layer 470 (e.g., a portion of the light-shielding layer 470 located on the image side zb with respect to the gate trace 444) are overlapped along the direction vertical to the optical axis z. Specifically, the portion of the light-shielding layer 470 and the another portion thereof aforementioned in this paragraph cover a portion of the peripheral portion 440 that is located close to the image side zb.

The data of the parameters of the imaging lens assembly 400 according to the 4th embodiment of the present disclosure are listed in the following Table 4, and the parameters are also shown as FIG. 4B and FIG. 4D. The definitions of these parameters shown in Table 4 are the same as those stated in the imaging lens assembly 100 according to the 1st embodiment.

TABLE 4

| 4th Embodiment | | | |
|---|---|---|---|
| ψSa (mm) | 4.75 | Lb (mm) | 3.57 |
| ψSd (mm) | 5.15 | (ψH − ψSd)/(ψSd − ψSa) | 1.1 |
| ψWd (mm) | 5.15 | [ψH/(ψSd − ψSa)]/$\pi^2$ | 1.42 |
| ψH (mm) | 5.6 | ψWd − ψSd (mm) | 0 |
| L (mm) | 0.5 | L/Lb | 0.14 |

5th Embodiment

Figure 5A:
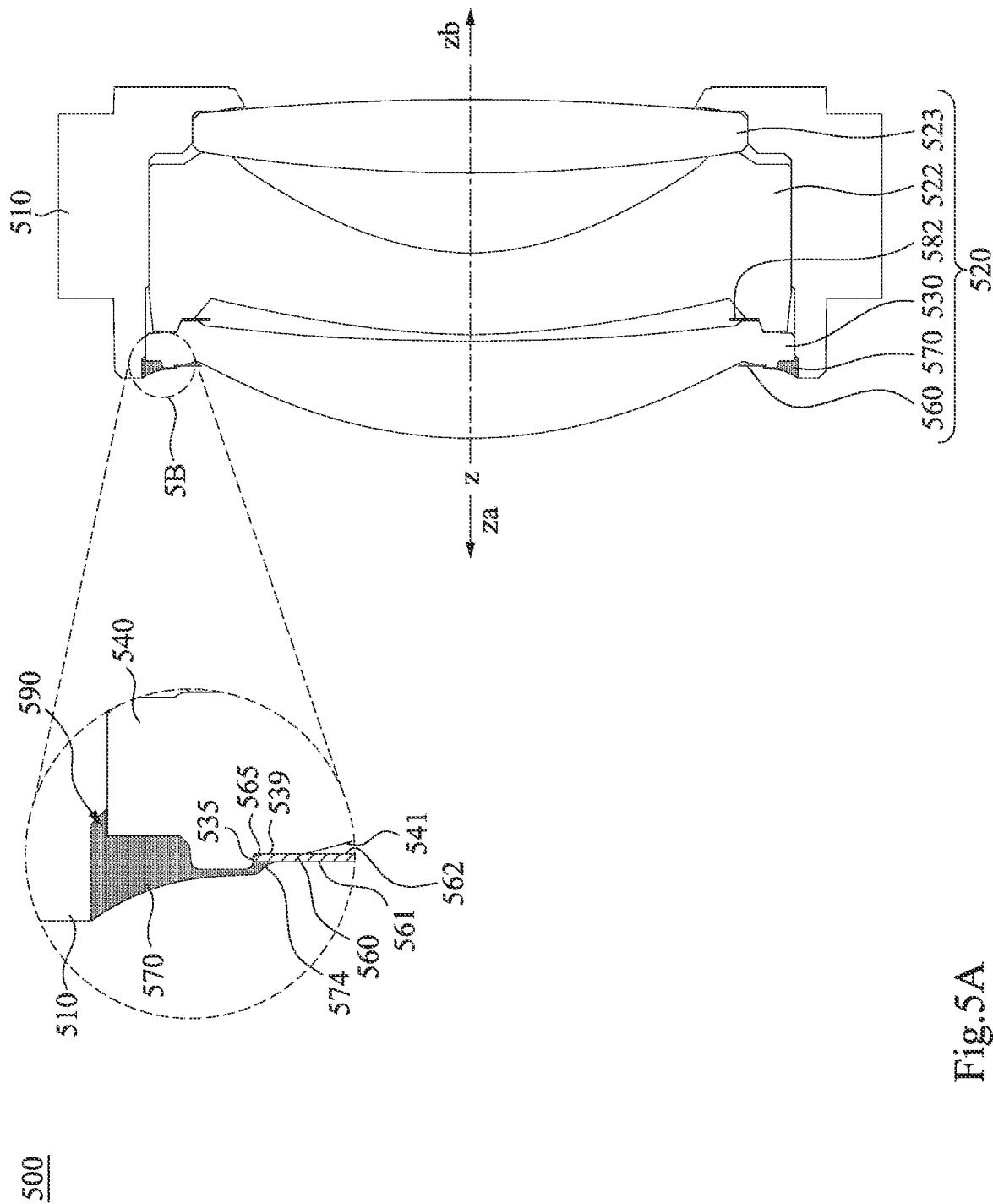
FIG. 5A is a schematic view of an imaging lens assembly according to the 5th embodiment of the present disclosure.
Figure 5B:
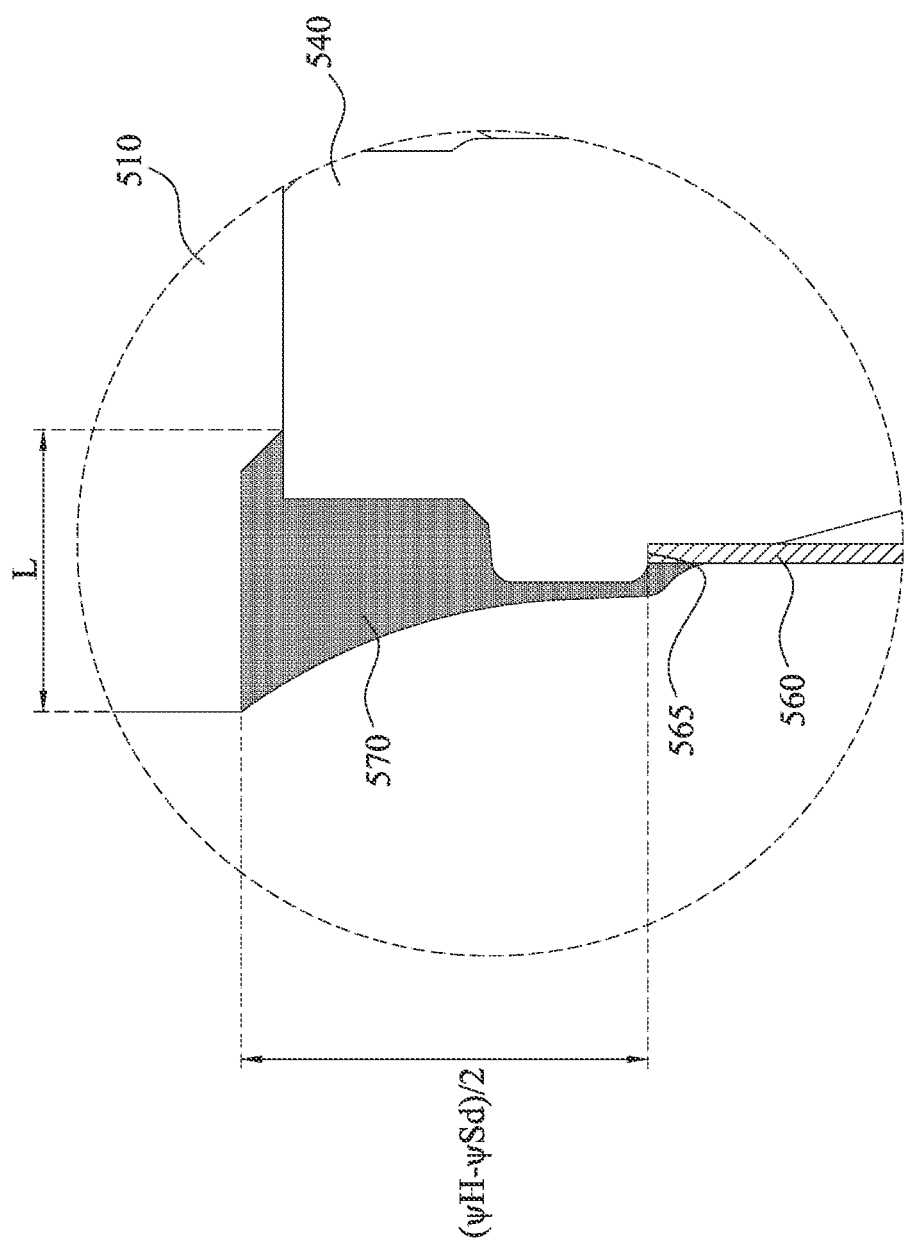
FIG. 5B is a parameter schematic view of part 5B in FIG. 5A.
Figure 5C:
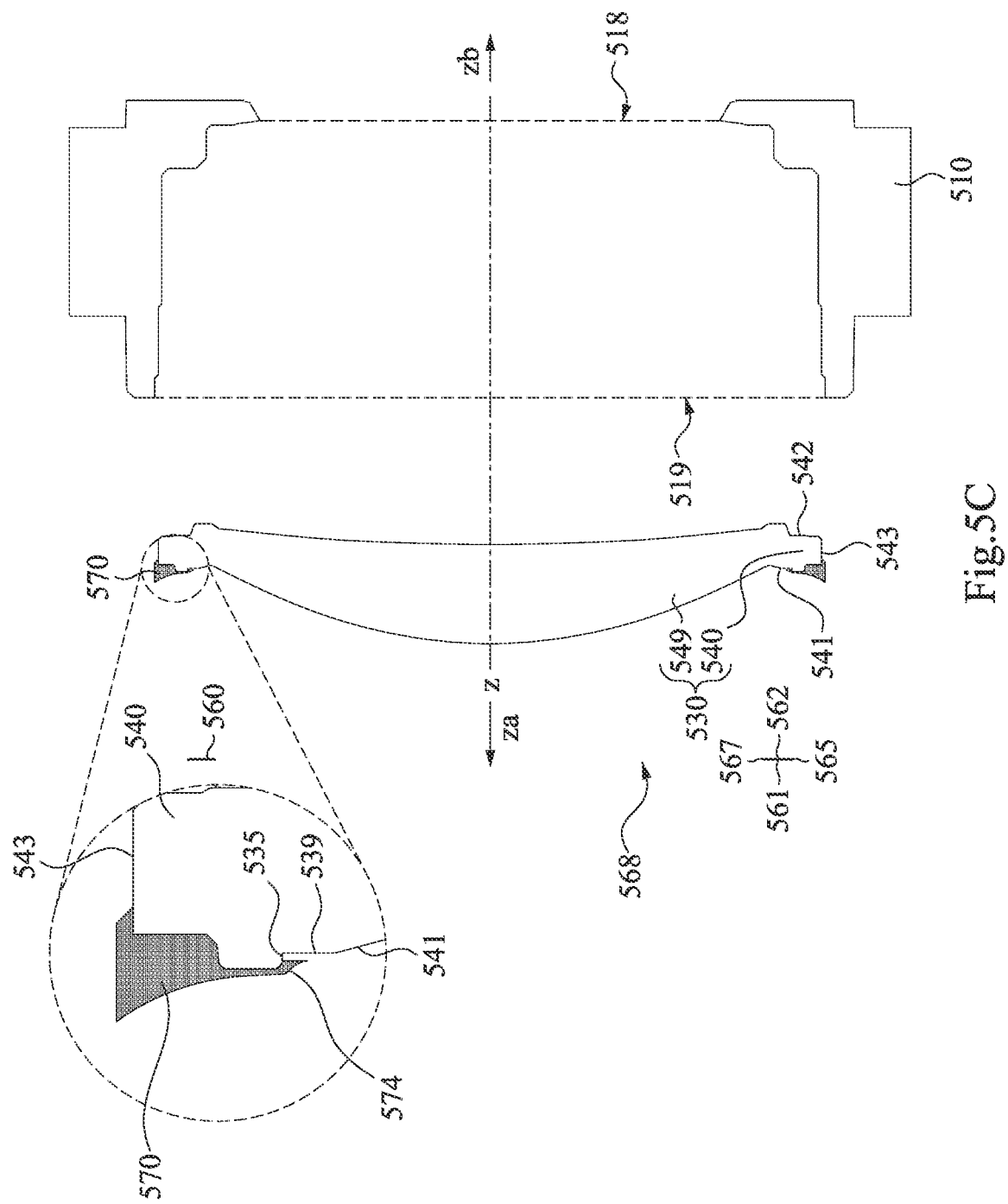
FIG. 5C is a partially exploded view of the imaging lens assembly according to FIG. 5A.

FIG. 5A is a schematic view of an imaging lens assembly 500 according to the 5th embodiment of the present disclosure, and FIG. 5A is a cross-sectional view along a plane, on which an optical axis z is located, of the imaging lens assembly 500. FIG. 5B is a parameter schematic view of part 5B in FIG. 5A. FIG. 5C is an exploded view of a plastic barrel 510, an optical lens element 530, a light blocking sheet 560 and a light-shielding layer 570 of the imaging lens assembly 500 according to FIG. 5A. FIG. 5D is a parameter schematic view of the imaging lens assembly 500 according to the 5th embodiment. In FIG. 5A to FIG. 5D, the imaging lens assembly 500 includes the plastic barrel 510 and an optical element set 520. The optical element set 520 includes the optical lens element 530, the light blocking sheet 560 and the light-shielding layer 570. Furthermore, the optical element set 520 includes a plurality of optical elements. Specifically, the optical element set 520 includes optical lens elements 530, 522 and 523 in order from an object side za to an image side zb, and also includes the light blocking sheet 560, the light-shielding layer 570 and a light blocking sheet 582. All optical elements of the optical element set 520 are disposed in the plastic barrel 510.

Figure 5E:
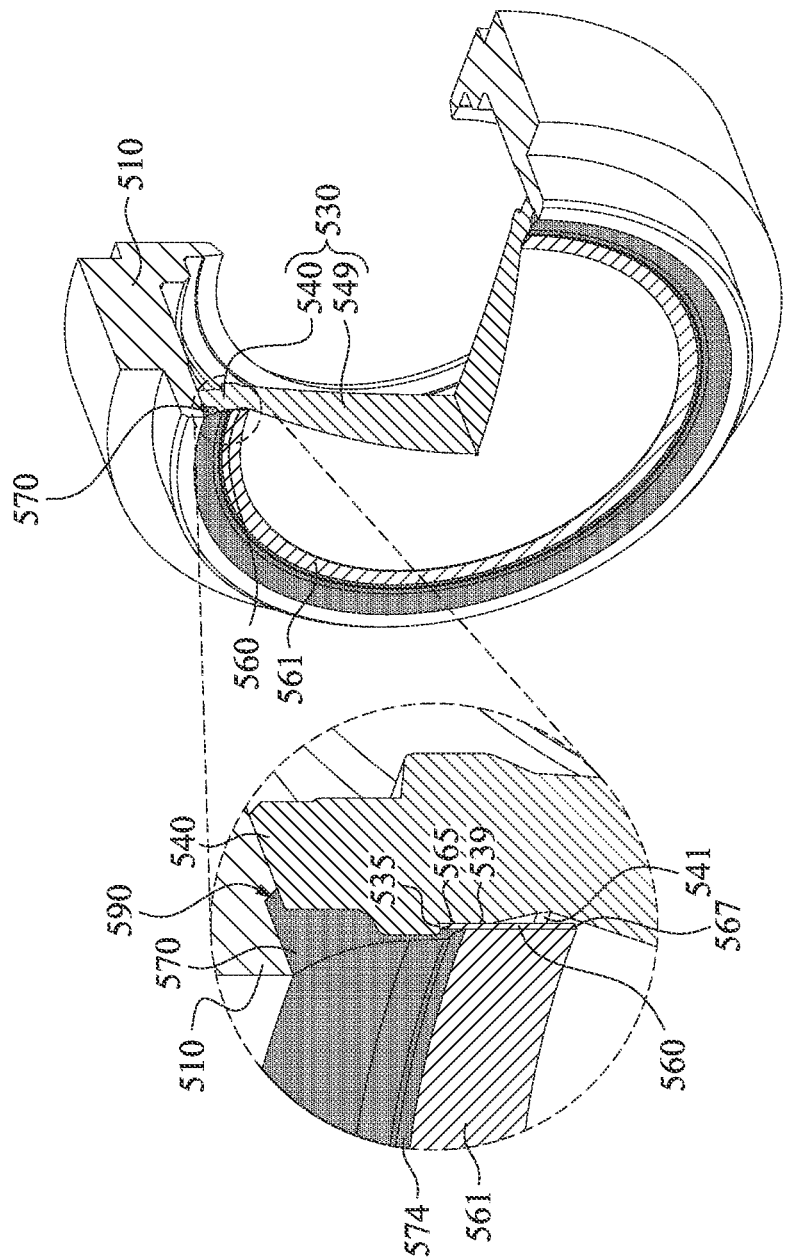
FIG. 5E is a partially three-dimensional and cross-sectional view of the imaging lens assembly according to the 5th embodiment.
Figure 5F:
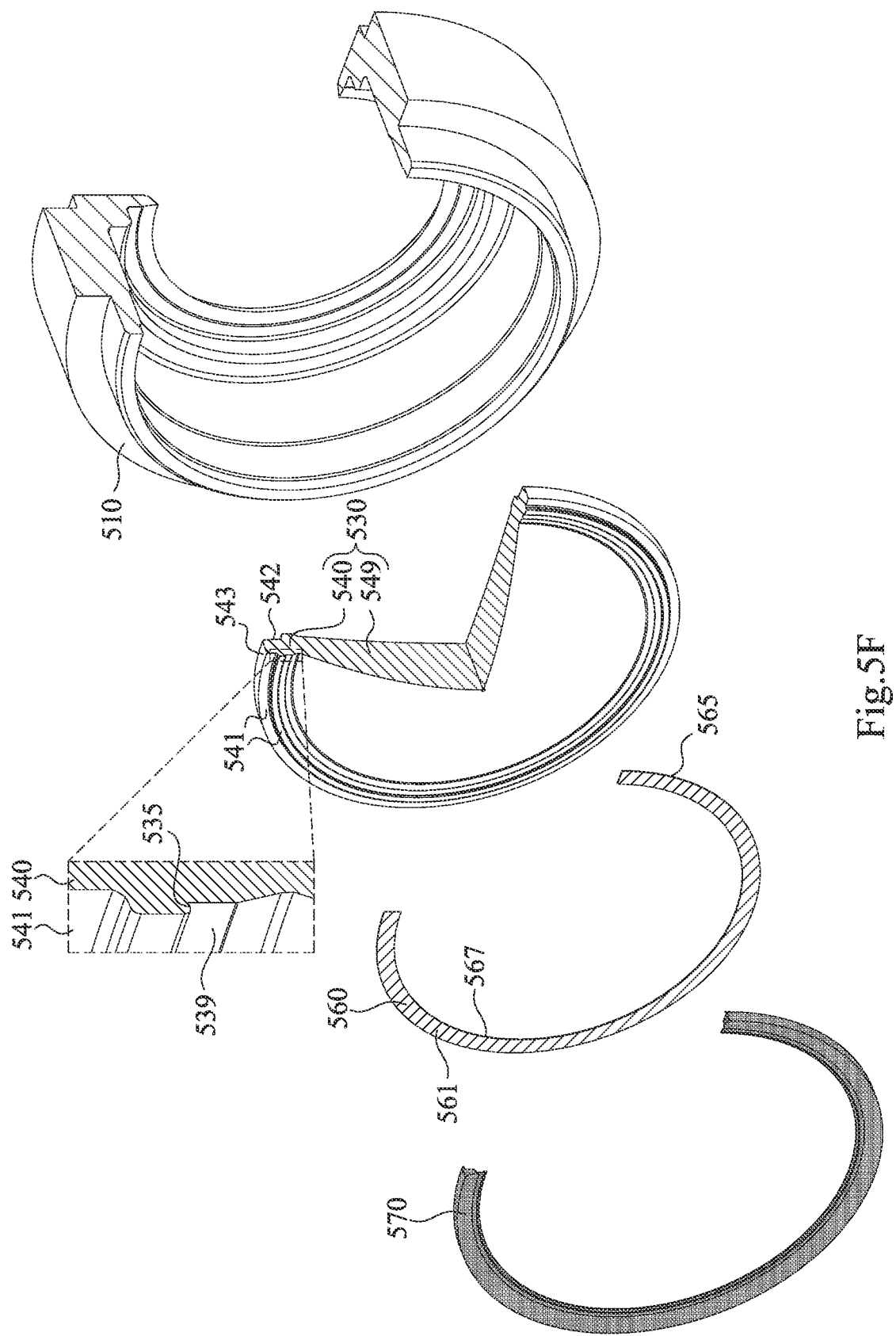
FIG. 5F is an exploded view according to FIG. 5E.

FIG. 5E is a three-dimensional and cross-sectional view of the plastic barrel 510, the optical lens element 530, the light blocking sheet 560 and the light-shielding layer 570 of the imaging lens assembly 500 according to the 5th embodiment. FIG. 5F is an exploded view according to FIG. 5E. FIG. 5G is another three-dimensional and cross-sectional view of the plastic barrel 510, the optical lens element 530, the light blocking sheet 560 and the light-shielding layer 570 of the imaging lens assembly 500 according to the 5th embodiment. Furthermore, each of the plastic barrel 510, the light blocking sheet 560 and the light-shielding layer 570 is substantially in a closed and circularly annular shape. The optical lens element 530 is substantially in a circular plate shape with at least one of a convex surface and a concave surface. Each of FIG. 5E to FIG. 5G illustrates three-dimensional and cross-sectional view of two cross-sectional planes, which are vertical to each other and intersect at the optical axis z. The light blocking sheet 560 and the light-shielding layer 570 in FIG. 5A to FIG. 5G may be respectively marked with backslash lines and dots to clearly show the imaging lens assembly 500 according to the 5th embodiment of the present disclosure. In FIG. 5A to FIG. 5G, the optical lens element 530 includes an effective optical portion 549 and a peripheral portion 540 in order from a center to a periphery thereof. The optical axis z of the imaging lens assembly 500 passes through the effective optical portion 549. The peripheral portion 540 surrounds and is connected to the effective optical portion 549. The peripheral portion 540 includes an object-side peripheral surface 541 and an image-side peripheral surface 542. The object-side peripheral surface 541 faces towards the object side za. The image-side peripheral surface 542 faces towards the image side zb. The object-side peripheral surface 541 includes an annular side wall 535, which is in a full-circle form and extends along a direction parallel to the optical axis z.

The light blocking sheet 560 includes an object-side surface 561, an image-side surface 562, an annular abutting surface 565 and a central opening surface 567. The object-side surface 561 faces towards the object side za. The image-side surface 562 faces towards the image side zb. That is, the image-side surface 562 is located opposite to the object-side surface 561. The annular abutting surface 565 is connected between the object-side surface 561 and the image-side surface 562. The annular abutting surface 565 and the annular side wall 535 of the optical lens element 530 are disposed correspondingly to each other. The central opening surface 567 surrounds and forms a central opening 568 of the light blocking sheet 560. The central opening surface 567 is connected between the object-side surface 561 and the image-side surface 562. The central opening surface 567 is located closer to the optical axis z than the annular abutting surface 565 thereto. In the 5th embodiment, the image-side surface 562 of the light blocking sheet 560 and the object-side peripheral surface 541 of the optical lens element 530 are in physical contact.

In FIG. 5A to FIG. 5G, the light-shielding layer 570 surrounds the central opening 568 of the light blocking sheet 560 and includes an annular concave-curved portion 574. The annular concave-curved portion 574 is in an annular shape being concave-curved. The light-shielding layer 570 extends from the peripheral portion 540 of the optical lens element 530 towards an outer diameter surface 543 of the optical lens element 530. The outer diameter surface 543 is connected between the object-side peripheral surface 541 and the image-side peripheral surface 542. The annular concave-curved portion 574 is for retaining or fixedly disposing the light blocking sheet 560, so that there is no relative displacement in the direction parallel to the optical axis z between the annular abutting surface 565 of the light blocking sheet 560 and the annular side wall 535 of the optical lens element 530. In the 5th embodiment, the light-shielding layer 570 is connected to the object-side peripheral surface 541 of the optical lens element 530. The light-shielding layer 570 extends towards the outer diameter surface 543 of the peripheral portion 540 along the object-side peripheral surface 541. The light-shielding layer 570 is connected to the outer diameter surface 543. The annular concave-curved portion 574 of the light-shielding layer 570 is connected to or disposed adjacent to the annular side wall 535 and is connected to the object-side surface 561 of the light blocking sheet 560.

In the 5th embodiment, a light being closer to the optical axis z than an inner opening of the light-shielding layer 570 thereto is blocked by the light blocking sheet 560, and a light being farther from the optical axis z than the annular abutting surface 565 of the light blocking sheet 560 therefrom is blocked by the light-shielding layer 570. Thus, the light-shielding layer 570 extends to form a light blocking range that the light blocking sheet 560 cannot reach so as to substitute for the light blocking sheet 560. Specifically, the light-shielding layer 570 is connected to the light blocking sheet 560 and a maximum opening 519 of the plastic barrel 510. The light blocking sheet 560 is attached to the optical lens element 530 by the light-shielding layer 570.

In FIG. 5A to FIG. 5D, the optical lens element 530 is an optical lens element closest to the object side za of the optical element set 520 and is disposed in the plastic barrel 510. The plastic barrel 510 includes a minimum opening 518 and the maximum opening 519. The maximum opening 519 is located at a position that is closest to the object side za of the plastic barrel 510. The light-shielding layer 570 is connected to the object-side peripheral surface 541 of the optical lens element 530 and the plastic barrel 510. Therefore, the light-shielding layer 570 can substitute for a conventional retainer in a solid state with the mechanical property.

In FIG. 5A to FIG. 5G, the annular abutting surface 565 of the light blocking sheet 560 and the annular side wall 535 of the optical lens element 530 are assembled correspondingly to each other to be aligned with the optical axis z. The annular concave-curved portion 574 of the light-shielding layer 570 is recessed towards the annular abutting surface 565 of the light blocking sheet 560.

The object-side peripheral surface 541 of the peripheral portion 540 further includes a flat abutting section 539. The flat abutting section 539 extends along a direction vertical to the optical axis z, and a normal direction of the flat abutting section 539 is the direction parallel to the optical axis z, specifically. The flat abutting section 539 is located closer to the effective optical portion 549 than the annular side wall 535 thereto. The flat abutting section 539 and the image-side surface 562 of the light blocking sheet 560 are in physical contact.

In FIG. 5A, the annular side wall 535 of the optical lens element 530 and the annular abutting surface 565 of the light blocking sheet 560 are overlapped along the direction vertical to the optical axis z. Specifically, a distance between a position closest to an image surface (not shown in drawings) of the annular side wall 535 and the image surface is the same as or similar to a distance between a position closest to the image surface of the annular abutting surface 565 and the image surface.

All optical elements of the optical element set 520 are disposed in the plastic barrel 510, and any optical element of the optical element set 520 is connected to or physically contacts at least one of the plastic barrel 510 and another optical element thereof. The light-shielding layer 570 is for retaining the optical lens element 530 in the plastic barrel 510, and is further for retaining an entirety of the optical element set 520 in the plastic barrel 510. In the enlarged view of FIG. 5A, the light-shielding layer 570 in the 5th embodiment is interposed between the plastic barrel 510 and the peripheral portion 540 of the optical lens element 530 (the object-side peripheral surface 541 and the outer diameter surface 543, specifically). The light-shielding layer 570 is for retaining the light blocking sheet 560 with the optical lens element 530, and for retaining the optical lens element 530 together with other optical elements of the optical element set 520 in the plastic barrel 510.

In FIG. 5A to FIG. 5G, an air gap 590 is formed between the peripheral portion 540 of the optical lens element 530 (the outer diameter surface 543, specifically) and the plastic barrel 510, and at least one portion of the light-shielding layer 570 is configured in the air gap 590.

In an assembling procedure of the imaging lens assembly 500, as shown in FIG. 5D, after the light blocking sheet 560 (with an assembling direction a560), the optical lens element 530 (with an assembling direction a530) and the plastic barrel 510 are allocated at the respective assembling positions, the light blocking sheet 560, the optical lens element 530 and the plastic barrel 510 are connected with the light-shielding layer 570 in the liquid state. Next, the light-shielding layer 570 after curing is configured to retain or fixedly dispose the light blocking sheet 560 with the optical lens element 530, and to retain or fixedly dispose the optical lens element 530 together with other optical elements of the optical element set 520 in the plastic barrel 510. Furthermore, other assembling details for the optical elements of the optical element set 520 are omitted herein, and the assembling manners of the imaging lens assembly 500 of the 5th embodiment are not limited by the statements in this paragraph.

In FIG. 5A and FIG. 5B, a portion of the light-shielding layer 570 (e.g., a portion of the light-shielding layer 570 located on the object side za with respect to the light blocking sheet 560) and another portion of the light-shielding layer 570 (e.g., a portion of the light-shielding layer 570 located farther from the optical axis z than the light blocking sheet 560 therefrom) are overlapped along the direction vertical to the optical axis z. Specifically, the portion of the light-shielding layer 570 and the another portion thereof aforementioned in this paragraph cover a portion of the peripheral portion 540 that is located close to the object side za.

The data of the parameters of the imaging lens assembly 500 according to the 5th embodiment of the present disclosure are listed in the following Table 5, and the parameters are also shown as FIG. 5B and FIG. 5D. The definitions of these parameters shown in Table 5 are the same as those stated in the imaging lens assembly 100 according to the 1st embodiment.

TABLE 5

| 5th Embodiment | | | |
|---|---|---|---|
| ψSa (mm) | 8.03 | Lb (mm) | 4.35 |
| ψSd (mm) | 8.83 | (ψH − ψSd)/(ψSd − ψSa) | 1.2 |
| ψWd (mm) | 8.83 | [ψH/(ψSd − ψSa)]/π² | 1.24 |
| ψH (mm) | 9.8 | ψWd − ψSd (mm) | 0 |
| L (mm) | 0.34 | L/Lb | 0.08 |

6th Embodiment

Figure 6A:
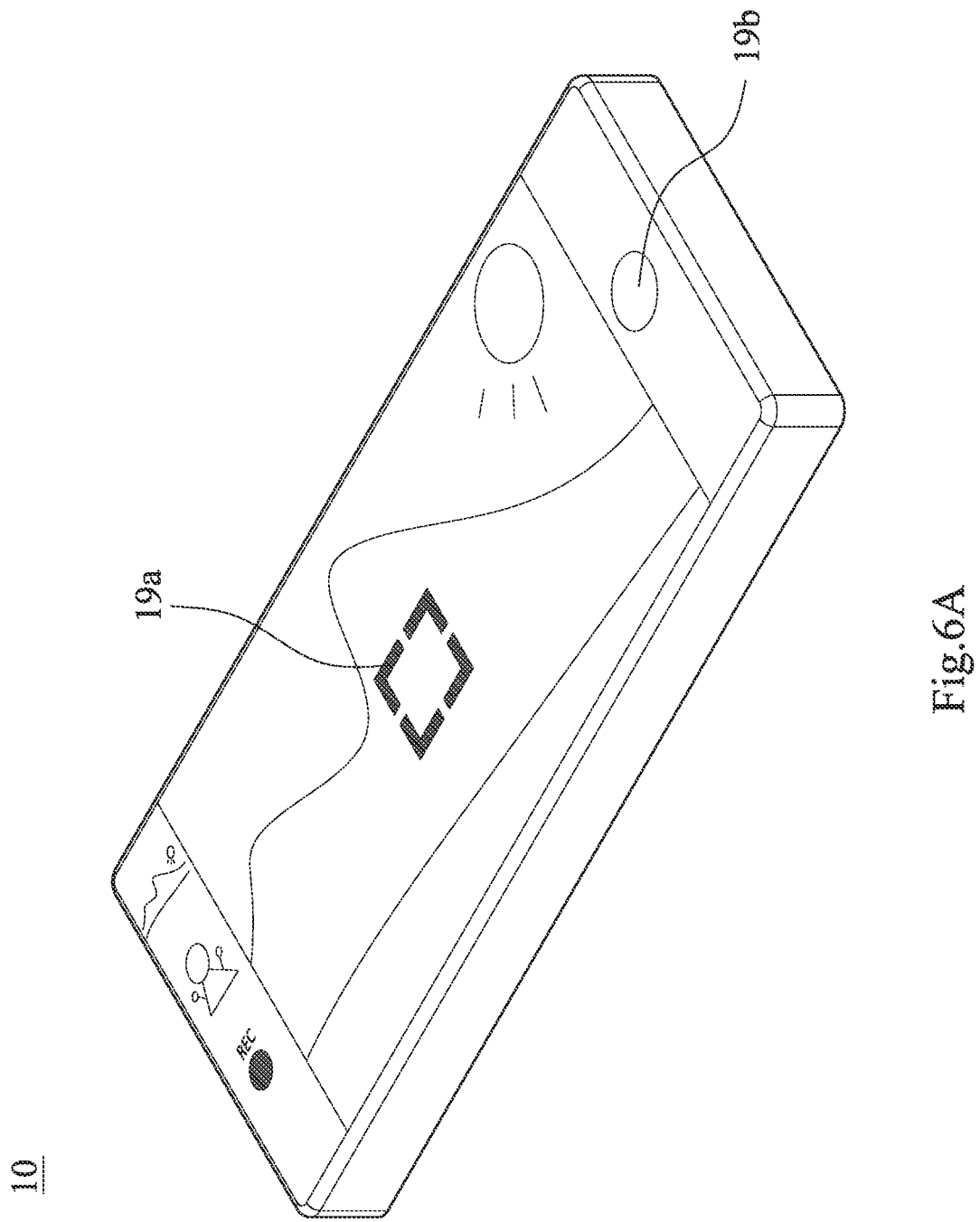
FIG. 6A shows a schematic view of an electronic device according to the 6th embodiment of the present disclosure.
Figure 6B:
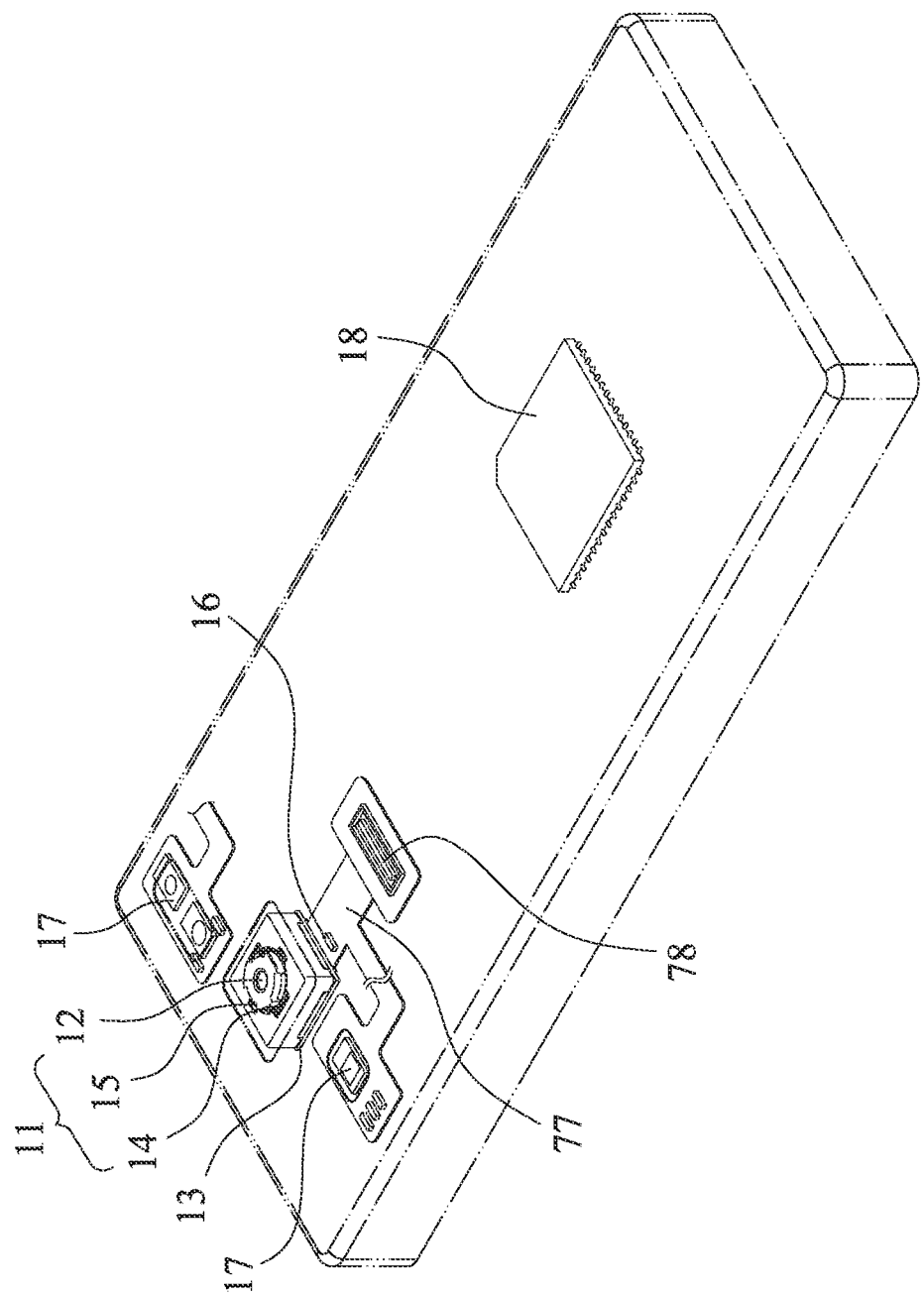
FIG. 6B shows another schematic view of the electronic device according to the 6th embodiment.

FIG. 6A shows a schematic view of an electronic device 10 according to the 6th embodiment of the present disclosure, FIG. 6B shows another schematic view of the electronic device 10 according to the 6th embodiment, and particularly, FIG. 6A and FIG. 6B are schematic views related to cameras of the electronic device 10. In FIG. 6A and FIG. 6B, the electronic device 10 of the 6th embodiment is a smart phone. The electronic device 10 includes a camera module 11 and an image sensor 13. The camera module 11 includes an imaging lens assembly 12 according to the present disclosure. The imaging lens assembly 12 may be one of the aforementioned imaging lens assemblies 100, 200, 300, 400, 500 or another imaging lens assembly according to the present disclosure. The image sensor 13 is disposed on an image surface (not shown in drawings) of the camera module 11. Therefore, a better image quality can be achieved, and hence the high-end imaging requirements of modern electronic devices can be satisfied.

Furthermore, the user activates the capturing mode via a user interface 19 of the electronic device 10, wherein the user interface 19 of the 6th embodiment can be a touch screen 19a, a button 19b, etc. At this moment, the imaging light of the imaging lens assembly 12 is converged on the image sensor 13, and the electronic signal associated with image is output to an image signal processor (ISP) 18.

Figure 6C:
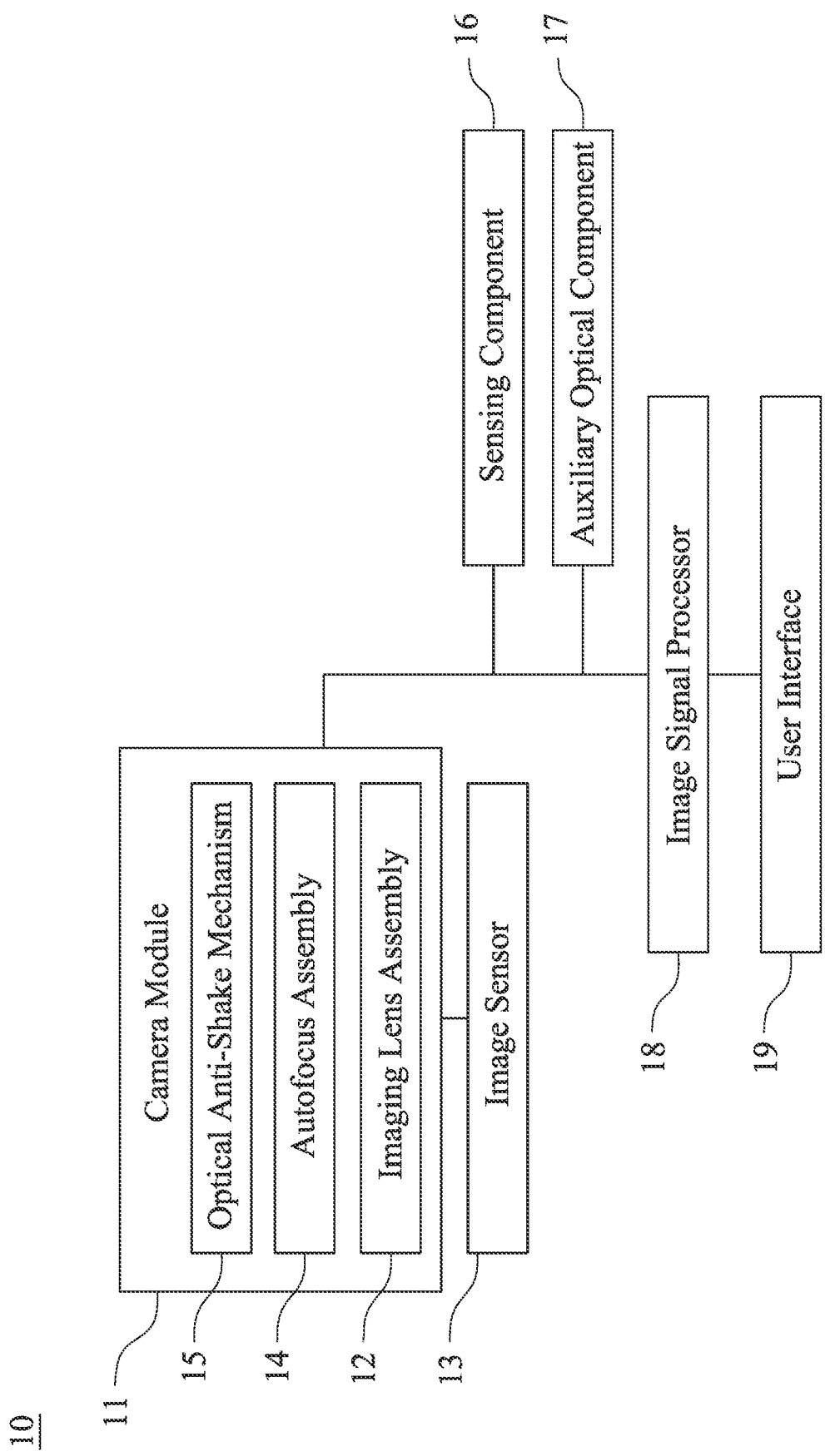
FIG. 6C shows a block diagram of the electronic device according to the 6th embodiment.

FIG. 6C shows a block diagram of the electronic device 10 according to the 6th embodiment, and in particular, the block diagram is related to the camera of the electronic device 10. In FIG. 6A to FIG. 6C, the camera module 11 can further include an autofocus assembly 14 and an optical anti-shake mechanism 15 based on the camera specification of the electronic device 10. Moreover, the electronic device 10 can further include at least one auxiliary optical component 17 and at least one sensing component 16. The auxiliary optical component 17 can be a flash module for compensating for the color temperature, an infrared distance measurement component, a laser focus module, etc. The sensing component 16 can have functions for sensing physical momentum and kinetic energy, and thereby can be an accelerator, a gyroscope, and a Hall effect element, to sense shaking or jitters applied by hands of the user or external environments. Accordingly, the functions of the autofocus assembly 14 and the optical anti-shake mechanism 15 of the camera module 11 can be aided and enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 6B, the camera module 11, the sensing component 16 and the auxiliary optical component 17 can be disposed on a flexible printed circuit board (FPC) 77 and electrically connected with the associated components, such as the imaging signal processor 18, via a connector 78 to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. In the 6th embodiment, the electronic device 10 includes a plurality of sensing components 16 and a plurality of auxiliary optical components 17. The sensing components 16 and the auxiliary optical components 17 are disposed on the flexible printed circuit board 77 and at least one other flexible printed circuit board (its reference numeral is omitted) and electrically connected with the associated components, such as the image signal processor 18, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

7th Embodiment

Figure 7:
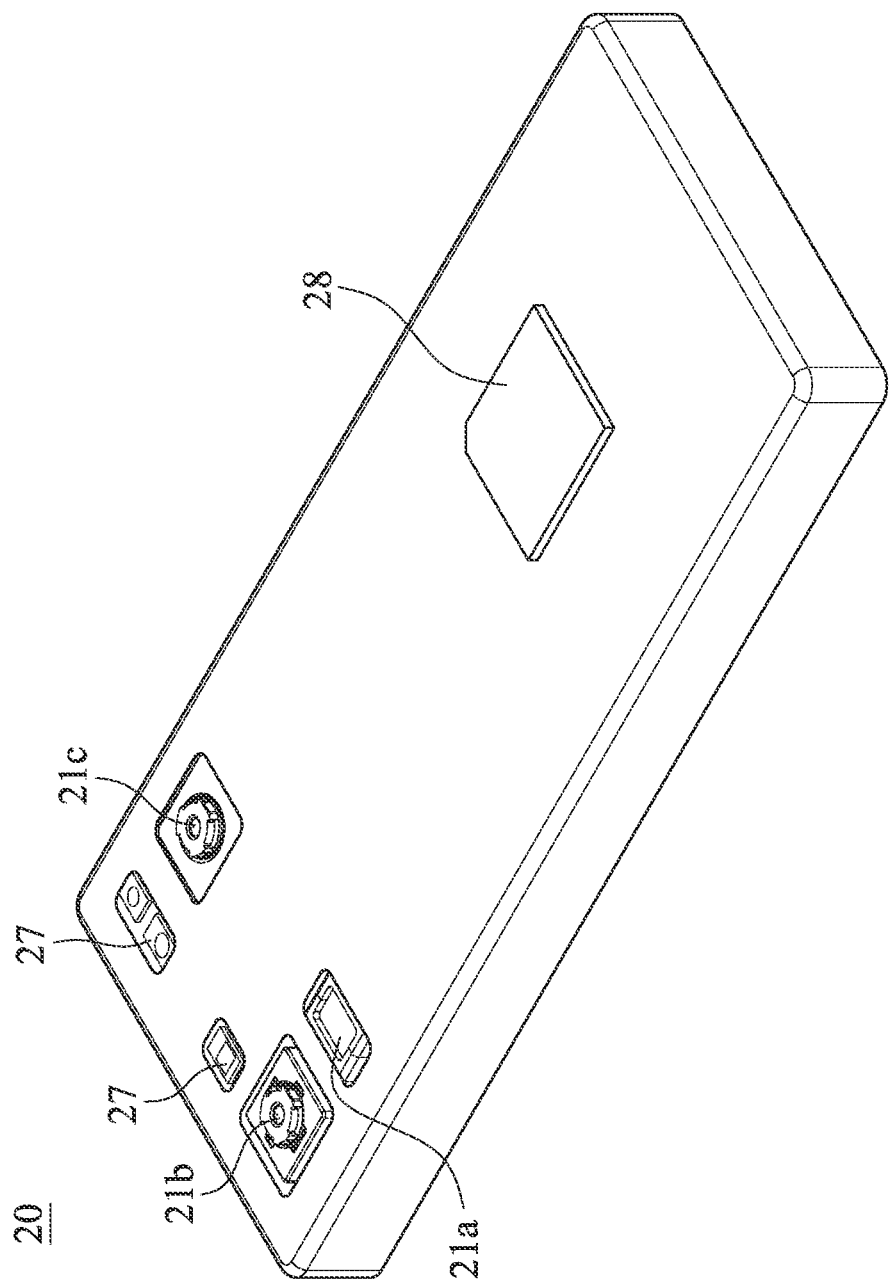
FIG. 7 shows an electronic device according to the 7th embodiment of the present disclosure.

FIG. 7 shows a schematic view of an electronic device 20 according to the 7th embodiment of the present disclosure. In FIG. 7, the electronic device 20 of the 7th embodiment is a smart phone. The electronic device 20 includes camera modules 21a, 21b, 21c and respective image sensors (not shown in drawings). Each of the image sensors is disposed on an image surface of a corresponding one of the camera modules 21a, 21b and 21c. The camera modules 21a, 21b and 21c are disposed on the same side of the electronic device 20 and may have different optical properties. At least one of the camera modules 21a, 21b and 21c includes an imaging lens assembly (not shown in drawings) according to the present disclosure. In another embodiment according to the present disclosure (not shown in the drawings), the electronic device may be an electronic device with at least two camera modules, e.g., a smart phone with two camera modules, a smart phone with three camera modules, a smart phone with four camera modules, or a tablet personal computer with two camera modules.

In the photographing procedure of the electronic device 20, at least one image can be captured by the camera modules 21a, 21b and 21c with an aid of an auxiliary optical component 27, and then the required effects like zooming, delicate images would be achieved by the processors (such as an image signal processor 28 and so on) equipped in the electronic device 20. In addition, it should be realized that the configurations of the camera modules of the electronic device according to the present disclosure are not limited to the positions disclosed in FIG. 7.

8th Embodiment

Figure 8:
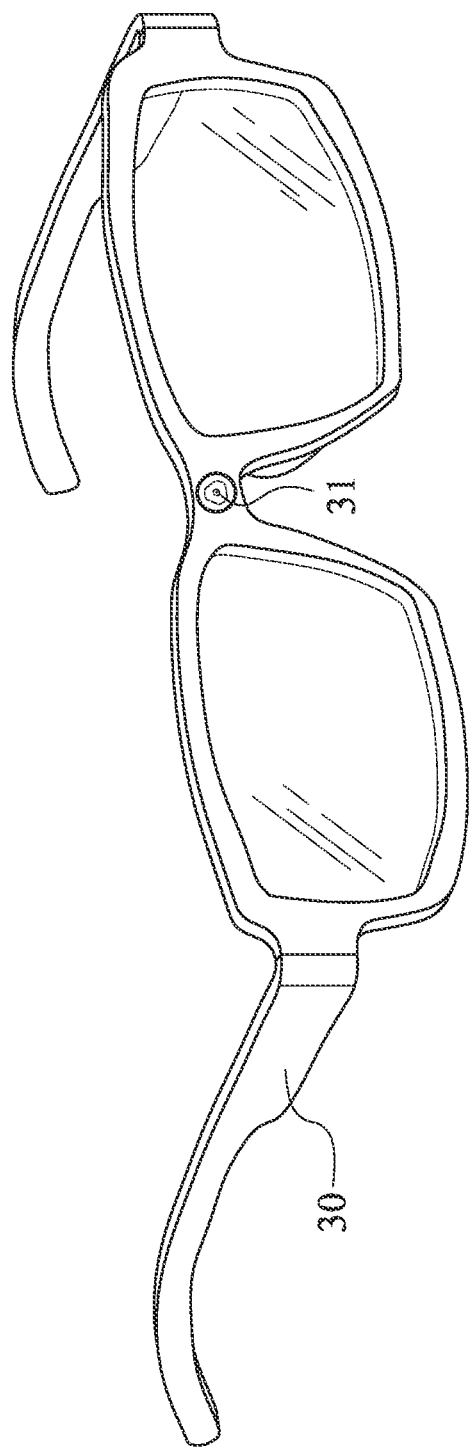
FIG. 8 shows an electronic device according to the 8th embodiment of the present disclosure.

FIG. 8 shows an electronic device 30 according to the 8th embodiment of the present disclosure. The electronic device 30 of the 8th embodiment is a wearable device. The electronic device 30 includes a camera module 31 and an image sensor (not shown in drawings). The camera module 31 includes an imaging lens assembly (not shown in drawings) according to the present disclosure. The image sensor is disposed on an image surface of the camera module 31.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, comprising a plastic barrel and an optical element set, the plastic barrel comprising a minimum opening, the optical element set comprising:
   an optical lens element, in order from a center to a periphery thereof, comprising:
      an effective optical portion, wherein an optical axis of the imaging lens assembly passes through the effective optical portion; and
      a peripheral portion surrounding the effective optical portion, wherein at least one surface of an object-side peripheral surface and an image-side peripheral surface of the peripheral portion comprises an annular side wall, which extends along a direction parallel to the optical axis;
   a light blocking sheet comprising:
      an object-side surface facing towards an object side;
      an image-side surface located opposite to the object-side surface;
      an annular abutting surface connected between the object-side surface and the image-side surface, wherein the annular abutting surface and the annular side wall of the optical lens element are disposed correspondingly to each other; and
      a central opening surface surrounding and forming a central opening of the light blocking sheet, wherein the central opening surface is connected between the object-side surface and the image-side surface; and
   a light-shielding layer surrounding the central opening of the light blocking sheet and comprising an annular portion, wherein the light-shielding layer extends from the peripheral portion of the optical lens element towards an outer diameter surface of the optical lens element, and the annular portion is for retaining the light blocking sheet, so that there is no relative displacement in the direction parallel to the optical axis between the annular abutting surface of the light blocking sheet and the annular side wall of the optical lens element;
   wherein a maximum diameter of the light-shielding layer is $\psi H$, a maximum diameter of the annular abutting surface is $\psi Sd$, a minimum diameter of the central opening surface is $\psi Sa$, and the following condition is satisfied:

$$0.03 < ((\psi H - \psi Sd) / \psi Sd - \psi Sa) < 6.0.$$

2. The imaging lens assembly of claim 1, wherein the maximum diameter of the light-shielding layer is $\psi H$, the maximum diameter of the annular abutting surface is $\psi Sd$, the minimum diameter of the central opening surface is $\psi Sa$, and the following condition is satisfied:

$$0.1 < [\psi H / (\psi Sd - \psi Sa)] / \pi^2 < 5.0.$$

3. The imaging lens assembly of claim 2, wherein the annular abutting surface of the light blocking sheet and the annular side wall of the optical lens element are assembled correspondingly to each other to be aligned with the optical axis.

4. The imaging lens assembly of claim 3, wherein the annular portion is concave-curved and recessed towards the annular abutting surface of the light blocking sheet.

5. The imaging lens assembly of claim 1, wherein the annular side wall of the optical lens element and the annular abutting surface of the light blocking sheet are overlapped along a direction vertical to the optical axis, and the plastic barrel and at least one portion of the light-shielding layer are not overlapped along the direction parallel to the optical axis.

6. The imaging lens assembly of claim 1, wherein the optical element set is disposed in the plastic barrel, and the light-shielding layer is for retaining the optical lens element in the plastic barrel.

7. The imaging lens assembly of claim 6, wherein at least one portion of the light-shielding layer is connected to the minimum opening of the plastic barrel.

8. The imaging lens assembly of claim 1, wherein a minimum diameter of the annular side wall is $\psi Wd$, the maximum diameter of the annular abutting surface is $\psi Sd$, and the following condition is satisfied:

$$0.0 \text{ mm} \le \psi Wd - \psi Sd < 0.04 \text{ mm}.$$

9. The imaging lens assembly of claim 1, wherein a minimum diameter of the annular side wall is $\psi Wd$, the maximum diameter of the annular abutting surface is $\psi Sd$, and the following condition is satisfied:

$$0.005 \text{ mm} < \psi Wd - \psi Sd < 0.03 \text{ mm}.$$

10. The imaging lens assembly of claim 1, wherein the surface of the object-side peripheral surface and the image-side peripheral surface of the peripheral portion further comprises:
   a flat abutting section extending along a direction vertical to the optical axis, wherein the flat abutting section is located closer to the effective optical portion than the annular side wall thereto, and the flat abutting section and the light blocking sheet are in physical contact; and
   an annular groove structure connected between the annular side wall and the flat abutting section, wherein the annular groove structure is located farther from the effective optical portion than the flat abutting section therefrom, the annular groove structure is recessed from the surface of the object-side peripheral surface and the image-side peripheral surface towards the other surface thereof to form an accommodating space, and at least one portion of the light-shielding layer is configured in the accommodating space.

11. The imaging lens assembly of claim 1, wherein the maximum diameter of the light-shielding layer is $\psi H$, the maximum diameter of the annular abutting surface is $\psi Sd$, the minimum diameter of the central opening surface is $\psi Sa$, and the following condition is satisfied:

$$1.0 < (\psi H - \psi Sd) / (\psi Sd - \psi Sa) < 5.0.$$

12. A camera module, comprising:
the imaging lens assembly of claim 1.

13. An electronic device, comprising:
the camera module of claim 12; and
an image sensor disposed on an image surface of the camera module.

14. An imaging lens assembly, comprising a plastic barrel and an optical element set, the plastic barrel comprising a maximum opening, the optical element set comprising:
an optical lens element, in order from a center to a periphery thereof, comprising:
an effective optical portion, wherein an optical axis of the imaging lens assembly passes through the effective optical portion; and
a peripheral portion surrounding the effective optical portion, wherein at least one surface of an object-side peripheral surface and an image-side peripheral surface of the peripheral portion comprises an annular side wall, which extends along a direction parallel to the optical axis;
a light blocking sheet comprising:
an object-side surface facing towards an object side;
an image-side surface located opposite to the object-side surface;
an annular abutting surface connected between the object-side surface and the image-side surface, wherein the annular abutting surface and the annular side wall of the optical lens element are disposed correspondingly to each other; and
a central opening surface surrounding and forming a central opening of the light blocking sheet, wherein the central opening surface is connected between the object-side surface and the image-side surface; and
a light-shielding layer surrounding the central opening of the light blocking sheet and comprising an annular portion, wherein the light-shielding layer extends from the peripheral portion of the optical lens element towards an outer diameter surface of the optical lens element, and the annular portion is for retaining the light blocking sheet, so that there is no relative displacement in the direction parallel to the optical axis between the annular abutting surface of the light blocking sheet and the annular side wall of the optical lens element.

15. The imaging lens assembly of claim 14, wherein the peripheral portion of the optical lens element comprises a gate trace, and the gate trace is located farther from the effective optical portion than the annular side wall therefrom.

16. The imaging lens assembly of claim 14, wherein an air gap is formed between the peripheral portion of the optical lens element and the plastic barrel, and at least one portion of the light-shielding layer is configured in the air gap.

17. The imaging lens assembly of claim 15, wherein at least one portion of the light-shielding layer is located farther from the effective optical portion than the gate trace therefrom, and the light-shielding layer covers and physically contacts the gate trace.

18. The imaging lens assembly of claim 14, wherein the length along the direction parallel to the optical axis of the light-shielding layer is L, the length along the direction parallel to the optical axis of the plastic barrel is Lb, and the following condition is satisfied:

$$0.1 < L/Lb < 0.4.$$

19. The imaging lens assembly of claim 14, wherein the optical element set is disposed in the plastic barrel, and the light-shielding layer is for retaining the optical lens element in the plastic barrel.

* * * * *